United States Patent [19]

Stehman

[11] 4,442,321

[45] Apr. 10, 1984

[54] TRANSPARENT DIALING BETWEEN INTERCONNECTED TELECOMMUNICATION SWITCHING SYSTEMS

[75] Inventor: Carl J. Stehman, LaGrange, Ill.

[73] Assignee: Rockwell International, Downers Grove, Ill.

[21] Appl. No.: 271,457

[22] Filed: Jun. 8, 1981

[51] Int. Cl.³ .................. H04M 7/00; H04Q 3/54
[52] U.S. Cl. .................. 179/18 EB; 179/18 AD; 179/18 ES
[58] Field of Search ........ 179/18 AD, 18 ES, 18 EB, 179/18 ET, 18 HA, 27 CA, 18 B, 18 EA

[56] References Cited

U.S. PATENT DOCUMENTS 4,256,926 3/1981 Pitroda et al. ................ 179/18 ES
4,259,549 3/1981 Stehman ...................... 179/18 ES

OTHER PUBLICATIONS

"The International No. 2 EAX Digit Analysis Translator" by E. A. Wodka, *GTE Automatic Electric Journal*, Nov. 1980, pp. 210–215.

*Primary Examiner*—Thomas W. Brown
*Attorney, Agent, or Firm*—C. B. Patti; V. L. Sewell; H. F. Hamann

[57] ABSTRACT

A multilevel data base memory structure for use by the processor control of each of a plurality of interconnected telecommunication switching systems so that communications between any two of the systems can be established with minimal interaction by the users. A comprehensive directory number plan provides for the allocation of blocks of at least one hundred directory numbers (i.e. 2400-2499) to the stations or features of each switching system. For those directory numbers serviced by a switching system the thousands/hundreds digits are utilized as addresses of locations of the memory structure first table level, the contents of which are pointers to various sections of a second table level. Within each such section the tens/units digits are used as addresses to define a location having stored therein an ultimate system function representative of, for instance; a standard call, conference call, speed dial ... etc. For each block of directory numbers serviced by another system the dialed directory number thousands/hundreds digits are utilized as addresses of locations of the memory structure first table level which contain a quasi-ultimate system function which, when carried out by the system, automatically transfers the dialed digits via an interconnecting line to the switching system servicing the dialed number.

16 Claims, 25 Drawing Figures

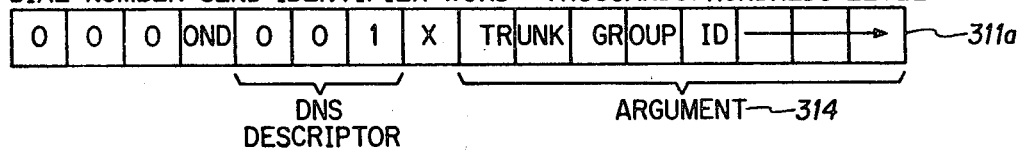
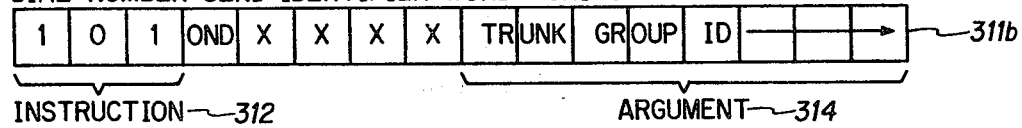
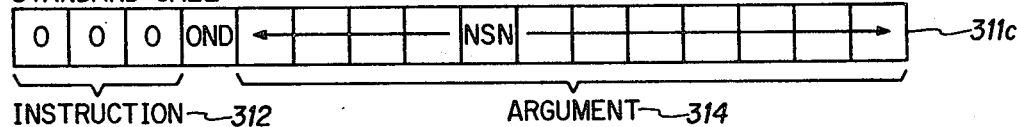
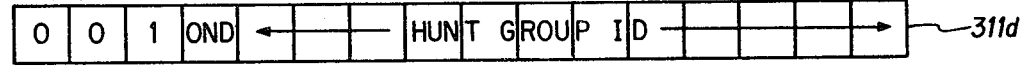
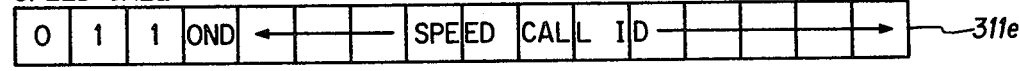
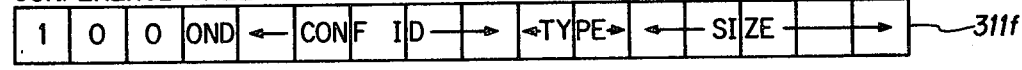
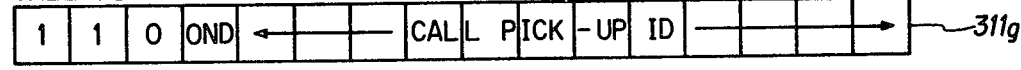
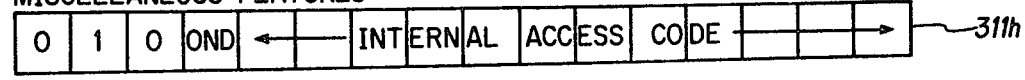
FIG. 6

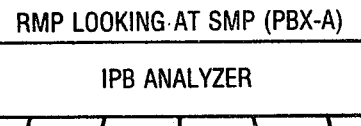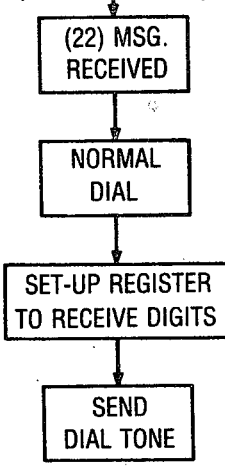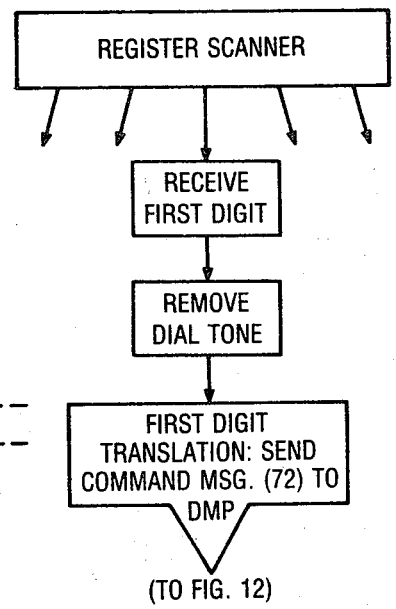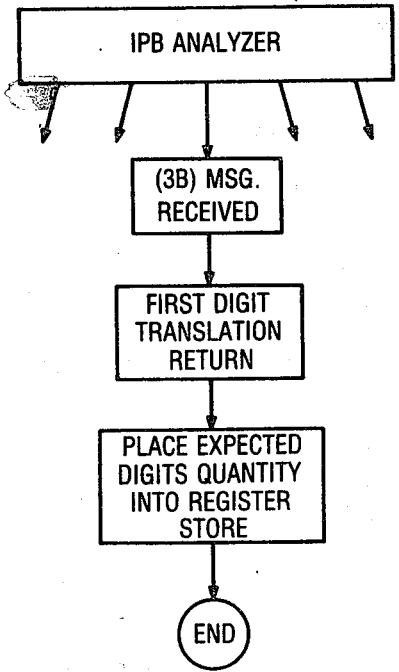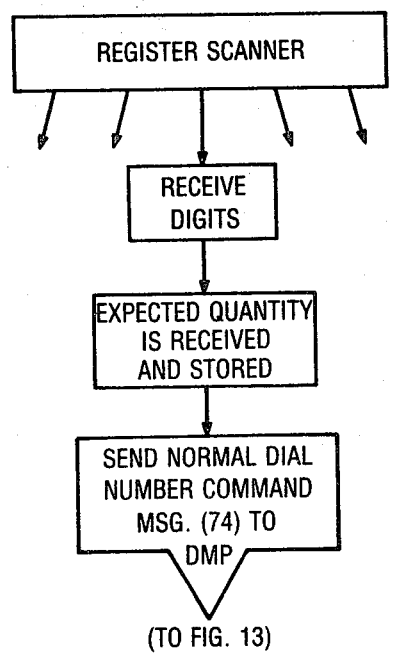
FIG. 10

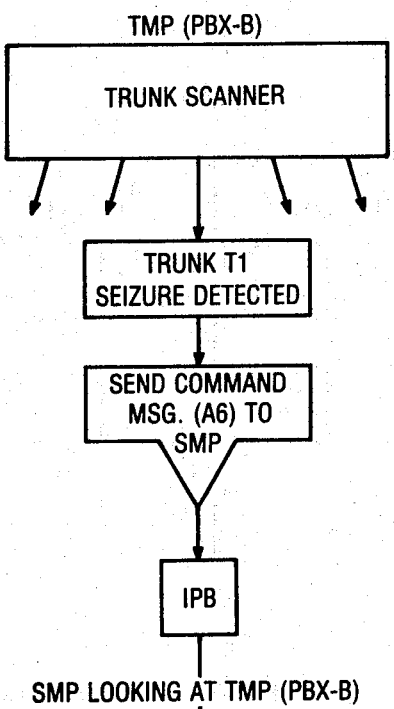
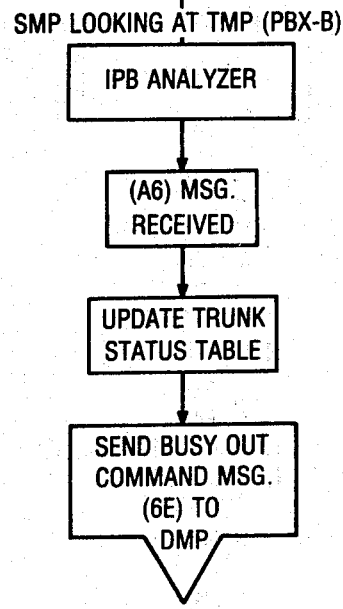
FIG. 15
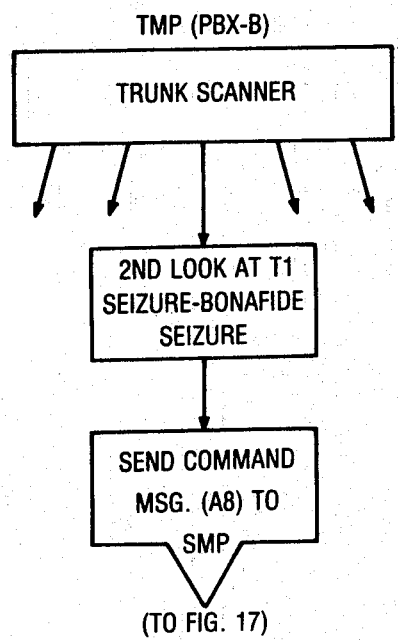
FIG. 16

TRANSPARENT DIALING BETWEEN INTERCONNECTED TELECOMMUNICATION SWITCHING SYSTEMS

BACKGROUND OF THE INVENTION

This invention relates in general to telecommunication switching complexes having a plurality of interconnected switching systems, and more particularly to the program control structure within such switching systems.

Telephone switching systems have evolved to include various forms of computerized common controls of the programmable stored program variety. Conventionally, the computerized controls have been configured as multi-task monoprocessors with the result being the need to coordinate relatively complex control tasks and memory configurations. One of the characteristics of the monoprocessor approach is the need for an executive program or an executive processor for controlling system operations. Typically this results in a program which is interrupt driven, thereby requiring a potentially complex heirarchy for the various interrupts. Moreover it is generally necessary to queue work for the purpose of distributing the real time work load of the processor. The resultant complexity of the programming task will be apparent from the foregoing, not only as it applies to initially generating and debugging the programs, but also in maintaining the system should a fault develop.

The present invention is related to and has particular utility when used in conjunction with the telecommunication switching system control as described in U.S. Pat. No. 4,256,926 entitled "Microprocessor Control Complex For A Telecommunication Switching System" and U.S. Pat. No. 4,259,549 entitled "Dialed Number To Function Translator for Telecommunications Switching System Control Complex" the disclosures of which are incorporated herein by reference thereto. The former-mentioned patent discloses a multiprocessor control for distributing call processing tasks while the latter referenced patent discloses the manner in which the various processors, and in particular the data base processor, systematically operates to translate dialed numbers into operational functions to perform all the switching system functions. With such a control the call processing functions are distributed among the processors in the system in such a way as to modularize the control functions and simplify the programming.

The patents are addressed to a single switching system configuration including the processor control hardware implementation and the processor memory architecture. The invention disclosed herein is primarily concerned with the particular structure of the data base memory stores in guiding the common control to effect an efficient intercommunication of dialed directory numbers between remotely located communication switching systems when such systems are interconnected to form a telecommunications switching complex.

A switching complex finds a wide variety of applications where, for instance, a business organization occupies remote locations, each location having a switching system (such as a PBX) servicing users who have a need to communicate with many other users. The switching systems of the complex are typically interconnected by conventional tie trunks to provide communication paths between the systems so that users serviced by any one system may communicate with users serviced by another switching system within the complex.

Traditionally, the communication with a station (extension telephone) resident in and thus serviced by another system is invoked by first going off-hook, receiving dial tone, dialing a trunk access code (such as the digit "9"), and after having received a second dial tone from the distance switching system, dialing the directory number of the destination station. While station users are able to communicate across remote switching systems in this manner, the users are required to perform some operations which should more aptly be carried out by the modern sophisticated switching systems. Such operations include; remembering whether the dialed station is nonresident, dialing the trunk access code and proceeding with the station number dial upon receipt of the destination dial tone.

It is thus evident that communications between switching systems of a complex are conventionally carried out by the traditional user-initiated action and reaction to signalling stimuli and that the common control data base information of each system is not shared to the extent possible. As a consequence, station users are instrumental in deciding the course of action that must be taken in order to effectuate communications through multiple switching systems. Owing to the fact that the switching systems of the traditional communication complex communicate therebetween by standard telephone signalling methods, the telephone users must have some of the information and exercise some of the decision making aspects to complete calls across the various switching systems.

In view of the fact that modern telecommunications switching systems involve state-of-the-art computer data processing technologies, it should be feasible to incorporate such decisional aspects within the switching systems rather than relying on the users to remember them. Because of the sizeable capital investments required in establishing a switching complex, such a complex and its respective switching systems could be utilized to a fuller extent and made more efficient by programming the common controls to recognize when dialing across the switching systems is requested and to take the appropriate action to effect such a result with minimal knowledge thereof by the users.

The related patents as hereinbefore referenced, discuss the ability of a single switching system to share its hardware among separate groups of stations, where stations in each group may have the same directory numbers, all without confusing one station in one group with another station in another group. Such a provision of "customer groups" is highly desirable, however this aspect has heretofore been accomplished only with single switching system environments.

It is a paramount object of the present invention to provide means for streamlining the intercommunications between a plurality of communication switching systems of a switching complex so that the complex as a whole functions more systematically rather than as autonomous interconnected systems.

It is a primary object of the present invention to provide a switching system having the capability of automatically transferring a dialed number to the destination switching system servicing the associated station so that the switching function desired by the user is effected, all without the user being aware that another system is involved.

As a corollary to the foregoing, it is an object of the present invention to provide a memory structure and data organization in the switching system controls such that a user requesting service of a remote switching system need not remember access codes or incur long delays in waiting for dial tones.

An important feature of the invention is to provide switching systems, such as PBXs, which may be interconnected in a daisy-chained fashion such that a dialed number is continually forwarded to the destination system in which the station, corresponding to the dialed number, is resident. From all appearances to the user of the system, he has his own private system and is unaware, except for a small delay, of the number of intermediate PBX's which forwarded the dialed number.

A further advantage is to provide a switching complex having switching systems interconnected in such a manner so as to maintain the integrity of customer groups throughout the complex.

The foregoing as well as other objects and advantages of the present invention will become apparent from the detailed description of the invention which follows hereinafter, and when considered together with the appended drawings.

While the invention will be described in connection with certain embodiments presently considered to be preferred, there is no intent to limit it to these embodiments. On the contrary, the intent is to cover all alternatives, modifications and equivalents included within the spirit and scope of the invention as defined by the appended claims.

BRIEF DESCRIPTION OF THE INVENTION

In accordance with the present invention, there is provided a program control data base structure for use in a telecommunication switching system. Such a structure when utilized in the common controls of a plurality of interconnected switching systems allows an efficient transfer of dialed directory numbers between the systems—all with minimal interaction by the switching system users.

One part of the common control memory is comprised of a data base memory for correlating dialed directory numbers to system functions such as, for example, standard call function, speed call function, conference call and the like. The data base memory structure includes at least a first and second memory level linked together with pointers and with each level having a plurality of memory locations.

Locations of the first level are addressed by the common control using at least one of the dialed digits of the dialed directory number. For directory numbers serviced by the switching system (i.e. resident numbers), there are pointers stored within the locations of the first level, directing the common control to a block of locations in the second level. Within this particular second level block these locations are addressable by at least one other lower order dialed directory number digit. Such second level locations have stored therein ultimate system functions utilized by the common control to carry out the system function associated with the dialed directory number.

For directory numbers serviced by another similarly-structured interconnected switching system (i.e. nonresident numbers), one data base memory level, addressed by at least one directory number digit, has stored therein a quasi-ultimate system function which, when operated upon by the common control, transfers the dialed directory number, en gross, via the appropriate interconnecting line toward the switching system servicing the directory number.

Furthermore, each interconnected switching system may be equipped with "customer groups" which may have assigned to stations in the different groups the same directory number. The common control is able to distinguish between its customer groups based upon a unique equipment address associated with each subscriber line appearance.

When customer groups are provided, another data base memory level, preceding the mentioned first and second levels, is also provided. A dialed directory number directs the common control to the customer group level, which level contains pointers to a block of locations within the data base memory first level. In the preferred embodiment the first level includes one block of locations for each customer group. As previously noted, this level is addressed by at least one higher order directory number digit to define a particular memory location storing either a quasi-ultimate function or a pointer to the second level in respect to nonresident or resident dialed directory numbers.

In accordance with a stated object of the present invention each customer group may be extended to one or more of the other switching systems comprising the complex by also providing at least one interconnecting communication line per customer group where it is desired to maintain uniqueness between the groups. In this manner, and where distinct customer groups are utilized having some identical directory numbers in each group, the destination switching system receiving a transferred directory number is able to correlate the number with the correct group based upon which interconnecting line the transferred number was received. Thus, the user need not know where the destination telephone extension station resides nor that more than one switching system is involved with the dialed digit transfer.

To realize efficiencies in system time and hardware the use of a comprehensive directory number plan allows the placement of quasi-ultimate system functions within the data base memory first level whereupon a data base memory correlation of only a portion of the dialed digits is necessary to determine that a dialed directory number transfer is necessary. In those instances where nonresident directory numbers are distinguishable only at the least significant digit position, the quasi-ultimate functions are placed in the data base memory second level.

BRIEF DESCRIPTION OF THE DRAWINGS

FIG. 6 illustrates the formats of the various identifier words found either in the intermediate or lower levels of the directory number table.

FIGS. 7-14 are flow charts, which when taken together in sequential order, show the programs executed by the various microprocessors in an originating switching system (PBX-A) which collectively execute the dial number send function.

FIGS. 15-17 illustrate the sequence of program operations executed by the microprocessors of the destination switching system (PBX-B) in response to the originating system's signalling.

Figure 1:
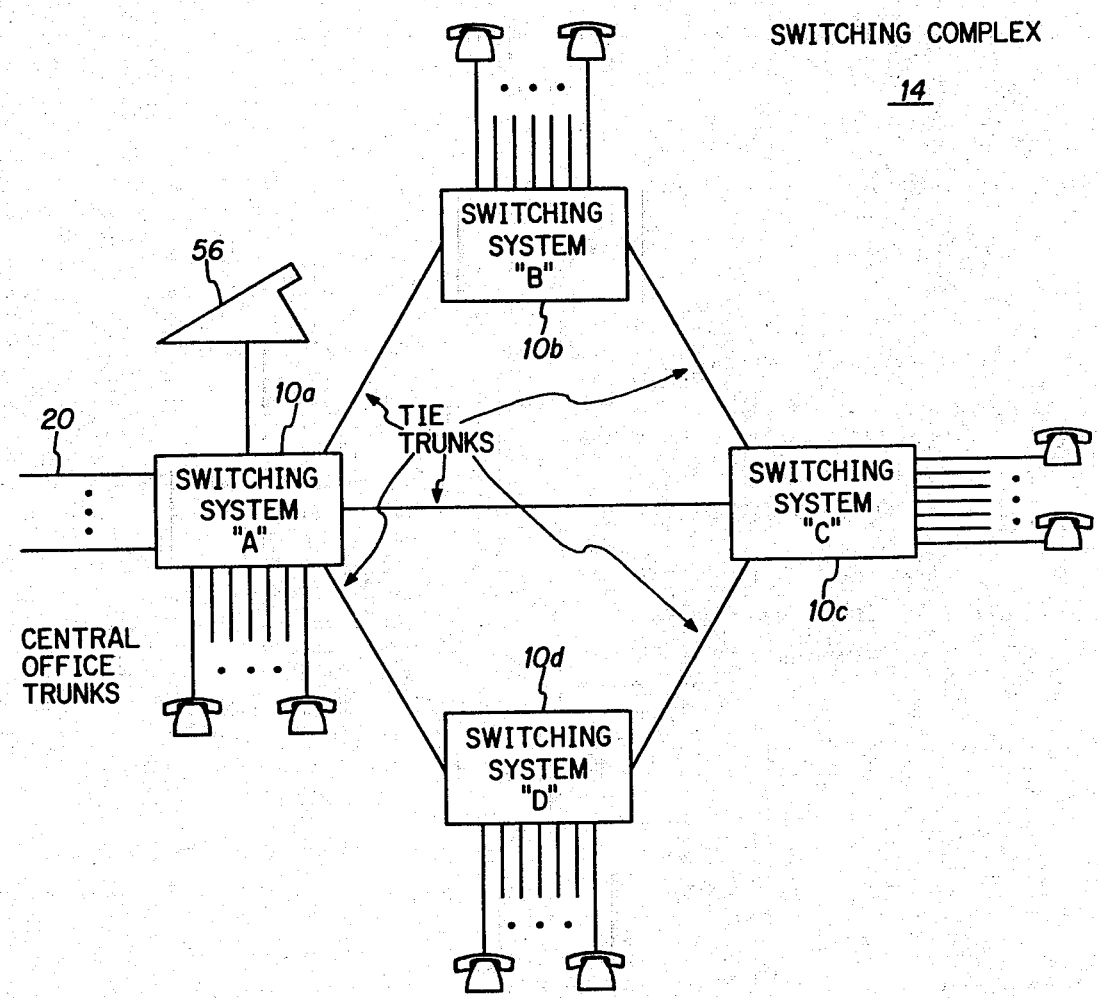
FIG. 1 is a block diagram of a telecommunication complex showing the connections by which each switching system communicates with each other in addition to connections extended from certain switching systems to central offices.

In addition to the drawings, Tables I through III appear at the end of the specification, for the convenience of the reader, to aid in the following description which at various points, directs attention to them and identifies their contents.

DETAILED DESCRIPTION OF THE INVENTION

In order to provide an easy cross reference to the many sections of this disclosure the following directory is presented.

I. GENERAL DESCRIPTION—This section presents an overview of the salient concepts of the invention intended to enable the reader to better understand the following more detailed description.

II. EXEMPLARY SWITCHING COMPLEX—Discussed is a telecommunication complex having multiply interconnected switching systems embodying the concepts of the present invention.

III. EXEMPLARY SWITCHING SYSTEM—This portion of the specification is drawn largely from the previous application (now U.S. Pat. No. 4,259,549) with slight modifications in that the functions of the Busy Lamp Microprocessor have been integrated into the Console Microprocessor.
  A. Switching Network
  B. Common Control
    1. Distributed Microprocessors
    2. Alternative Embodiment
    3. Multi-Processor—Interprocessor Buffers
    4. Multi-Processor—Individual microprocessors
      This section sets forth the operation as ascribed to the various microprocessors and the communication therebetween to accomplish overall system functions.

IV. DATA BASE MICROPROCESSOR STORES—Described are the various memory tables and stores used by the data base microprocessor in carrying out system functions in response to dialed numbers. The text drawn to the Dial Number Send Function is entirely new.
  A. NSN/COS Table
  B. Directory Number Table
  C. Identifier Word Format V. COMMAND MESSAGE FORMAT—The information exchanged between the microprocessors conforms to various formats and is disclosed so that one skilled in the art may adapt the programming techniques to accommodate individual needs. This material is largely drawn from the previous case.

VI. EXEMPLARY "DIALED NUMBER SEND" FUNCTION—This section explains the systematic sequence of microprocessor operations employed in completing a dial number send telephone call across two switching systems of the complex. The first switching system (PBX-A), utilizing the data base structure of the present invention, recognizes the nonresident dialed number and transfers the number to a destination switching system (PBX-B), via a specific interconnecting line, where such system processes the representative function to completion.

I. GENERAL DESCRIPTION

The invention herein disclosed is directed to communication switching systems interconnected to form a switching complex. The processor controls of the systems employ particular memory structures and data organizations for carrying out operational functions in response to dialed numbers not resident therein, whereby a communication path through such systems is established, yet is completely transparent to the originator.

The architecture of the memory structure permits the use of a uniform directory number plan whereby station directory numbers within different customer groups may be identical. All station-to-station calls within a customer group, irrespective of which system the destination station resides in, requires only the dialing of one directory number. More particularly, groups of four-digit numbers differing at the thousands digit position may be assigned to stations of different systems whereby a user in one system may dial a directory number resident in another system and the originating system, upon correlating the thousands/hundreds digits, proceeds immediately to sieze a specific connecting trunk without a further correlation of lower order digits, and without the user knowing the dialed number resides in another switching system. Therefore, various economies of the system hardware and software structures may be realized in addition to the expeditious completion of such a trunk call.

The data base memory is uniquely structured so that dialed directory numbers are directly correlated by the processor control, via a directory number table, into ultimate or quasi-ultimate system functions, to then set into action the necessary system elements to effectuate the functions. For example, a dialed station extension number correlated to a system "standard call function" sets into action the various processors, by way of a set of systematic program instructions, for manipulating the system hardware so that two stations are connected via the system's network. A dialed access code number, indicative of for example a "speed dial", is correlated into a function which causes the redialing of an associated number.

It should be borne in mind throughout this disclosure that the purpose of the directory number table is to provide a mechanism whereby any dialable number is directly correlated to a system function. Insofar as every subscriber dialing a number seeks a specific outcome from the switching system, the system had tabulated in advance such outcome for every dialable number. Ordinarily most dialable numbers identify subscriber stations where the system outcome is a network connection linking the calling and called party; however, other outcomes denoting other system functions are equally essential.

Briefly, the directory number table is a linked multi-level structure where a one-to-one appearance of a system function for every directory number is not necessary. Indeed, since system function notations require memory storage area, many of the station-associated directory numbers requiring the same system function can, in traversing the directory number table, culminate at a single or relatively few locations storing the same functional notation.

Once it is determined which customer group is involved for entry into the table structure, certain digits of the dialed number are then used in addressing the various subsequent table levels to converge toward the representative system function. The quantity of table levels involved depends on the number of digits used to identify subscriber stations or system features. The illustrated switching system contemplates a four-digit scheme where the two higher order (thousands/hundreds) digits form an address to access corresponding locations of an intermediate level. Such locations, for stations or services served by the subject switching system, contain pointers directing the processor control to certain sections of a lower table level where the lower order digits of the dialed number (tens/units) are then used to define a location having stored therein an instruction recognized by the control to perform a system function represented by the dialed digits.

For station and services, corresponding to directory numbers of a comprehensive number plan serviced by another switching system in the complex, the higher order dialed digits are used to access the intermediate table level locations which have stored therein instructions recognized by the processing system as dialed directory numbers resident in another switching system. This instruction, not representative of the function desired by the dialer, effects a bulk transfer of the dialed digits to the servicing switching system where the desired function is performed.

The switching systems maintain the "distinctness" of customer groups throughout the complex by interconnecting each switching system having common customer groups with at least one tie trunk per group. In this manner a destination switching system receiving a dialed number via a trunk, and possibly having the same directory number assigned to stations in different customer groups, is able to determine the particular group with which the dialed number belongs.

The foregoing exemplifies a typical situation; however, it should be understood that other configurations of customer groups are possible. For example, customer groups associated with only a single switching system maintain their separation by virtue of their distinct line equipment addresses in conjunction with the data base memory customer group level irrespective of any interconnecting trunks. Also, users may desire the use of multiple customer groups where all directory numbers are unique so that communications between switching systems within any group may be effected by a single tie trunk.

Within the exemplary switching complex, directory numbers are conveniently assigned so that stations within a particular customer group and having directory numbers with the same hundreds digit are all serviced by the same switching system. This convenience is advantageously used within the data base table structure where, for directory numbers representative of stations or features serviced by another switching system, a full directory number correlation is not made but rather after a correlation of only the higher order digits, it is recognized that such extension resides in another switching system located within the complex. Moreover, the determination of this nonresidency includes information indicative of which interconnecting tie trunk is directed toward the switching system serving the dialed number. The originating switching system thereupon effects a transfer of the directory number over the noted tie trunk, so that the destination switching system, in performing a full digit correlation, will recognize residency and carry out the associated ultimate system function.

In the event the originating switching system is not directly connected, via a customer group trunk, to the destination switching system, but rather is connected via an intermediate switching system, such intermediate system will again recognize the transferred number as nonresident and retransfer the dialed number to the destination switch for final correlation to an ultimate function.

There are occasions where a full directory number digit translation must be made in order to determine nonresidency. For example, where nonresident access or feature codes are identified as a single digit number (for instance "9" to gain access to a central office trunk), and adjacent numbers are resident, a translation of the entire number (0009) must be made (the processing system backfills the more significant digits with zeroes). Such a situation may find application where the originating switching system is not equipped with a CO trunk but rather is connected to a system which is provided with a CO trunk. The originating system may thus advantageously use the second switching system to gain access to its services. If, however, all directory numbers in the block 0000-0099 were nonresident, a translation of only the thousands and hundreds digits (00) would be necessary.

II. EXEMPLARY SWITCHING COMPLEX

With the foregoing much simplified precis in mind, attention will now be directed to the physical aspects of the present invention. In reference to FIG. 1 there is shown a block diagram of a telecommunication switching complex 14 comprised of interconnected switching systems 10a-d. Some systems, depending on the need, may not have attendant consoles 56 but rather may depend on the services of an attendant located at a central switching system 10a. The resident telephone users of each switch may communicate with nonresident telephone users (located at another switch) via the tie trunks which serve to interconnect each of the switching systems. Additionally, communications with telephony equipment beyond the switching complex 14 may be carried on via central office trunks 20 connected to the central switching system 10a. In this manner the attendant located at the central system 10a may dispatch incoming central office calls to the respective destination station sets located therein or within one of the other switches 10b,c,d. Of course, many other interconnecting configurations and CO trunk connections may be desired depending on the particular application.

III. EXEMPLARY SWITCHING SYSTEM

A. Switching Network (FIG. 2)

Figure 2:
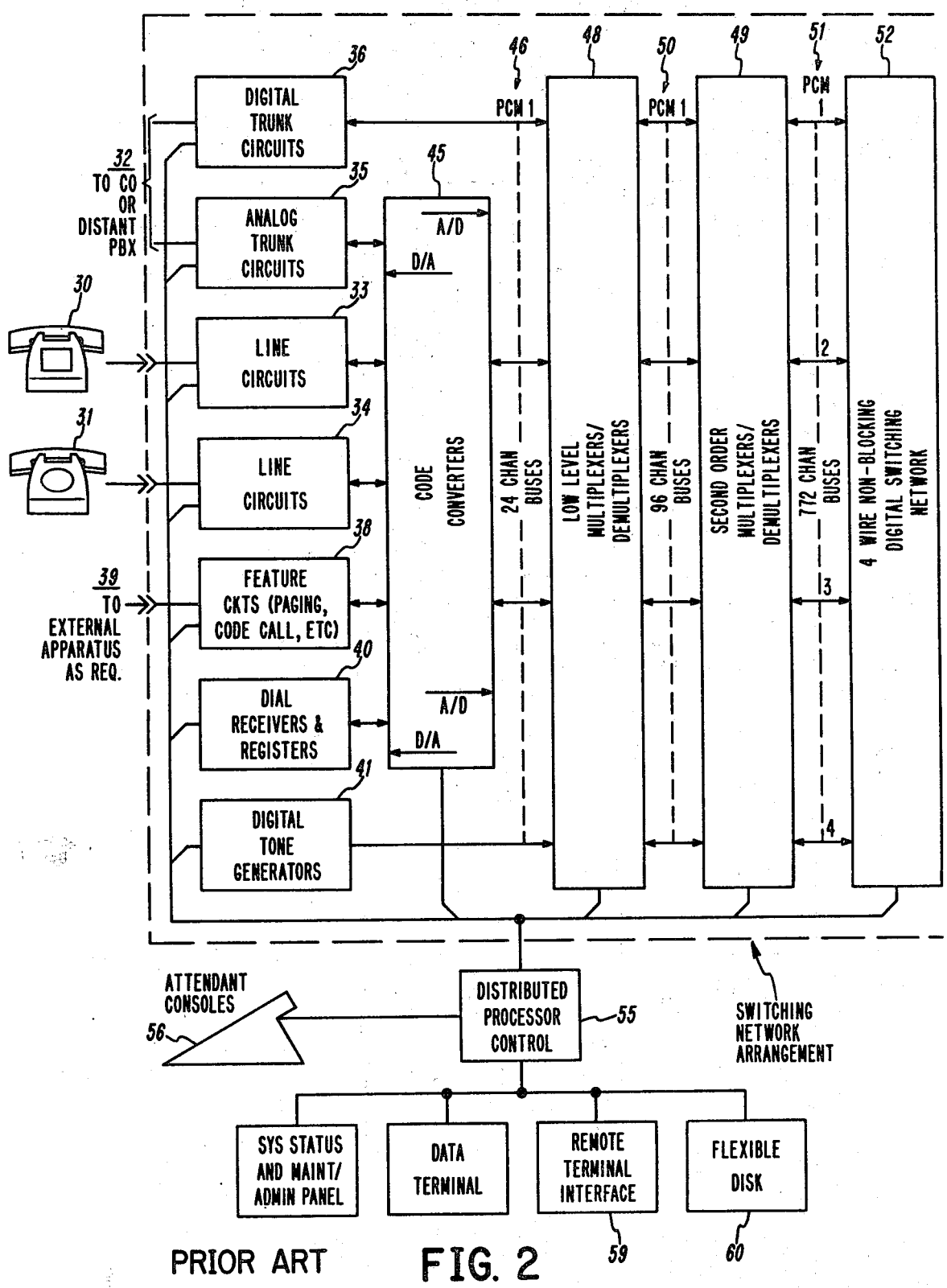
FIG. 2 is an overall block diagram of a telecommunication switching system considered to be a preferred environment in which the present invention may be practiced.

Now referring to FIG. 2, there is shown an overall block diagram of a telecommunications switching system intended to serve as an exemplary environment for the processor control means, memory structure and organization of the present invention. The system is adapted for connection to a plurality of lines represented by telephone instruments 30, 31, and also to a plurality of trunks generally indicated at 32.

Included within the block labeled "switching network arrangement" are circuit blocks generally representing the components of the system. Circuitry is provided to interface lines and trunks to the switching system, such circuitry being represented by line circuits 33, 34, analog trunk circuits 35 and digital trunk circuits 36. Since the switching system is of the four-wire variety, the line circuits 33, 34 and the analog trunk circuit 35 include hybrids for converting the two wire line signals to four wire for use by the switching system. Additionally, and as will be explained in greater detail below, the line circuits, 33, 34 and the trunk circuits 35 include appropriate sense points for indicating the status of the lines or trunks to which they are connected and also appropriate control points for allowing the switching system to control the status thereof. The digital trunk circuits 36 are shown for sake of completeness. Such circuits are intended to directly interface a T1 digital line to the switching system without the need for code conversion of any sort.

In addition to establishing and maintaining the "standard call" connections between lines and trunks, the system is capable of providing additional functions, such being represented by element 38. For example, the system may be configured to carry out, as optional functions, paging, code call, multi-port conferences and the like. Additional apparatus as required, for example audio equiment for use with the paging function, is indicated generally at 39. One of the principal aspects of this invention is the configuration of the data base memory portion of the control unit which provides the requisite data for the processor to perform these optional functions, as well as the standard call function.

Means are provided for receiving and storing dialed digits used by the processor control in establishing connections between the lines and trunks as required. Such equipment, generally indicated at 40, may include both dial pulse receivers and DTMF receivers, the general term dial receivers being used to encompass both. In addition, the equipment includes registers for storing the digits as they are received.

In order to inform the user of the response of the system to his request, progress tones are required, such tones in the instant embodiment being produced by digital tone generators 41. The tones produced by such generators include dial tone, ring back, busy tone and the like. While analog tone generators may be utilized, the digital tone generators 41 of the instant embodiment eliminate the need for code conversion, and are therefore directly compatible with the switching system.

As noted above, the switching system is configured as a four wire digital system and therefore requires conversion between the analog information on the trunks, lines and the like to digital format. To that end, a plurality of code converters are provided as indicated generally at 45. In the preferred embodiment the digital code utilized is compatible with North American Industry standards, utilizing an eight-bit format, a 1.544 megabit transmission rate and compression scheme with $\mu$ equal to 255. As a result, the code converter block 45 may be comprised of a plurality of rather conventional T1 PCM code converters, each capable of handling 24 channels, and each providing analog to digital conversion in the direction toward the network and digital to analog conversion in the direction toward the lines and trunks. A practical embodiment of the illustrated switching system was configured to handle a maximum capacity of 3088 channels, 3072 active channels and 16 lost to framing. Such a system would require approximately 128 code converters, each capable of handling 24 channels, thereby providing at the output of the code converters 45 a plurality of 128 serial PCM buses 46, each carrying bidirectional information for 24 channels. (Note that the 24 channel buses are serial.)

In order to properly route the coded signal samples from the lines to the network for efficient switching, and from the network to the lines for distribution, a pair of multiplexers are provided, indicated as first order or low level multiplexer 48 and second order or high level multiplexer 49. The low level multiplexer 48 arranges the incoming information from the code converters into 32 buses 50 each carrying serial information for 96 channels. The high level demultiplexer performs the complementary function in the opposite direction. The high level multiplexer 49 receives the information on the 32 incoming buses, converts it to parallel and arranges it on four parallel buses 51 each carrying information for 772 channels. The high level demultiplexer performs the complementary function in the opposite direction. The four 772 channel buses are provided to the four wire non-blocking digital switching network 52 which serves to switch in time information from selected channels for the purpose of completing connections between those channels.

The configuration of the digital switching network itself is known, being explained, for example, in "A Review of Telecommunications Switching Concept—Part 1" and Part 2 thereof, published in Telecommunications, February 1976 and March 1976, respectively. Suffice it to say that the network, or each block thereof includes an information memory having individually addressable locations for each channel in the system. Information received and processed through the code converters is multiplexed onto the appropriate busses where such channel occupies an indicated time slot. This information is sequentially written into the dedicated memory locations, with all samples being updated each 125 microseconds. For the purpose of making connections, the network, or each block thereof includes one or preferably two connection memories, each having an addressable location dedicated to each channel in the system. A connection is established by writing into the slot in the connection memory the address of another channel to which that slot is to be connected. Thereafter, during the time slot for the first channel the information memory is written with the data from that channel and also data is read out of the information memory at the address established by the connection memory, thereby placing the sample from the second channel into the time slot for the first channel for return to the first channel. Subsequently during the occurrence of the time slot for the second channel a similar occurrence takes place with the result being that samples from the two channels are swapped in time causing the first channel to receive samples from the second channel and vice-versa. In short, a communication path is established.

In order to efficiently accommodate the 3072 channels, the network is preferably broken into four blocks. Each block writes information to only one-fourth of the total number of channels, that is 772 channels. However, to provide full availability, information from each channel is written into each of the four blocks.

III. B. Common Control

The interaction between the elements of the system described thus far are under the control of the distributed processor control 55. The control unit detects requests for service from lines, trunks and the like, determines available class of service for those elements and completes connections in the network. To that end the distributed processor control 55 has circuit connections to the line circuits 33, 34, and specifically to sense points thereof for detecting the on-hook or off-hook condition of the lines and changes between such conditions, and to control points thereof for starting or terminating ringing to selected lines. The control unit 55 also has circuit connections to the trunks, and specifically to the sense points for detecting the conditions thereof and to control points for controlling such conditions. Similar connections are provided to the feature circuits 38. The control unit 55 also has circuit connections to the dial receivers and registers 40 to cause those receivers to collect dialed digits, and to receive the collected digits for the purpose of completing connections. The control unit 55 also has indirect circuit connections to digital tone generators 41, the code converters 45 and the multiplexers 48, 49. Connections are also provided between the control 55 and the network 52 for allowing the control unit to write addresses into the connection memories for the purpose of establishing connections.

The system also makes provision for attendant consoles 56 which typically include an array of indicators or readouts for informing an attendant of system conditions combined with an array of pushbuttons for allowing the attendant to cause the system to perform specific functions.

Finally, for the sake of completeness, additional elements are shown connected to the distributed processor control 55, including a system status and maintenance administration panel, generally located in the equipment frame for informing a craftsperson of the operational status of the equipment. A data terminal provides a port for entry of information into the system, such as for changing number assignments, and for read-out information from the system, such as traffic information or the like. A remote terminal interface 59 allows the processor control 55 to be accessed from a remote location for the purpose of trouble-shooting or updating of the program. Finally, a flexible disc 60 contains the operating program for the system, and may be automatically actuated to reload the program in the event of a major system failure.

In summary, each line circuit (a practical embodiment of the system provides for 2304 maximum), each trunk circuit (the same practical embodiment provides for 576 maximum) and each register (illustratively, sixty-four) occupies a dedicated channel on one of the code converters within converter module 45. Those channels are multiplexed through multiplexers 48 and 49 such that ultimately each line, trunk, register or tone occupies a dedicated channel on one of the 772 channel network buses. During a simplified call processing routine, the control processor 55 detects through the sense points a subscriber off-hook condition while scanning the array of sense points. Upon detection of the off-hook, the call processor ultimately establishes network-through-connections by writing corresponding addresses into the connection memories in the network. The PCM encoded samples received from the lines, trunks, or the like are exchanged between called and calling subscribers every 125 microseconds. When the network-through-connection is established by the processor, the network memories accept the PCM encoded samples from subscriber A during subscriber A's dedicated time slot and store that sample until the occurance of the subscriber B time slot. Thereupon as the network memories and connection memories pass on the PCM encoded sample of subscriber A and accept for storage the PCM encoded sample of subscriber B to be passed on during the reoccurrence of the subscriber A time slot. This action continues independently of the processor until a call termination or other action is sensed whereupon the connection may be cancelled or altered via a further writing of addresses into the network connection memories.

B. 1. Distributed Microprocessors (FIG. 3)

Figure 3:
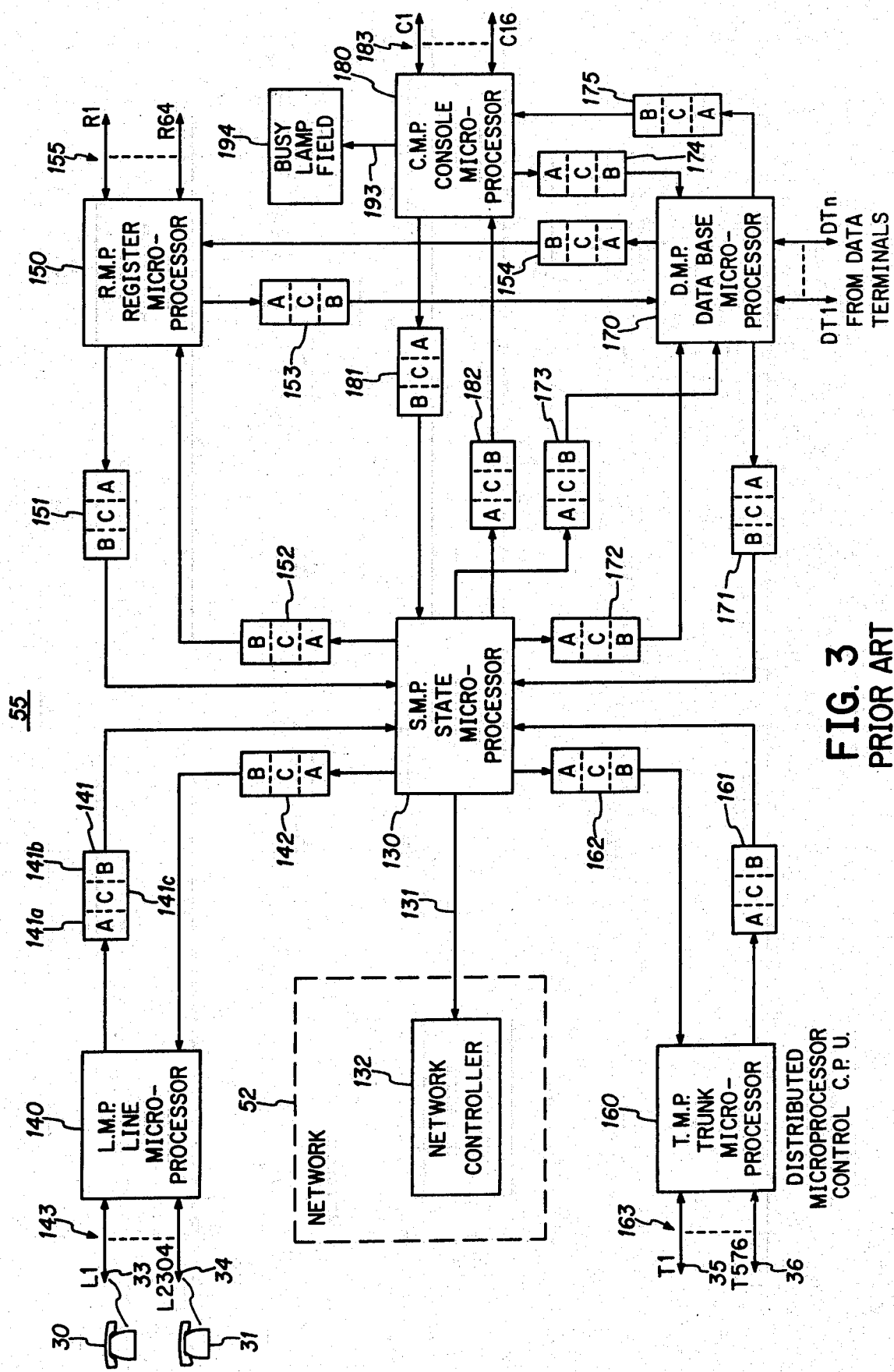
FIG. 3 is a block diagram showing the arrangement of the distributed processors of the control portion of the system as illustrated in FIG. 2.

Turning now to FIG. 3, the microprocessor control 55 is shown in greater detail, illustrating the system architecture. The control 55 which, taken as a whole, controls all of the functions among a plurality of microprocessor controls, in the exemplary embodiment of FIG. 3 comprising state microprocessor control 130, line microprocessor control 140, register microprocessor control 150, trunk microprocessor control 160, data base microprocessor control 170 and console microprocessor control 180.

It should be noted at the outset that this particular distribution of microprocessor controllers, while perferred, is merely exemplary and that in some conditions the switching functions may be distributed in a different manner. For example, in a smaller system the functions of the line and trunk microprocessor controls might be combined to eliminate one of such controls.

In contradistinction to conventional monoprocessor configurations wherein the sub-units communicate via a common bus under the control of an executive, the microprocessor controls of FIG. 3 are interconnected via dedicated communication channels joining partner processors such that the partners can exchange information as necessary while operating asynchronously of each other. Thus the processors can each be provided with their own clock which need not be phase locked to the clocks of the other processors. In addition, the interactions between the programs of the respective processors are greatly simplified.

B. 2. Alternative Embodiment—Single Processor

A practical, alternative embodiment of the inventon has been constructed in which a single processor is utilized in the control unit 55 to carry out the functions performed by the multi-processors as herein shown and described. In that alternative embodiment, essentially the same division of tasks disclosed herein to carry out a total system function as achieved by operating the single microprocessor in separate program controlled modes corresponding, substantially, to the modes the individual and discrete microprocessors of the control unit 55 are operated under their individual program control. Thus, it was possible to utilize the same programming approach with the single microprocessor control 55, and in many cases to utilize the same programs of the multiple levels described and shown.

The practical embodiment of the invention utilizing the single microprocessor control unit 55, was constructed to serve fewer trunks and lines than the system described herein and to provide fewer functions and features. Nevertheless, the alternative embodiment of the invention provided a highly practical multi-featured system at relatively lower cost.

B. 3. Multi-processor Embodiment—Interprocessor Buffers (IPBs)

In the illustrated preferred embodiment whose multi-processors are utilized having communication paths between partner processors, such communication paths are provided by means of interprocessor buffers which function as asynchronous simplex communication channels which have a limited amount of storage capacity for data being transmitted between partner processors. Such channels are provided only between processors which have a need to communicate. Thus, the line microprocessor which must communicate only with the state microprocessor has a first interprocessor buffer 141 for carrying data in the reverse direction. Because the interprocessor buffers are alternately under the control of the sending and receiving microprocessors, depending on whether it is accepting data from the sending processor transmitting data to the receiving porcessor, each buffer may be thought of as comprising a sender buffer and receiver buffer. This is illustrated, for example, by interprocessor buffer 141 having sender section 141a connected to the line microprocessor and receiver section 141b connected to the state microprocessor. As noted above the interprocessor buffer includes a limited amount of storage for data being transferred. Because it is convenient to use the same storage for both the send and receive side buffers, it is useful to think of each buffer as having a third section, for example section 141c as memory means accessible to both send control 141a and receive control 141b. To that end each of the interprocessor buffers illustrated on FIG. 3 is shown as a rectangle with internal dotted divisional lines providing send side control a, receive side control b and intermediate memory means c.

B. 4. Multi-Processor—Individual Microprocessors Line Microprocessor—LMP

Referring now in greater detail to the illustrated architecture of the processor control of FIG. 3, it is seen that the line microprocessor 140 is provided with bidirectional communication paths 141, 142 for communicating with the state microprocessor 130. In the illustrated configuration the line microprocessor 140 need not communicate with any of the other microprocessors. The function of the line microprocessor is to service the line circuits by detecting requests for service and communicating those requests, either directly or indirectly, to other processors of the control, and to exert some control over the line circuits, in the illustrated embodiment such control being the initiation or termination of ringing on the lines. To that end the line microprocessor 140 has circuit connections to the line circuits 33, 34 to which the telephone instruments 30, 31 are connected. The two illustrated line circuits and telephone instruments represent the entire range of lines which the system may service, that fact being indicated by designating the line circuits as L1-L2304, showing that the system is capable of handling up to 2304 lines. The circuit connections to the line circuits are specifically an array of sense and control points which the microprocessor is capable of addressing as memory. In other words, a block of addresses of the line microprocessor 140 are dedicated to line cicuits, and when the microprocessor addresses any location within that block, it is then in communication with the sense or control points rather than actual memory. As will be described in greater detail below, the sense points are controlled by the respective line circuits to indicate the status of the associated line. The line microprocessor continues to scan the sense points to detect significant changes of state, and to communicate such state changes to the state microprocessor via the interprocessor buffer 142. As a result, the system is capable of detecting requests for service, call terminations, hook switch flashes, dial pulses and the like.

The circuit connections 143 are illustrated as bidirectional, indicating that the line microprocessor is also capable of sending data to the line circuits. In the illustrated embodiment, this feature is used to control ringing in the lines. When the control complex determines that a particular line is to be rung, that fact is communicated to the line microprocessor 140 by the state microprocessor 130 via the interprocessor buffer 141. The line microprocessor 140 responds by addressing the word including the line circuit of interest and writing the control point of the particular line circuit in that word which sets a latch to apply an external ringing generator to that line. The line microprocessor continues to perform other tasks while the line is being rung. If the party answers, the line circuit detects the on-hook to off-hook transition during the normal scanning of the sense points just as the initial request for service was detected. It communicates that fact to the state microprocessor and it also writes a reset to the appropriate control point ringing from the line. Although the description of that operation might take some moments to read, the operation itself is carried out almost instantaneously.

Trunk Microprocessor—TMP

For performing operations analogous to those of the line circuit for the trunks in the system, the trunk microprocessor 160 is provided with bidirectional communication paths 161, 162 to the state processor and bidirectional circuit connections 163 to sense and control points in the trunk circuits 35, 36. Just as with the sense and control points of the line circuits, the sense and control points of the trunk circuits are addressable as memory, and blocks of memory for the microprocessor are dedicated to such sense and control points. Because trunk operation is somewhat more complex than line operation, each trunk circuit has four sense and four control points. Accordingly, if the sense and control points are configured as eight bit words as in a line circuit, each word will accommodate only two trunks.

The trunk microprocessor 160 continually scans the sense points via circuit connections 163 to detect significant sense point transitions. Upon detection of such a transition, an appropriate control message is configured and relayed to the state processor 130 via interprocessor buffer 161. Because of the wide variety of trunk types and signaling protocols, the trunk microprocessor must reduce all trunk signaling for any trunk type to a common set of standard messages such as trunk disconnect, stop dial, etc. Upon receipt of such a message the state processor 130 determines the appropriate action, configures an appropriate control message to carry out such action, and communicates such control message to the trunk microprocessor 160 via the interprocessor buffer 162. The trunk microprocessor 160 responds by writing the appropriate control point of the trunk in question via the circuit connections 163.

Register Microprocessor—RMP

As noted previously, the system includes a plurality of dial receivers and registers for receiving dialed information from the various network ports by way of the network. For receiving and analyzing dialed information, a register microprocessor 150 is provided having bidirectional communication paths provided by interprocessor buffers 151-154, and circuit connection 155 to the registers in the system. When the state microprocessor 130 determines that dialed digits are to be received, after connecting an idle receiver to the appropriate port, it sends a message to the register processor via the interprocessor buffer 152 defining the type of digits to be collected. The register processor monitors the receiver dial pulses or DTMF tones via the circuit connection 155 until the first digit is recorded. Once recorded, the first digit is sent to the data base processor via the interprocessor buffer 153 with a request for a first digit translation to define the number of digits to be received. The register processor 150 continues to receive digits and awaits a reply message from the data base microprocessor which is communicated via the interprocessor buffer 154. The register processor takes in the expected digits, and after all digits have been received sends them along with identifying information to the data base processor via the interprocessor buffer 153. Thereupon the data base processor communicates with the state processor 130 for completing the connection.

State Microprocessor—SMP

As can be appreciated from the previous mentions of the state microprocessor control 130 in connection with description of the other microprocessor controls, the state microprocessor control is a focal point of the processor control in that it communicates with each of the other microprocessor controllers. The state microprocessor maintains a record of the current state of activity of each line, trunk and register in the system. Incoming interprocessor buffer messages from the various controllers inform the state microprocessor of progress by devices in the system. As a generality, the state microprocessor considers the current state of a device and the devices to which it is connected, the current incoming interprocessor buffer message, and the relevant class of service information to determine what next state the device in question should acquire. Having determined the next state, it accomplishes that either through appropriate interprocessor buffer messages to the partner processor processors, or by way of establishing connections in the network. The state microprocessor has circuit connections indicated at 131 to the network 52, and specifically to network controller 152 which is illustrated as a portion of the network. The network controller 152 serves to interface the state microprocessor output lines to the network, and specifically to the connection memories. The network is thus available to the state microprocessor and addressable as memory. The state microprocessor writes appropriate messages in the connection memories described above in order to make connections between the ports in the system.

Console Microprocessor—CMP

For interfacing the processor control to one or more attendant consoles, up to a maximum of 16, circuit connections indicated at 183 are provided interconnecting such consoles to the console microprocessor 180. It should be noted in passing that attendant consoles are not necessary to the operation of the system but are provided only when desired. The console microprocessor receives messages corresponding to button pushes at the attendant consoles via the circuit connections 183; analyzes the messages, returns messages that will light appropriate lamps on the attendant consoles via the circuit connections 183. In addition, the console microprocessor sends commands to the state processor 130 via the interprocessor buffer 181 to keep the state processor properly informed of device states, and to request the state processor to make appropriate connections. The console microprocessor 180 also receives messages from the state processor 130 via interprocessor buffer 182, such commands by the state processor directing the console processor to attend certain calls.

The console microprocessor also communicates with the data base microprocessor 170 via interprocessor buffer 174, for example to request class of service information, and receives messages from the data base microprocessor via the interprocessor buffer 175, for example, responses to class of service requests.

It was noted above that an optional busy lamp field 194 may be provided with the attendant's console to indicate the status and allow direct station selection for selected ones of the system lines within particular groups. To accomplish that it is necessary to provide communications between the busy lamp field and the console microprocessor 180, such communications being accomplished via unidirectional line 193. In addition, the busy lamp field 194 has indirect simplex communication with the state microprocessor via the console interprocessor buffer 182, such buffer allowing the state microprocessor to issue busy/idle information to the busy lamp field 194.

It is noted in summary that the processor control architecture described above simplifies both programming and communication between processors in the distributed control unit by providing dedicated channels only to processors which must intercommunicate. In the simple case of the line or trunk microprocessors, communication is provided only between such processor and the state microprocessor. In that case, two interprocessor buffers are required one to route information in each direction. The interrelationship between the register, data base and state microprocessors, detailed more fully hereinafter, indicates a more complex situation where the register and data base microprocessors must communicate not only with the state microprocessor, but also with each other. The bus structure described in detail above serves to accomplish this function. Also worthy of note are the interprocessor buffers 172 and 173 which both communicate data from the state microprocessor to the data base microprocessor, indicating that more than one such buffer may be provided to assure adequate communication over a path expected to be busy.

IV. DATA BASE MICROPROCESSOR STORES (FIGS. 3-6)

While the foregoing generally describes the system operation and particularly the operation of the distributed processors to carry out system functions, in order to describe that portion of the system to which the present invention is primarily directed, reference should be made to FIGS. 3-6.

Within the processor control 55, the register 150, data base 170, and state 130 microprocessors (RMP, DMP and SMP) form a subgroup performing particular and unique operations in executing the system functions.

In carrying out the invention, semiconductor memory devices and circuits are provided for storage of data utilized in the performance of system functions, and the data base microprocessor 170 is connected to retrieve required data from these memory stores upon request from other processors of the control unit 55.

Among these data base stores are:
Directory Number Table (DN)
Class of Service tables (NSN/COS)
First-Digit Translations (1st Digit TR)
Group Hunt Tables
Restriction Tables
Call Forwarding Tables
Speed Dial Tables The data base microprocessor 170 maintains two-way communications through the IPB's 153, 154, 171, 172, 173 with the state and register microprocessors 130, 150. The primary interchange of information comes in the form of requests for data concerning a particular network slot number of directory number and is delivered as the data is requested. The data base microprocessor 170 is driven primarily by the request commands from other processors. It has no sense points that input call-processing stimuli.

While not the largest memory area within the data base stores, the directory number table 300 (also labeled DN), serves a primary role in providing data utilized in the execution of system functions. Recalling the emphasis earlier on the point that with the present system a dialed number represents a system function, it is the directory number table 300 which provides the means for correlating the dialed number and the system function. To this end, the directory number table 300 provides a multiplicity of memory locations, each one addressed by certain digits of the dialed number and having stored therein an identifier word including an instruction portion to carry out one of the operational functions which the system is capable of performing. The data base microprocessor 170 is operable to read the identifier word stored in a memory location corresponding to a dialed number. Based on the instruction portion thereof the data base microprocessor is operated under program control to assemble and transmit a command message to one or more other processors. The command message, designated by the reference code and the instruction portion, is transmitted to other microprocessors to be executed in carrying out the designated function.

The execution of system functions to connect lines to lines or lines to trunks in either the incoming or outgoing direction, requires a significant quantity of data in addition to the instruction designating the system function. In the case of calls between stations on lines directly served by the system, that significant amount of additional or supplementary data includes, for example, (1) the network slot number (NSN) of the dialed station along with (2) the class of service (COS) data for the originating and the terminating station. Also needed is the customer group of the originating and terminating stations (CG#).

As described in detail in U.S. Pat. No. 4,259,549 the processor control of the exemplary system performs the requesite operations to carry out the primary designated functions of; the standard cell, the conference call, group hunt, call pick-up, speed call, and miscellaneous. While one or more of the noted functions are executed in response to a dialed number, the switching system described therein yet operates in the traditional manner in communicating with other switching systems. The present invention, however, takes advantage of a different memory store architecture to streamline the control unit processing to expedite inter-switching system communication as soon as a switching system has determined that its resident user requires the services of another switching system within telecommunication complex 14.

By utilizing the memory stores in a manner to be discussed, a uniform numbering plan across all the systems within the complex may be obtained whereby certain directory numbers are designated as identifying a system's resident stations (stations served by the switching system). On the other hand, directory numbers are also specified as identifying nonresident stations serviced by other interconnected switching systems. In addition, these aspects of the present invention are not limited to station extension numbers but are extended even to access codes and feature codes representative of functions capable of being performed in the destination switching systems. Thus, references to "directory numbers" are intended to include all numbers dialable by station users. For instance, a system not having an attendant operator will recognize that a dialed "0" should be immediately transferred to a system having an attendant, the digit transfer all unbeknownst and thus transparent to the user. The organization of the memory structure will now be discussed in terms of the manner in which the various processors execute the system functions to achieve a desired result.

IV. A. NSN/COS Table (FIG. 4)

As indicated, the data base stores associated with the data base processor 170 comprise a plurality of tables and data fields in addition to the directory number table 300. The largest such table is called the NSN/COS table 310, and is organized by network slot number (NSN) to provide data for each network slot number. The data stored in this table 310 (FIG. 4), for each network slot number includes originating and terminating class of service information (OCOS,TCOS). Access code class of service data (ACCOS) is provided, designating whether each particular network slot number is permitted to invoke the function represented by a particular access code. The directory number for the network slot number is provided, for reverse translation. The customer group (CG#) for that network slot number is also provided. Other data such as trunk group access codes (TGAC) may be provided, as desired.

The practical embodiment of a switching system constructed in accordance with the invention described hereinbefore, provides 3,072 network slot numbers; providing ten bytes of information for each network slot number means that the total amount of memory capacity required for this table 310 is 30,720 bytes.

Figure 4:
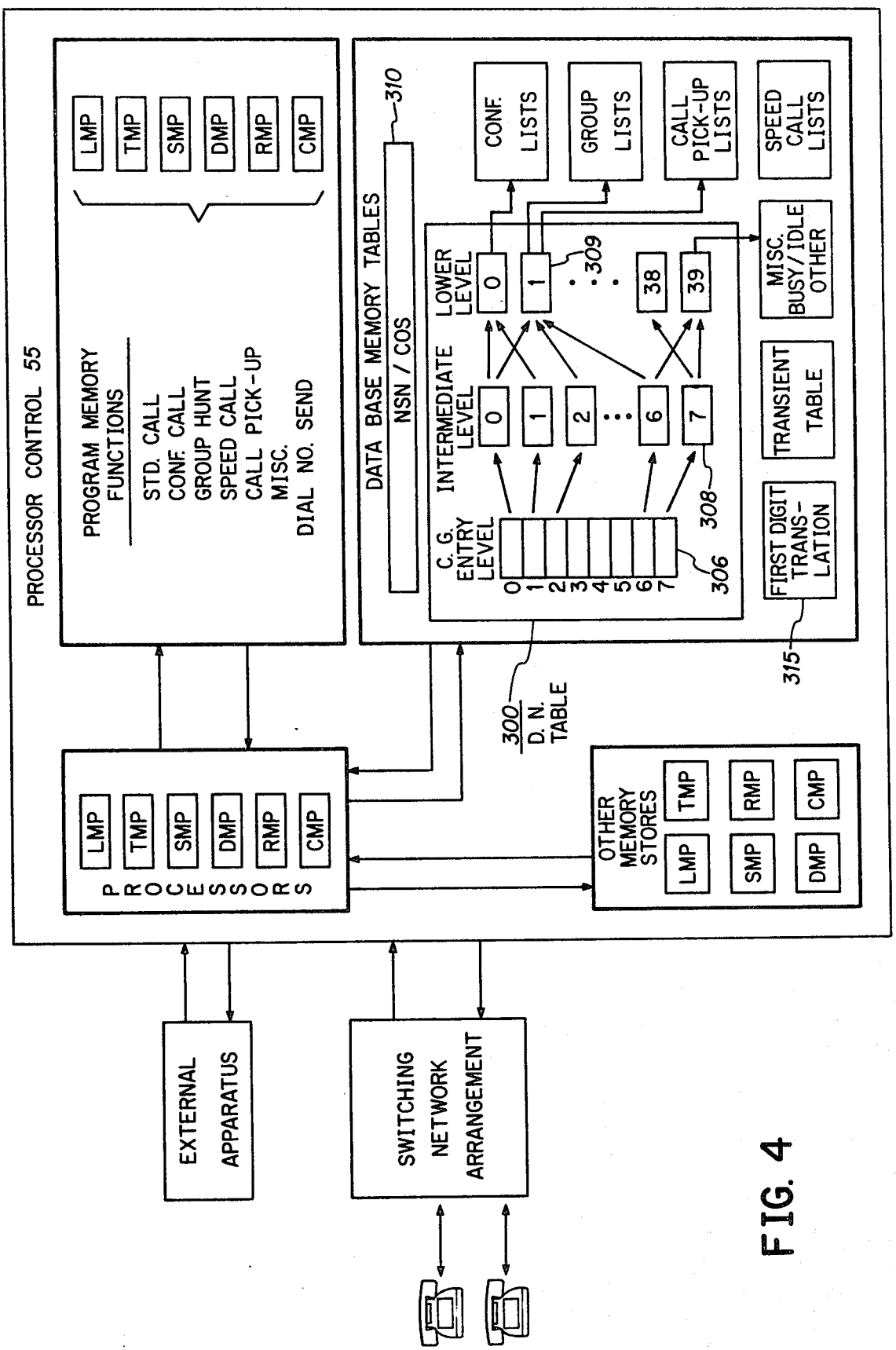
FIG. 4 is a block diagram showing the data base and program memory architecture of the control portion of the system.

The data base memory, therefore provides the requisite data for all the system functions, in addition to the data from directory number and NSN/COS tables 300, 310, and a multiplicity of other tables as generally shown in FIG. 4. Before detailing the structure and organization of the data base memory in regard to tables and other forms of storage of this supplementary data, the organization of the directory number table 300 will be described, because of the primary role played by that table in the operation of the system.

Figure 5:
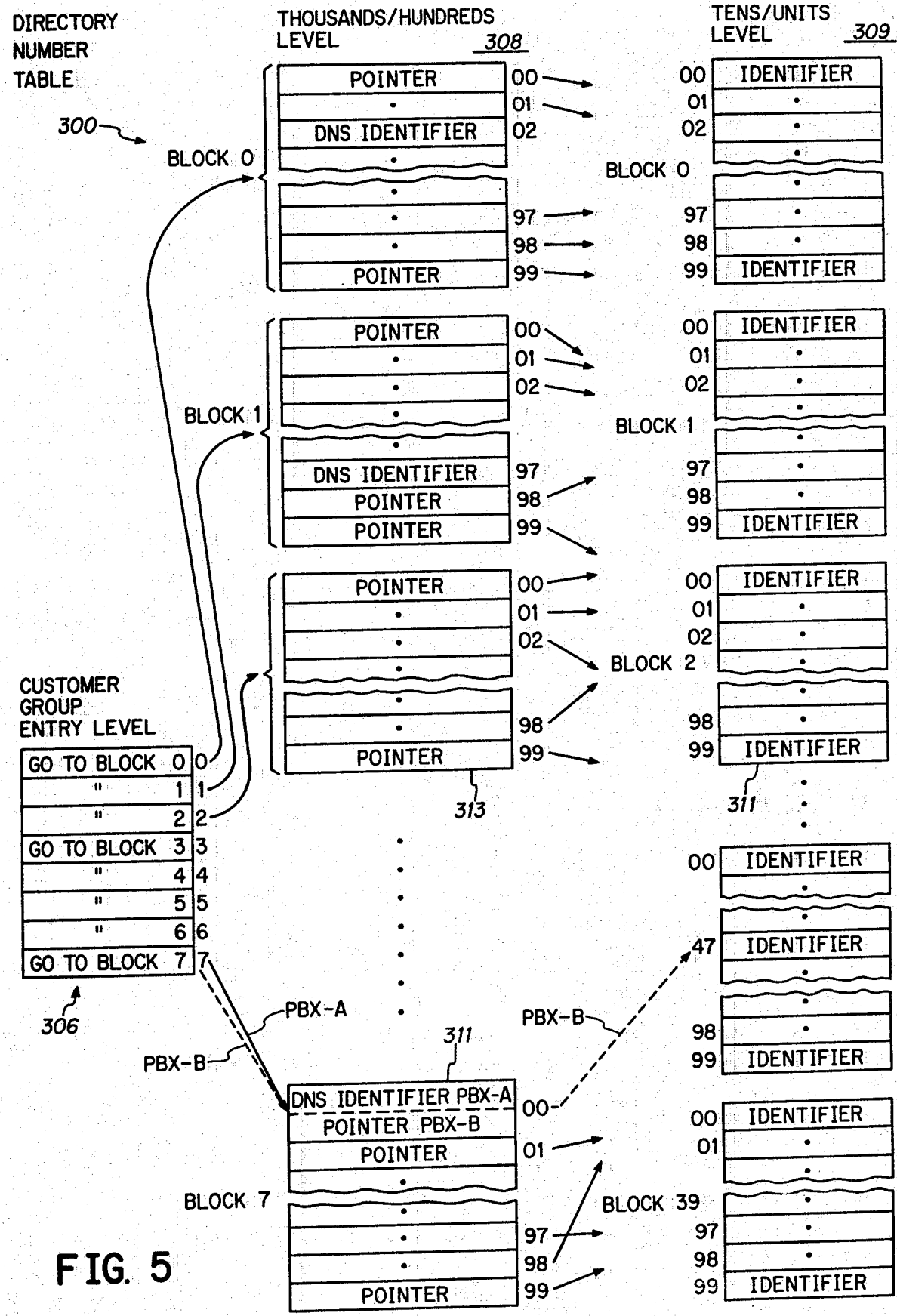
FIG. 5 is a schematic illustration of the organization of the directory number table included in the data base memory structure.

IV. B. Directory Number Table (FIG. 5)

In carrying out the invention, the correlation between the dialed directory number and the designated system function is established in the directory number table 300 by utilizing, in addition to the directory number, the customer group number of the originating station as a means for addressing the table. As herein shown, this table 300 (FIG. 5) is a multiple level table in which the various levels may be linked by pointers 313. Thus, addresses stored in locations in the entry level 306 point to blocks of locations in an intermediate level 308, which in some instances contain addresses pointing to blocks of locations in a third, lowest level 309 having either (a) a pointer to other memory areas having the required data, or (b) the required data itself. The instant invention, in the case of nonresident directory numbers, provides for storing the identifier word, and not a pointer, at the intermediate level (and sometimes the lower level) so that a full translation of an exemplary four-digit directory need not be made by a system not servicing the feature or station representative of the dialed number.

Specifically, in the directory number table 300, the entry level 306 has a block of locations (for example, eight) corresponding to the total number of "customer groups" for which a system is intended to provide service. The particular one of the locations in this entry level block addressed in response to a dialed number, is identified by the customer group number of the originating station, which is determined from the equipment address of this originating line or station, or incoming trunk identification number, and supplied to the data base processor 170 with the directory number. It should be understood that each system comprising the exemplary complex 14, contains a memory store architecture as herein detailed.

To reiterate, the term "customer groups" means groups of stations served by the system hardware in such a manner that calls for each group of stations are processed separately from calls within another group. Thus, in accordance with the present invention each of the plurality of systems is equipped so that more than one group of "customers" can share a single system hardware.

With the memory sturcture and organization shown, a system provides up to eight "customer groups". Eight different groups of stations may thus independently share each system. Each system 10a,b,c,d, keeps track of the eight different "customer groups" and establishes and maintains all calls separate within their respective groups. Thus, normally all calls are between stations within the same group unless, as a permitted class of service and data base arrangement, originating stations in one group can connect to terminating stations in a different customer group.

In accordance with one aspect to the present invention there is provided between each switching system having common customer groups at least one interconnecting tie trunk per customer group. This aspect allows each customer group to be extended beyond individual switching systems. To that end each switch dedicates a network slot number to each interconnecting trunk and thereby is able to maintain customer group identities throughout the complex 14. For simplicity, the interconnecting trunks of FIG. 1 are actually a plurality of trunks as heretofore indicated.

One of the features of the system is that the same directory numbers may be used in different customer groups throughout the complex. This follows from the structure and organization of the data base memory which will be discussed in terms of the directory number table 300.

As noted above, the entry level 306 of the directory number table 300 has a block of eight locations corresponding, respectively, to the eight customer groups. Also as earlier noted, the initial step in processing a dialed directory number occurs when the line processor 140, during its scan program, detects a new off-hook condition on a previously idle line, determines the network slot number (NSN) for the originating station from the equipment address, and supplies that NSN data, along with an "originating line" message, to the state microprocessor 130.

The customer group number (CG#) for the originating station is also obtained by the data base microprocessor 170 from the same area of the NSN/COS table 310.

The use of the dialed number and the CG# in conjunction with the directory number table 300 will be discussed in detail in an example which follows later.

The lowest level 309 of the directory number table has a set of (for example, up to forty) blocks, each one of the forty blocks containing one hundred locations. Each block of one hundred locations is pointed to by a pointer address 313 in the intermediate level 308 of the table. The two lower order (tens, units) digits of the dialed directory number are used to identify the particular location in the one of the lowest level 309 blocks pointed to by the block pointer address 313 read from the intermediate level 308. These lowest level blocks are thus, sometimes referred to herein as the tens/units blocks.

The specific number of separate blocks in the lowest level 309 depends on the particular system configuration and sets the limit of directory numbers permitted in a particular number plan. With forty such blocks, and one hundred locations in each block, a limit of 4000 directory numbers is set to identify the stations and features serviced by each system. The lowest level 309 locations generally contain identifier words derived from the directory number table for functions processed to completion within the particular switching system. For functions which must be processed to completion with the aid of another system within the complex, the special identifier words are generally located in the intermediate level 308 of the DN table 300, and when used at this level a whole block of 100 directory numbers, inclusive of the subject dialed number, will necessarily be resident in another switching system. The data associated with the identifier words may be utilized for transfer in the form of a message from the data base microprocessor 170 to another microprocessor for executing a function, or the data in the lowest level may comprise a pointer address to still a further table for obtaining supplementary data for use in carrying out the operational functions.

With specific reference to the directory number table 300 of FIG. 5 it should now be realized that the ultimate system function derived from the dialed directory number is obtained from this table. Furthermore, after the dialed number is correlated to a system function by the data base microprocessor 170 no further reference need be made to the DN table 300 in connection with carrying out the correlated system function. With that aspect in mind, it should be understood that an important object of the invention results from the placement of the system function identifier word at the intermediate level 308 of the directory number table 300. First of all, special identifier words may be placed at the intermediate level 308 only because the number plan, allocating specific groups of hundreds or thousands of directory numbers to different switching systems, allows the switching system not servicing the dialed directory numbers or features to determine whether the dialed number is nonresistant without performing a units/tens digit translation.

The exemplary four-digit station numbers constituting the majority of directory numbers further complement the noted advantage insofar as the processing of nonresident station numbers requires no memory storage area within the table lower level 309. This major advantage frees up the storage locations for use by other identifier words representative of system functions performed completely by the system or for identifier words corresponding to one or two digit directory numbers whose representative function requires the aid of another system located within the complex 14. Of equal importance, and in light of the fact that the generation of software represents a significant expense, is the fact that the data base generation is extremely simplified insofar as a single intermediate level identifier word takes care of one hundred nonresident directory numbers without requiring one hundred entries.

The intermediate level of the table 300 also has a set of eight separate blocks, each corresponding to one of the "customer groups" and each containing multiple locations (for example, one hundred locations in each block). Each one of the eight blocks is addressed by a pointer in one of the eight locations in the table 306 entry level. As noted, in the present system, the exemplary numbering plan involves the use of up to four digit directory numbers. The two higher order (thousands, hundreds) digits are utilized to locate the particular location in the "customer group" block in the intermediate level 308. These blocks are, therefore, sometimes referred to as the thousands/hundreds blocks.

IV. C Identifier Word Format (FIG. 6)

The format pattern of the identifier word is generally the same throughout the locations of the lower level of the directory number table 300. As shown in FIG. 6, the identifier words indicated by references 311b–311h comprise the set of function identifiers capable of being placed at the directory number table lower level 309. On the other hand, the dial number send (DNS) identifier word 311a format is structured to be placed at selected intermediate table level locaitons, in the midst of pointer words, and yet not be confused therewith. The identifier words 311 are two bytes in length and include a first three bit group 312 (indicated in words 311b and 311c) of signals, an OND bit and a second group 314 of signals. For identifier words located in the table lower level 309, the pattern of the three bits of the first group 312 represents a particular system function—that data can be considered an instruction. The bit pattern of the second group 314 represents the argument of the instruction, and directly or indirectly provides supplementary data required for executing the system function called for by the instruction portion 312 of the identifier word 311.

The fourth bit "OND" of all identifier words, when set, causes the dialed number to be displayed on a system console.

Special DNS identifier words 311a selectively placed at intermediate level locations also have a first three-bit group, however, this group does not form an instruction but rather is a particular bit combination which distinguishes the DNS identifier word 311a from all pointer addresses, also located at the intermediate level 308. The DNS descriptor bits of the identifier word 311a, being bits 5–7, allow the processor control to recognize the system function to be carried out to effect a desired result. The trunk group ID bits require only one byte of storage and the remaining vacant bit locations, indicated by the "X", are not processed and are thus "don't cares".

The format of identifier words 311c–311h provides for a three-bit instruction 312 which designates one of the system functions previously listed, for example; standard call conference call, group hunt, etc. The argument portion of these identifier words represents in most cases a network slot number or a pointer address to another table. In accordance with the present invention, the dial number send identifier words 311a, 311b have as their argument the trunk group identification number of the trunk directed toward the destination switching system serving the subject directory number. How the identifier word 311a, read from the intermediate level 308 location, is employed will be described in connection with the dial number send (DNS) call sequence which sequence involves at least two of the switching systems of the complex 14.

It will be seen that many nonresident directory numbers within a customer group having the same thousands/hundreds digits may terminate at the same location and thus have one identifier word 311a at the intermediate level 308.

From the foregoing it should be evident that the directory number (DN) table 300, which together with the means to access the table, serves as a dialed number to function translator and provides alternative ways of correlating different directory numbers with the same system function. The DNS identifier words 311a and 311b, designating a given system function, may be repeated in different locations in the intermediate level 308 and the lower level 309 respectively.

V. COMMAND MESSAGE FORMAT

The information format within any IPB instruction is a command message which consists of one or more information bytes. The first byte thereof is the reference code (see Table 2) and specifies the command corresponding directly to a task to be done within the receiving microprocessor. The number of subsequent information bytes varies from command to command, but is known for each particular command by the receiving microprocessor. If there is adequate capacity in the buffer, several command messages may be transferred at once. Specific commands and command formats are uniquely specified for the sending and receiving microprocessors. This is desirable to ease decoding and illegal state checking of command bytes and to ease system debugging and maintenance functions. The command code 00 (null) issued throughout the system is a stop/no-command indicator. Any byte that is 00 where a command code is expected means "no further information in this buffer."

Each IPB has receiving storage capacity of 16 bytes in length, the first byte of which is used both to carry data and as the ready/done flag for the IPB buffer. Command messages may be as short as two bytes or as long as sixteen bytes, hence a number of commands may be loaded into a single IPB transmission. The receiving microprocessor knows the number of bytes associated with each command, hence can unload the buffer without difficulty. The first zero byte encountered where a command is expected instructs the end of transmission.

In general the sending microprocessor only writes the IPB and the receiving microprocessor only reads. Some exceptions are as follows:

1. The receiving microprocessor may perform a dummy write to the location of byte #1 and cause reset of byte #1. This indicates receiver done.
2. The sending microprocessor may read byte #1 to determine whether the buffer is available (receiver is done).

The normal processing sequence is as follows:

1. The sending microprocessor loads the IPB, lastly loading the command byte of message #1 into byte #1 of the buffer.
2. The receiving microprocessor scans byte #1 of the buffer periodically and tests it for all zero. When a non-zero condition is found, the buffer is ready. The receiving microprocessor will re-read the first byte (to assure that the first read was not at transition time) and proceed to perform (one by one) the command messages contained in the buffer.
3. The receiving microprocessor will write to the location of IPB byte #1, resetting byte #1 to all zero.
4. If the sending microprocessor has command messages waiting to be sent, it periodically tests byte #1 of the IPB for zero. When the byte goes to zero the buffer is available and the microprocessor may load it again (Step 1).

Buffer Addressing

There are 256 locations of memory reserved in every microprocessor for buffer addressing. The sending and receiving microprocessors use identical addresses to access the buffers. There are two sets of address usage, one primarily grouped about the state microprocessor and another grouped about the data base microprocessor.

The overall buffer addressing plan uses the high order 8 bits as a displacement to the buffer location, the next four bits identify a specific IPB (1 of 16), and the final 4 bits select individual data bytes within the buffer.

The 16 byte length of the IPB buffers are depicted in appended Table 1 wherein designations are in hexidecimal format and "JJ" identifies memory displacement and "X" identifies buffer byte designation (1 of 16).

Program Hierarchy

Figure 11:
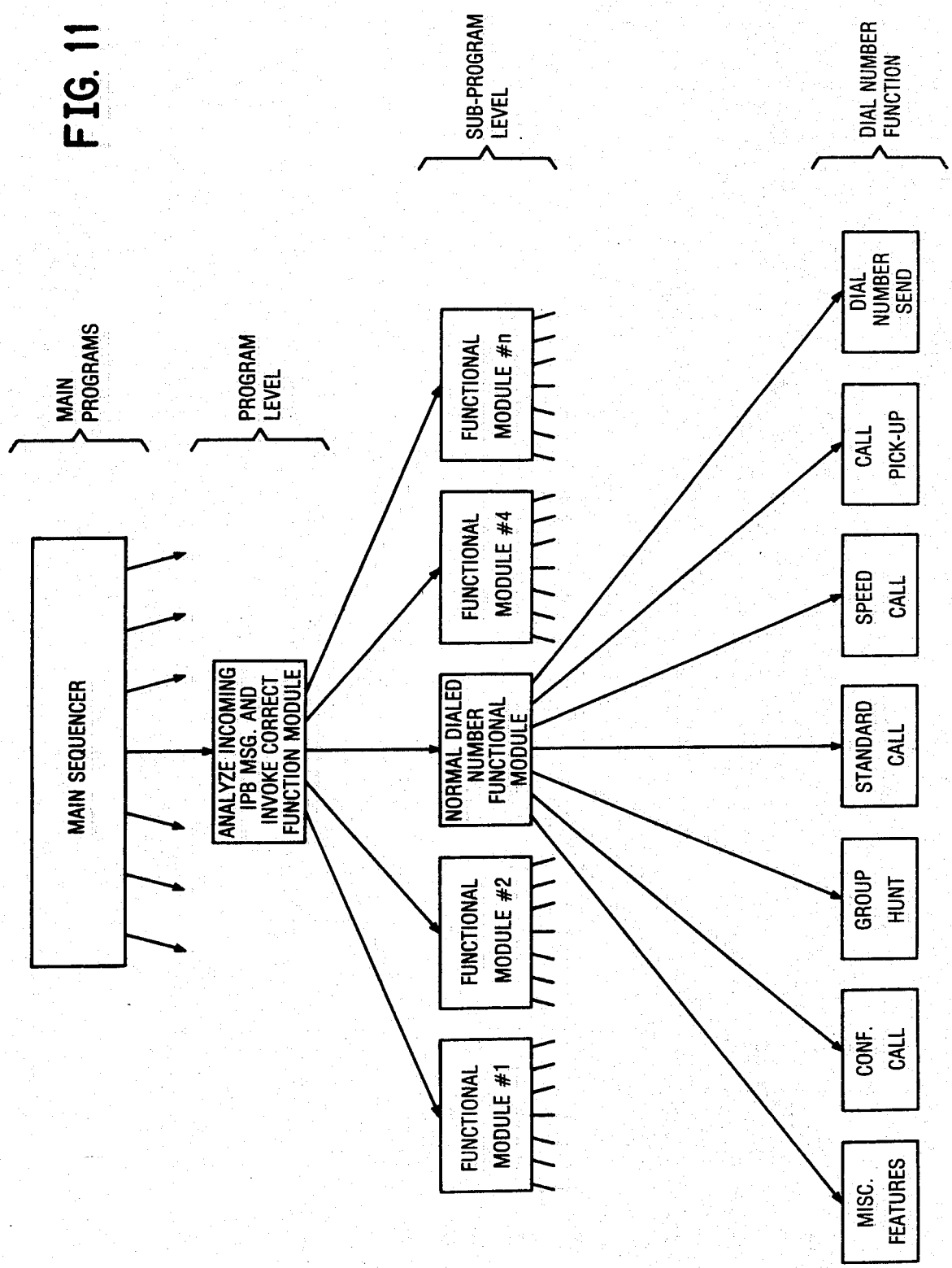

FIG. 11 graphically illustrates for the data base microprocessor 170, the multiple level hierarchial organization typical of all microprocessors in the control complex 55. The levels are main programs, programs, and sub-programs.

Main Program Level Routines—All Microprocessors

All microprocessors use these main programs:

1. Master Sequencer: This routine determines the sequence of services to be performed by invoking routines of the program level in a predetermined and established sequence. The Master Sequencer loops through the established sequence infinitely.
2. Time Interrupt Handler: A ten-millisecond interrupt is provided as the only call processing required interrupt in the switching system. The Time Interrupt Handler maintains a clock in memory that may be referenced by other routines for testing time dependent conditions.

Program Level Routines—All Microprocessors

1. IPB Loader

The programs concerned with loading a selected IPB and unloading data therefrom are uniform in all microprocessors. In the sending microprocessor, loading is done by a program after an IPB queue has been loaded by other sub-programs. In the sending processor this loading is done by a program that moves data from a portion of a 64 byte queue area within the processor memory to the 16 byte IPB. The 64 byte internal queue is a communications buffer between the call processing logic sub-programs and the IPB. The queue is desirable to:

1. Provide a holding area for outgoing commands during periods when the IPB is being unloaded (from the last IPB transmission) by the receiving processor.
2. Consolidate a number of commands, each considerably less than 16 bytes, into a single IPB transmission, thus making more efficient use of the IPB.
3. Accommodate activity surges that could momentarily overload the 16 byte IPB.

As selected sub-programs in a microprocessor create command messages, the same are loaded into the appropriate IPB queues. The buffer loader program is brought into action periodically by the processor main program. The buffer driver will test the queue for messages waiting to be sent, and if there are any, it will test byte #1 of the IPB for all zero (buffer available condition). If the buffer is available, the driver will load as many messages as possible into it; follow them with a null in the next consecutive memory location (unless all sixteen bytes of the buffer are used); and load byte #1 last to show the ready condition.

2. IPB Command Analyzer

Figure 13:
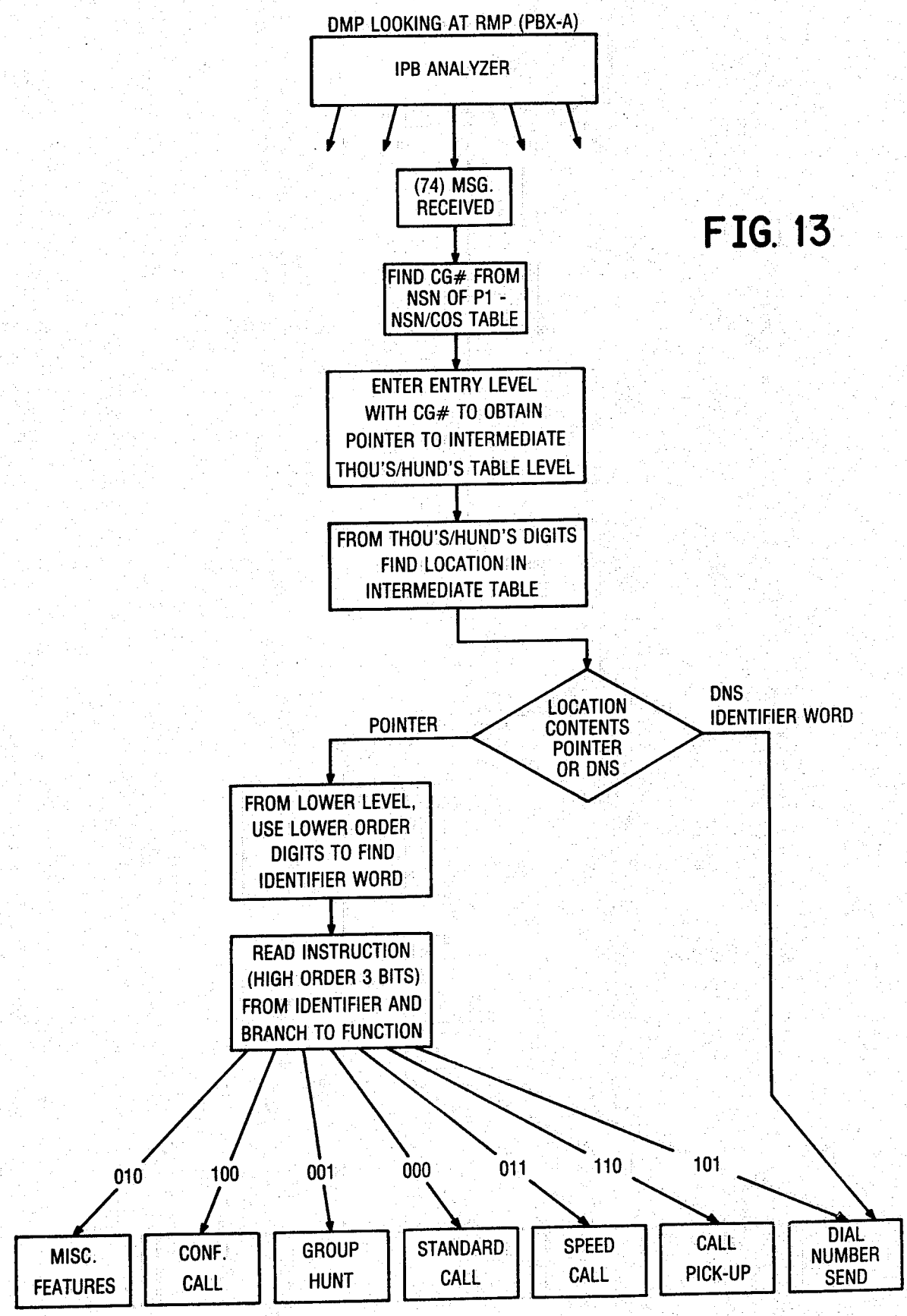

In the receiving microprocessor, a command analyzer program looks at the IPB to determine if the IPB is loaded, and if so, analyzes the 1st command (in Byte #1 of the IPB) and jumps to the sub-program, i.e., function module, handling that specific command. This is depicted in FIG. 13 for the Data Code Microprocessor program organization, the chart showing that in executing the "command analyzer" program the "normal dialed number" command, reference code 74 in the Byte #1 of the IPB, has been read and the "normal dialed #" command handler sub-program has been invoked. After the command has been serviced, control is returned to the command analyzer program for analysis of the next command in the IPB. All remaining commands required to be serviced are serviced in this manner.

In summary, the main program in the receiving processor will periodically call the command analyzer program which will test each incoming IPB for non-zero (ready condition). When a ready buffer is detected, the analyzer re-reads the command byte to assure its integrity. The byte is tested for all-zero (stop/no command) and if tested to show all-zero, the analyzer returns to main program. Valid command bytes are used to call the appropriate command handler sub-program. The sub-program reads the data (if any) following the command byte and performs the required function and then returns to the analyzer with a memory pointer to the next command, if any. The analyzer checks that the next command byte location is still within the IPB, and if it is reads the command. The processing continues until command messages in the IPB are exhausted, then returns to the main program.

OTHER PROGRAM LEVEL AND SUB-PROGRAM LEVEL ROUTINES—INDIVIDUAL MICROPROCESSORS

Line Microprocessor

Operations:

The line microprocessor 140 serves as the introductory service port through which all control signals pass to and from line circuits. For each line in the switching system, a single bit sense point and single bit control point are available to the line processor 140, from which the LMP 140 determines the on-hook/off-hook condition of the particular line circuit, detects significant on-hook/off-hook transitions and reports the same to the state processor 130 through the associated sender interprocessor buffer 141.

Significant line transitions that are detectible are new off-hooks, disconnects (sustained on-hook) and flashes. Controls which are exercised are ringing and halt ringing on each line circuit. The analysis of dial pulses is specifically not a task of the line processor 140.

The line processor 140 reports line activities only to the state processor 130 and receives control information only from the state processor 130. For all information being sent out, the line processor 140 converts the pertinent line equipment address (hardware location) to its network slot number. Likewise, for all information received from the state processor 130, the line processor 140 converts the network slot number to an equipment address.

Buffer Communications:

The line processor 140 communicates only with the state processor 130 and this is done through the interprocessor buffers, using the commands and formats outlined in Table 2.

Other Program Level Routines

1. Scan Program: The scan program monitors the on-hook and off-hook status of each line circuit and modifys that state of the line and prepares relevant outgoing IPB commands.

Sub-Program Level Routines

1. Ring Control: Causes ringing current to be applied or removed from a specified line (but does not provide 2-seconds-on, 4-seconds-off interruption of ringing).

2. Command Handlers: Each IPB Command received by the LMP 140 causes a command handler sub-program to be executed, thus setting the conditions dictated by the command.

3. NSN to EA Translator: Converts Network Slot Numbers to Equipment Addresses.

4. EA to NSN Translator: Converts Equipment Addresses to Network Slot Numbers.

5. Attenuator Control: Drives sense points with specified attenuation selection data.

Trunk Microprocessor

Operations:

The trunk microprocessor 160 serves the switching system as an introductory service port through which all trunk sense and control signals pass from and to the trunk circuits. The TMP 160 detects and assimilates any significant state changes in trunks and, regardless of the trunk type, reports changes in a uniform format to the state processor 130. Analysis of incoming dial pulses and the sending of outgoing dial pulses is specifically not a task of the trunk processor 160.

The trunk processor 160 receives four sense points and delivers four control points to each trunk. The significance of sense and control points varies from trunk-type to trunk-type and thus the procedures for utilizing the points will vary. In order to correctly process each trunk, the trunk processor 160 maintains an abbreviated class-of-service table with enough information to correctly identify each trunk's type. This class-of-service table is derived from the general class of service information kept by the data base processor 170.

Conditions to be recognized and interpreted by the TMP 160 are incoming trunk seizure, trunk disconnect, stop/allow dial, distant party answer, and trunk flash. Controls to be exercised are outgoing seizure, disconnect, answer supervision, allow out-dialing, set attenuation, recognize/disregard flash, and permit outward flash. Control information from the remainder of the system is received from the state processor 130. In these commands, trunks are identified by a network slot number that must be translated into a trunk equipment number (hardware location). Likewise, the trunk processor 160 must make the reverse translation when preparing a command message for the state processor 130.

Buffer Communications:

The trunk processor 160 communicates only with the state processor 130 and this is done through the interprocessor buffer IPBs using the commands and formats outlined in Table 2 hereof.

Other Program Level Routines

1. Scan Program: The scan program monitors the sense points of each trunk for significant changes and invokes the appropriate trunk logic sub-program when changes are detected.

Sub-Program Level Routines

1. Trunk Logic Sub-Programs: There is one trunk logic sub-program for each trunk type that the trunk processor 160 must handle. Each sub-program modifys the trunk's state appropriately and prepares relevant outgoing IPB commands.

2. Command Handlers: Each IPB command received by the TMP 160 causes a command handler sub-program to be executed, thus setting the conditions dictated by the command.

3. Delay Queue Handler: The delay queue handler is a convenience routine designed to uniformly handle the large number of timed events that occur during various protocols for trunk seizure and release.

4. Attenuator Control: Drives sense points with specified attenuation selection data.

5. NSN to EA Translator: Converts network slot numbers to equipment addresses.

6. EA to NSN Translator: Converts equipment addresses to network slot numbers.

Register Microprocessor

Operations:

The register microprocessor RMP 150 receives and sends all dialed numbers for the switching system. The dialed numbers may be presented as pulse streams direct from DC signalling or as 4-bit parallel binary numbers provided by a DTMF receiver. Regardless of input format, the register processor 150 outputs the dialed number as a series of digits stored in four bit codes to the appropriate microprocessor.

The register processor 150 receives two fundamental types of call processing commands from the state processor 130, namely, receive digits and send digits, and one fundamental command type from the data base processor 170, namely, receive n more digits. The register processor 150 receives sense information with DC signalling and/or DTMF digits from dial receiver/sender units of the registers and sends control information with pulse signalling or DTMF digits to the dial receiver/sender units. Up to 64 dial receiver/sender units may be equipped, each supporting dialing on one circuit to which it is connected by the network 52.

Upon completion of a dialed number, the register processor 150 sends a completion command with the dialed number usually to the data base processor 170, but in some instances to the state processor 130. The register processor 150 also sends control bits to the receivers to select certain tones that are returned to the attached originating party, to set-reset a D.C. signalling bit as sent to a terminating party, and to reset certain sense points from the receiver.

Register Sense and Control Points:

There are 8 sense and 8 control points for each receiver/sender. The sense points are read and the control points are written in a single byte-per-receiver/sender format. For each register the sense and control bytes are located at an identical address and are differentiated only by the read (for sense) and write (for control) instruction that is used to access them. There are 64 memory addresses reserved for register sense/control points and each is accessed using its equipment address.

Buffer Communications:

The register processor communicates with the state processor 130 and the data base processor 170 through IPBs using the commands outlined in Table 2.

Other Program Level Routines

1. Scan Program: The scan program monitors the sense byte of each register and passes control to an appropriate state logic program as determined by the condition of the sense byte and the correct state of the register.

2. Outpulse Drivers: Three routines are invoked at selected, staggered 10-millisecond interrupts to provide the register outpulsing function. These routines are:
   Prepare outpulsing
   set outpulses
   reset outpulses

Sub-Program Level Routines

1. Sense Point State Logic: A number of sub-programs provide appropriate actions for the individual state and sense point conditions encountered. Each sets a new state and/or prepares relevant outgoing IPB commands.

2. Elapsed Time State Logic: A number of sub-programs provide appropriate actions for certain elapsed time periods of certain states. Each sub-program sets new states and/or issues IPB commands as may be relevant.

3. Command Handlers: Repeat Command Handlers for line microprocessor 140.

State Microprocessor

Operations:

The state microprocessor SMP 130 coordinates the bulk of call processing activity in the switching system. The SMP 130 makes all decisions concerning call states, party states, next allowable states, and register assignments. Through an interface with the switching network, the SMP 130 controls all connections among lines, trunks, registers, attendants, and tone sources.

The state processor 130 maintains two-way communication with all other processors in the system through the inter processor buffers (IPBs) which send and receive a large variety of command messages.

The state processor 130 is driven solely by the commands it receives; there are no sense point inputs. Most commands are related to a particular call in progress and to the state and class assignments of the parties involved. Processing results in the issue of one or more commands to the other microprocessors and/or connection commands to the network 52.

Other Program Level Routines

1. Busy/Idle Update: The busy/idle update program periodically transmits updating data to the data base processor 170 so that it may maintain a current map of busy and idle conditions of lines and trunks.

2. Short Action Queue Servicing: The short action queue servicing program scans entries of time conditional events that have been placed in a queue by other programs and sub-programs. If the conditional time of any event has expired the short action queue servicing routine causes the event to occur.

3. Camp-On-Queue Servicing: The camp on queue servicing program searches a list of calls waiting to be made when both parties become idle.

4. Register Allocation: This is a group of routines designed to allocate available registers and to service a queue of parties wanting registers when none are available.

5. Time Audit: The time audit program periodically checks the time that each line, trunk, and register has been in its current state and invokes appropriate action if that time has exceeded a predetermined limit.

6. State Audit: The state audit program performs a periodic consistency check of the state and reference memory of each station, trunk, and register in the system and between parties talking to each other.

Sub-Program Level Routines

1. Command Logic: Each IPB command received by the SMP 130 causes a particular command handler sub-program to be invoked. Each command handler contains the logic for permitting or denying, based on states of the parties involved, the action requested by the incoming command.

2. State Driver: The state driver sub-program performs all the actions necessary to change a party from one state to another. Included are the modification of the state, modification of the reference memory indicating to whom the party is talking, modification of the network control memory (connection), and issue of appropriate IPB commands.

3. Device Usage Monitor: Gathers counts of usage data (number of times used) from lines, trunks, registers, consoles and so forth for the system.

4. Traffic Recording: Provides as output data all significant events required to reconstruct complete calling information (monitor particular numbers dialed for checking and charge-back functions).

Console Microprocessor

Operations:

The Console Microprocessor CMP 180 performs all call processing functions associated with attendant console activity. This includes assuming a level of control normally exercised by the state processor SMP 130 in such activities as specifying whether conditions are correct to allow connections, specification of the connections, maintenance of console call states, call camp-on feature implementation, call holding feature implementation and time audits.

The console processor 180 maintains two-way communication via IPB(s) with the SMP 130, DMP 170 and, one-way communication with the Busy Lamp Field. The primary interchange of information is connection commands to the SMP 130 and affirm/disaffirm commands in response from the SMP 130.

The console processor 180 is driven by a combination of the IPB commands received (representing new calls and connections) and the selection button activity on the attendant consoles (representing human direction as to how the calls are to be handled). Attendant consoles are scanned by the CMP 180 for selection button activity by looking at a single input port per console. Button selections are expressed at this port by eight bit codes, a unique code being used to represent each push button on the attendant console. Likewise, lamps on each attendant console are controlled by a single output port per attendant console. The large number of lamps on the attendant console combined with the requirement for steady or flashing display of each lamp requires that two bytes be transmitted to properly illuminate any particular lamp.

The CMP 180 handles calls for several customer groups. All tasks performed by the CMP 180 must provide for assigning and manipulating calls within the correct customer group.

Buffer Communications:

The console processor 180 communicates with the SMP 130, and the DMP 170 through the interprocessor Buffers (IPBs) using the commands outlined in Table 2.

Other Program Level Routines

1. Read Keys: The read keys program scans all input ports and passes control to the proper sub-program when new button depressions (activations) from an attendant console are discovered at the port.

2. Assign Call: The assign call program looks at the attendant queue (for customer group) and if there are any waiting calls, assigns them to the longest idle attendant of the proper customer group.

3. Time Audit: The time audit program periodically checks all console call states and invokes appropriate action if the allowable time of the particular state has been exceeded.

4. Write Console Lamps: The write console lamp program transmits control information via the output ports to the appropriate attendant consoles from an internally kept queue.

Sub-Program Level Routines

1. Key Modules: A number of individual key module sub-programs provide the logic that must be executed for each particular key press and state condition encountered.

2. Control Table Driver: The control table driver sub-program supports key module sub-programs by permitting a large part of the work to be expressed in a tabular form referred to as a control table. The control table defines next states to be entered, IPB connmands to be sent, and lamps to be lighted.

3. Command Handlers: Repeat command handlers for line microprocessor 140.

Data Base Microprocessor

Operations:

The data base microprocessor DMP 170 provides storage and retrieval upon request of all primary data structures in the control system. Among these are the tables and fields previously listed. The DMP 170 also stores peg counters of various system device usages, and supports the non-call-processing ports to the connecting switching system, as previously noted.

The DMP 170 maintains two-way communications through the IPB(s) with the SMP 130, RMP 150, and CMP 180. The primary interchange of information comes in the form of requests for data concerning a particular network slot number or directory number and is delivered as the data requested. The DMP 170 is driven primarily by the request commands from other processors. It has no sense points that input call-processing stimuli. Several customer groups may exist in the system, and the DMP 170 must perform in a manner that maintains separation of the customer groups. This requires maintaining some internal data tables separately for each customer group; other data tables may be mixed together. The magnetic backup media is used for initial system loading and for recovery in the event of catastrophic failures. The keyboard terminal is the mechanism whereby recent change data and maintenance messages are entered into the control system. Because of these important input ports, the DMP 170 also serves as a distributor of program and operating data to all other microprocessors in the system. During these periods the DMP 170 makes special use of IPB(s) to convey the data directly to the SMP 130, RMP 150, and CMP 180. Data for the LMP 140 and TMP 160 is sent first to the SMP 130, which in turn forwards data to the LMP 140 and TMP 160.

Data Base Sense and Control Points:

The various input and output ports associated with the DMP 170 may be thought of as sense and control points respectively. Each is accessed by a specific pair of adjacent memory addresses. At one address is a status byte used to determine the readiness of the port to send or receive data. The other address of the pair contains the actual data byte sent or received. All DMP 170 ports use eight bit ASCII (American Standard Code for Information Interchange) codes for the transfer of information.

Buffer Communications:

The DMP 170 communicates with the SMP 130, RMP 150, and CMP 180 through the IPB(s) using the commands outlined in Table 2.

Other Program Level Routines

1. Group Camp-on Queue Service: The group camp-on queue service program searches a list of callers waiting to be connected to any available member of a specific station or trunk group.

2. Keyboard Service: The keyboard service program is periodically invoked to test the terminal input port, to bring in characters appearing there and to pass control to a message analyzer when a full message has been input.

3. Output to Ports: The output-to-ports program is periodically invoked to send data waiting in internally kept queues to their respective output ports.

4. Data Audit: The data audit program continually tests the integrity of data structures by assuring that indirect addresses are within preset ranges and that address chains are consistent.

5. Recent Change Driver: Modifies data base entries as requested by operating personnel from the keyboard.

Sub-Program Level Routines

1. Command Logic Sub-Programs: Each IPB command received by the DMP 170 causes a particular command handler to be invoked. The work of command handlers consist primarily of retrieving data requested and formatting the data into a responsive command; however, in some cases the retrieval process is quite complex requiring several levels of translation and/or group hunts.

2. Message Analyzer: The message analyzer sub-program tests messages from the keyboard and passes control to the proper routine to execute the message request.

VI. EXEMPLARY "DIALED NUMBER SEND" FUNCTION

With the foregoing general description of the exemplary multiprocessor system in mind, the following sequence of programmed operations executed by the individual microprocessors will readily be understood when considered with FIGS. 7–25. The "dialed number send" function is invoked when a switching system in the complex 14 has received a dialed number, representative of a directory number, the function thereof which cannot be finally disposed of within that switching system. Specifically, the dialed number send function will be described in terms of a dialed telephone extension number to the extent that one skilled in the art would be able to apply the principles involved along with the use of the various tables appended hereto to develop a method to carry out the dialed number send function involving access codes and feature codes.

In keeping with the principles of the present invention, the dialed number send function may utilize up to five different microprocessors of each of the program controls involved. The following discussion is organized by action and response of a user call sequence and shows the various microprocessor commands generated and responses thereof in order to expeditiously extend telephone service over a plurality of switching systems located within a switching complex 14.

Each command identified by a reference code, is essentially a command to the receiving microprocessor to perform some work operation. The command message, including the reference code together with data is loaded into an outgoing IPB. As such, the IPB units and the associated driving programs also act as the work queuing areas for the processor control 55.

It should be noted that the various common control processor operations involved in completing an intra-switching system operational function are described in great detail in referenced U.S. patent by Carl J. Stehman, the inventor herein, entitled "Dialed Number to Function Translator For Telecommunications Switching System Control Complex", U.S. Pat. No. 4,259,549. It should be further noted that the present invention takes unique advantage of the data base microprocessor 170 memory structure of the various interconnected switching systems to make an early recognition of a dialed number that should be transferred, en gross, to the destination switching system whereupon that system processes the call to completion. In essence, and in accordance with the principle objects of the present invention, groups of directory numbers, not to be confused with customer groups, in the overall directory number plan are designated within nonresident processing systems, as "dial number send" (DNS) numbers which, when transferred to resident switches, are processed in conventional ways depending on the ultimate function to be carried out.

Importantly, when the transferred DNS number eventually reaches the destination switch, the associated data base microprocessor 170 memory structure is configured so that the dialed number is correlated to the respective function, and the result desired by the dialing party is then carried out. To that end, the flow charts and tables appended hereto, taken together with the detailed discussion which ensues, will enable one skilled in the art to practice the invention.

INDIVIDUAL PROCESSOR PROGRAMMED OPERATIONS

Table 3 lists the sequence of events carried out by the various processors of the exemplary originating and destination systems in cooperating to complete a dial number send function via interconnecting lines and trunks.

Also, with reference to the flow charts of FIGS. 7–25 and the data base memory structure of FIG. 5, there is illustrated the programmed operations asynchronously executed by the various microprocessors of each system such that the "dialed number send" function is achieved.

In addition to the accompanying flow charts, reference also is made to the appended Table 2, which provides an extensive listing of reference codes, command descriptions and command message formats. The ability of the control complex processors to execute these and other system functions under program control is, in carrying out the invention, dependent on the organization and structure of the data base memory, and the means by which data is retrieved from that memory and utilized in the carrying out of system functions.

In the interest of brevity the switching system out of which a DNS call originates will hereinafter sometimes be referred to as "PBX-A" and the destination switching system will sometimes be referred to as "PBX-B". While the illustrative example assumes only two PBX's of the communication complex are involved, the concepts of the present invention allow for the provision of an intermediate PBX in the event the originating and destination PBXS' are not directly connected by way of a communication path. In such a switching complex configuration the memory data structure of the intermediate PBX would correlate the directory number, transferred to it by PBX-A, with the DNS function and would forthwith transfer the dialed number to PBX-B whereupon three PBX'S would be instrumental in establishing a communication path—all without the originating user being aware that multiple switching systems are involved.

It is also noteworthy that the present invention may be utilized to connect a number of PBXs by various trunks, and that calls within, for example PBX-A, can be diverted to appropriate destination PBXs. Also, a PBX-C may receive calls both from PBX-B and a PBX-D, if necessary, for efficient use of interconnecting trunks or due to overflow conditions.

LMP OPERATIONS FIG. 7 (PBX-A)

Figure 7:
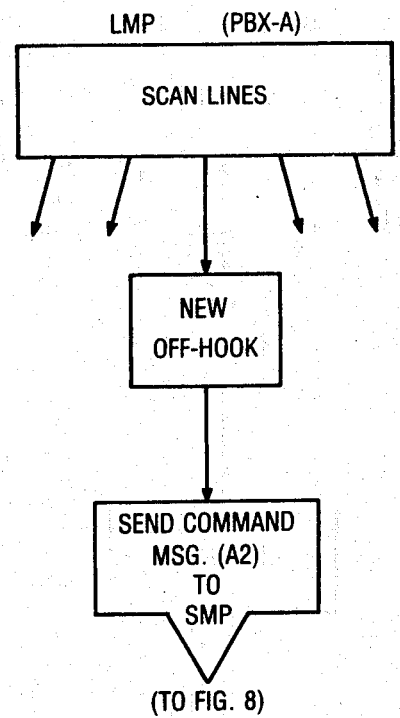

Turning now to FIG. 7, and referring also to the exemplary sequence of Table 3, the first "ref. code" listed is "A2" (all reference codes are in hexadecimal format) which is transmitted in a command message from the line microprocessor LMP 140 to the state microprocessor SMP 130 of PBX-A, via an IPB 141. According to the program description earlier provided for the line microprocessor 140, the routine at the program level is continually scanning lines to detect new on-hook and off-hook line transitions. Having detected a "new off-hook", the line microprocessor 140 assembles the complete message consisting of the reference code "A2" and the network slot number (NSN) of the originating line as obtained by a translation from the equipment address. As shown in Table 2, the format of the command message is the ref. code "A2" and "LS8/MS4", which designates the least significant 8 digits and the most significant 4 digits of the network slot number (NSN) of the originating party, P1. A network slot number refers to the time and space slot in the switching network assigned to the station trunk, register, tone or attendant. The FIG. 7 representation in flow chart form, of this initial segment or series of steps carried out by the line microprocessor 140 under scanner program control, ends with the block "Send Command Message (A2) to SMP". The ref. code "A2" and the network slot number LS8/MS4 are then loaded into the outgoing IPB 141.

SMP OPERATION FIG. 8 (PBX-A)

Figure 8:
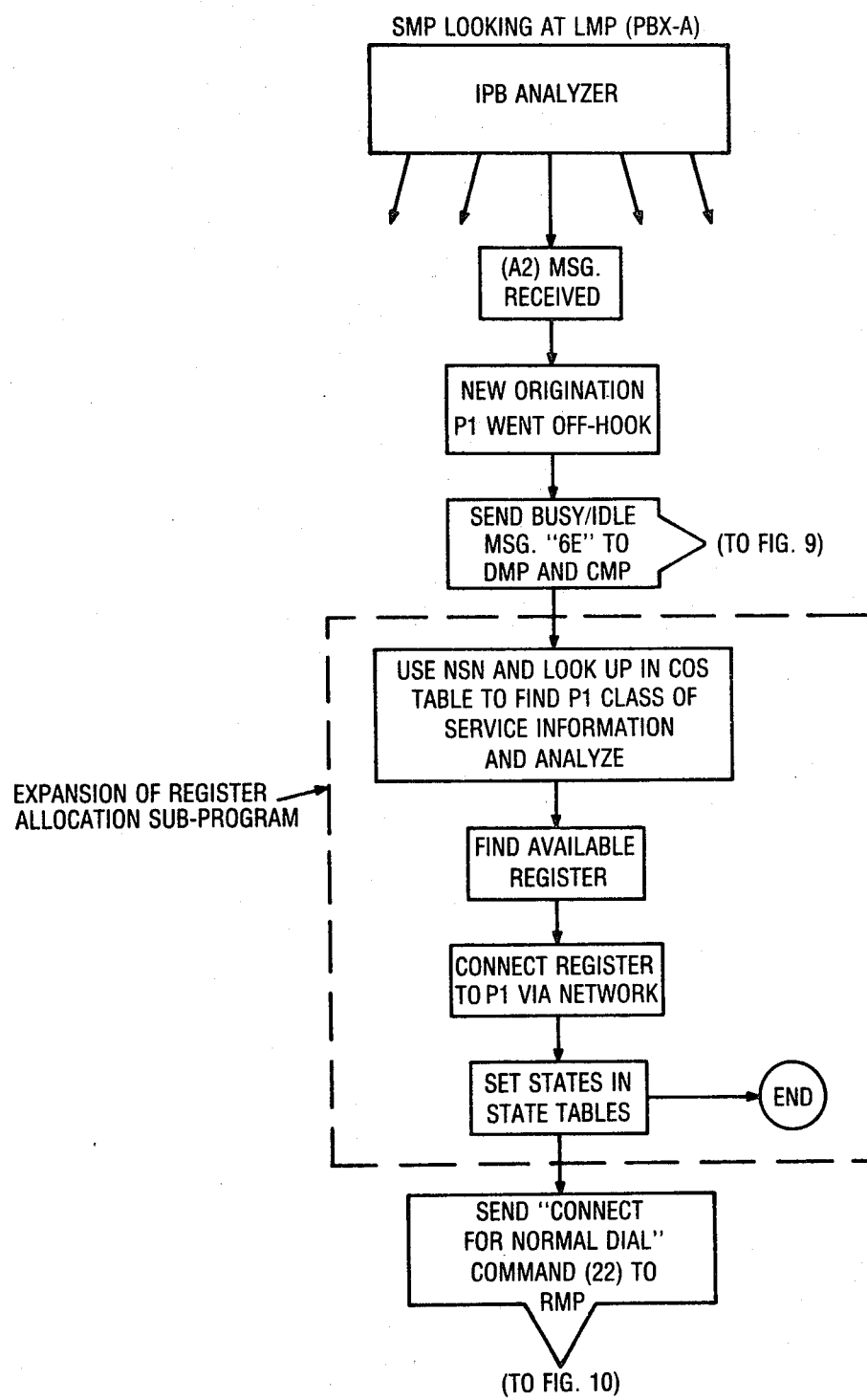

Turning now to FIG. 8, this figure in flow diagram form represents the segmented operations produced in response to the above dial number send sequence as identified by the reference code "A2". Thus, as the state microprocessor 130 scans the incoming IPB 141 the "A2" command is found and analyzed. The command handler routine being invoked, generates and sends a "6E" command to the DMP 170 and the CMP 180. Such a command message is listed as the second reference code in Table 3.

Referring now to Table 2, under the column "Code" there is listed "6E" and the indication that the corresponding command is transmitted to the data base microprocessor DMP 170 as a representation that the originating line P1 is now busy. In the command description column of Table 2, it is noted that the same command may also be sent to the console microprocessor CMP 180. The data base microprocessor maintains a busy/idle "map" as one of the "other" tables in its data stores; the busy state of the originating network slot number is stored in the data base memory and provides data, retrievable by the data base microprocessor as to the availability of that station or link to receive calls.

As further shown in FIG. 8 the state microprocessor SMP 130 refers to its class of service table cross-referenced with the network slot number supplied to it by the line microprocessor 140, and determines the "originating COS" (class of service) information, i.e., coded information on restrictions (see FIG. 4) applicable to the originating line P1. This COS table is maintained in the memory structures of the DMP and SMP and thus it is not necessary for the SMP to issue an IPB command message to the DMP requesting P1 COS data information which of course, is an alternative. In addition, the SMP, in selecting an idle register to receive P1 dialed digits, refers to one of its state tables to select an available register. The COS information is used to determine if a dial pulse or DTMF register should be utilized to receive P1 digits. Consequently, the state microprocessor 130 directs the network 52, via a high level interface, to interconnect P1 and the selected register 40 in accordance with the P1 and register network slot numbers. The state table is updated to reflect that the selected register is now unavailable for other uses. The state microprocessor 130, in executing its program, places the line and receiver into the in-register state and loads a command message identified by the reference code "22", representing a command to "connect for normal dial", in an outgoing IPB 152 which is coupled to the register microprocessor RMP 150. The format of the complete command message identified by the ref. code "22" is shown in Table 2, and includes together with the reference code the argument R/LS8/MS4.

DMP OPERATIONS FIG. 9 (PBX-A)

The IPB message "6E" as previously transmitted by the state microprocessor 130, is received by the data base microprocessor DMP 170 in which event the busy/idle map in the data base memory, is simply updated to reflect the busy status of P1, the calling party.

RMP OPERATIONS FIG. 10 (PBX-A)

Referring now to FIG. 10, the response of the register microprocessor RMP 150 is shown in the upper part of the figure. The command message identified by the reference code (22) "connect for normal dial" is received, the command handler sub-program is invoked in response, the specified register is seized and set up to receive digits dialed from the originating party P1, and a dial tone is sent to the originating line or party P1. It should be noted that the SMP is responsible for directing the network to set up a connection between P1 and a dial tone source using the NSNs of the two respective network terminations.

Also shown in FIG. 10 in the upper right hand portion, is the program segment representing the further action of the register microprocessor RMP 150 under program control after a brief interdigital dial time. The register microprocessor RMP 150 is driven by the register scanner program and monitors the sense byte representative of the seized register. When the first dialed digit has been received, the dial tone is removed from the P1 line, and a command message, identified by the ref. code "72" is loaded into the outgoing IPB 153. The format of the command message identified by the ref. code "72", as shown in Table 2, is R/Digit/LS8/MS4. The remainder of FIG. 10 will be taken up with the discussion in conjunction with FIG. 12.

Figure 9:
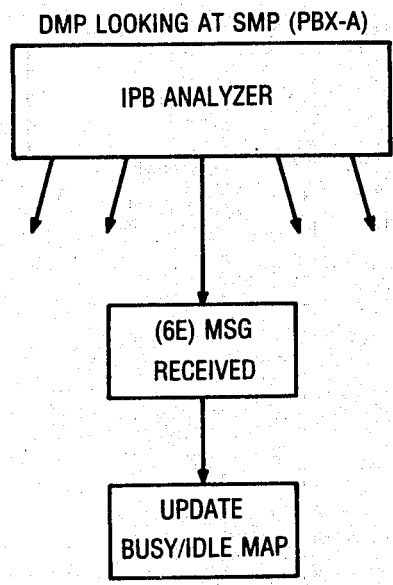

Referring to the exemplary "Dial Number Send" sequence above, the list of reference codes A2, 6E, 22 and 72 correspond, respectively, to the programmed operations diagrammed in the flow charts of FIGS. 7–9 and the upper two portions of FIG. 10.

DMP PROGRAM HEIRARCHY FIG. 11

In carrying out the invention, the data base microprocessor is provided within its program memory various stored command handler sub-programs which are invoked in response to the various command messages read from incoming IPBs. The chart of FIG. 11 is included to illustrate the data base microprocessor 170 program heirarchy. The first block represents the IPB analyzer program level routine executed by the data base microprocessor 170 in analyzing incoming IPBs for messages, and in response to those incoming messages invoking a "function module"; i.e., a subprogram called for by the reference code in the received command message. An incoming message might be, for example, a request for tone control (ref. code 71) or for a first digit translation (ref. code 72) which should call for the data base processor 170 to access the NSN/COS table 310 and the first digit translation table 315 of the data base memory stores, to obtain the requested data and return the data to the requesting processor.

In keeping with the invention, one of the principal operations carried out by the data base microprocessor 170 is the execution, under control of a command handler sub-program, of steps and responses to receiving the digits of a dialed number from the register microprocessor (RMP) 150 together with the "normal dialed number" command (74). This is specifically depicted in the chart of FIG. 11 as represented by the legend "normal dialed number" module. Under sub-program control, the data base microprocessor proceeds to access the directory number table 300 for the identifier word corresponding to the received dialed directory number. As illustrated in FIG. 11, having accessed the directory number table 300 and read the identifier word, the data base microprocessor 170 initiates the performance of the system function designated (see FIG. 6) by the DNS descriptor or the instruction portion of the identifier word; i.e., dial number send, standard call, conference call, group hunt, call pick-up, speed call, or miscellaneous features.

DMP OPERATIONS FIG. 12 (PBX-A)

Figure 12:
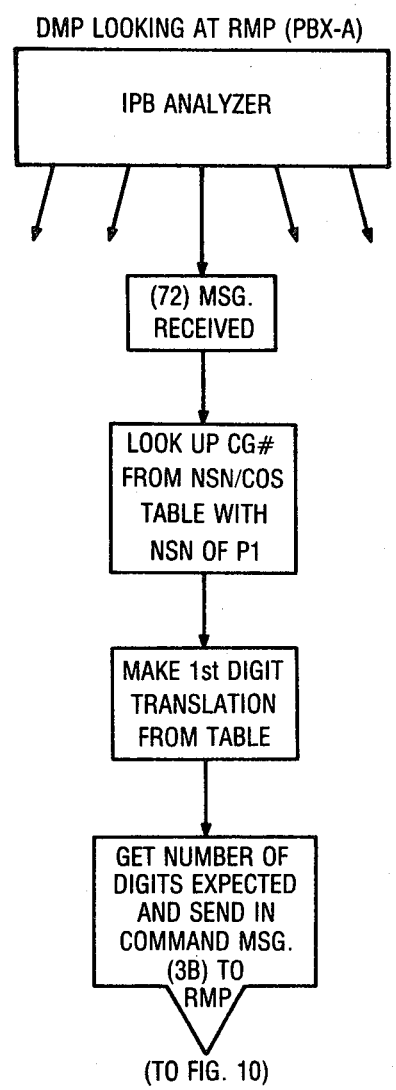

FIG. 12 is a flow chart of the programmed operations of the data base microprocessor DMP 170 in scanning the incoming IPBs under the IPB analyzer program and in response to receiving the command message identified by the ref. code "72". The steps of FIG. 12 culminate in the issuance of the ref. code 3B in the call sequence which is identified as the command "Receive n more digits".

To provide such information as to the number of expected digits, the data base microprocessor DMP 170 has in its data base memory, a first digit translation table 315 (FIG. 4). also in the data base memory is a NSN/COS table 310 which is addressed with the network slot number (NSN) to obtain the customer group number (CG#) of the originating party P1. Using the found CG# and the first digit dialed, the expected length of the directory number is found in the first digit translation table 315. In the present example where normal dialed directory numbers are four digits in length, the data base microprocessor (FIG. 12) returns the number N=3 in the 3B command message to the register microprocessor (FIG. 10). The lower portion of FIG. 10 indicates the manner in which the RMP 150 also receives the message and allocates four register digit positions so that when the register scanner receives the first digit and three subsequent digits a next positive processor action may commence knowing a complete dialed number has been received.

In most instances a firm response as to the number n may be given, based on the CG# and the 1st digit translation, that the directory number having that first digit is one, two, three or more digits in length. Any directory number that is not firm, is flagged for "hesitation dialing". A command "Expect n more digits", and the maximum number included in the numbering plan is returned to the register microprocessor RMP 150. With the register microprocessor 150 programmed to recognize "hesitation dialing", that microprocessor will expect "n" more digits or will terminate whenever a predetermined "hesitation" interval occurs. A directory number having less than four digits is treated as left-filled, with zeros, to the total of four digits.

One of the features of the system operation, as discussed fully in the referenced U.S. Pat. No. 4,259,549 is that the numbering plan can be completely flexible allowing virtually a complete free choice of directory numbers; for example the following may be assigned as directory numbers to different stations in the same customer group, or in different customer groups, or may be assigned to different functions without constraint:

| (1) | Z (units digit) |
| (2) | YZ (units, tens digit) |
| (3) | XYZ (units, tens, hundreds digit) |
| (4) | WXYZ (units, tens, hundreds, thousands digits) |

Even though the four directory numbers may have the same first digit, or first and second, or first, second and third digit, and are in the same customer group, the system can accommodate the use of such numbers. Moreover, the number plan permits identical four digit numbers in different customer groups. Access codes to system features, such as a preassigned number to gain access to the system feature "call waiting", can be freely intermixed with subscriber station extension numbers.

In many telecommunication systems, access codes to special features are required to be set apart in a special group of codes. In the present system, all access codes to system features and numbers assigned to stations are treated as "normal" directory numbers. In addition, and in accordance with the present invention, any nonresident directory number or access code may be flagged in the data base memory structure as a "dial number send" number. The function of "call forwarding" for example, may be preassigned a directory number of as few or as many digits as desired, since any normal directory number always designates a system function, according to the illustrated system.

For example, when the full number of digits (assigned as an extension number, an access code or system feature code) has been dialed, received and stored in one of the registers by the register microprocessor RMP, (as shown in the lower righthand flow chart of FIG. 10) the digits are transferred as a "normal dialed number" along with the reference code "74" to the data base microprocessor DMP, as precisely illustrated in the present DNS call sequence. The system function, correlated from the dialed digits, distinguishes the difference between an extension number, an access code or a system feature code.

Up to this point in the discussion, PBX-A (the switch connected to the originating station) has processed the dialed information as if the destination party (or system feature), representative of the dialed digits, was directly serviced or connected by the switch. In keeping with prime aspects of the present invention, reference will be made to FIG. 13 where it will be shown how PBX-A processes the dialed information, on behalf of the user, to cause another switch (PBX-B) in the complex 14 to establish the second connection in the communication link to thereby effect a communication path through a plurality of systems. The concepts of the present invention, therefore, allow a user to treat the communication complex 14 as one switch and thus eliminate the need to deal with such things as dialing access codes for each outgoing trunk and waiting for subsequent remote dial tones.

DMP USE OF DN TABLE FIG. 13 (PBX-A)

Fully described in the earlier section of this disclosure entitled "Data Base Microprocessor and Stores—Directory Number Table", is the manner in which the directory number table 300 of the data base memory is utilized for correlating system operational functions and dialed directory numbers separately for each customer group.

In the case of "standard call" functions, locations only in the lowest level 309 store coded electrical signals representing a two byte identifier word having a three bit instruction portion 312 and one and one-half bytes representing the argument 314 of the instruction. In contrast, with "dial number send" (DNS) functions, the intermediate level of the directory number table contains the majority of DNS identifier words having one byte of argument information. The format of the DNS identifier word is disclosed in FIG. 6 and illustrates one format 311a when the identifier word is placed in the intermediate level 308 and another format 316b when used in the lower level 309. It is important to note that the DNS identifier word formats differ within the first byte depending on whether the dialed number is translated into the DNS function at the intermediate level 308 or at the lower level 309. This distinction is necessitated by the fact that the DNS identifier word, at the intermediate level, would be interpreted as a pointer 313 unless it had distinguishing characteristics. This distinguishing characteristic is the first nibble of the first byte "000X" which creates an address code that cannot be encountered as a pointer within the intermediate level. In actual practice, the code represents a memory area which should not be accessed. Intermediate level pointer words do not normally have such first nibbles and thus when encountered at the intermediate level 308, the word is automatically treated as a identifier word rather than a pointer word. At the lower level 309 of the directory number table the DNS function must also be distinguished from the other noted functions, and is done so by assigning a "101" instruction portion to the identifier word.

As noted previously, the majority of dialed numbers associated with DNS functions are translated into the system function at the intermediate table level 308 because whole groups of one hundred directory numbers are normally made resident within a particular switching systems. Directory numbers are not generally distributed over the various switching systems in a piecemeal fashion by splitting a thousands/hundreds group of directory numbers. By this it is meant that a group of directory numbers 3400-3499 may be assigned to one switching system and 3500-3599 assigned to another system. Therefore, as soon as the second (hundreds) digit of a DNS directory number is received by a nonresident switching system, the placement of the DNS identifier word at the thousands/hundreds translation level (intermediate level) allows the system to proceed with the execution of forwarding the dialed number to the system which services the station or performs the feature representative of the dialed number.

As the discussion proceeds in connection with the DNS function it will be observed that the present invention allows the same customer groups to be maintained over the plurality of switching systems.

As shown in FIG. 6, the three bit instruction word 312 designates categories of system functions by the pattern of bits. The one and one-half bytes representing an argument of the instruction, in the case of the "standard call" function, represents the network slot number (NSN) of the called party P2. On the other hand, the one-byte argument part of the identifier words encountered in a "dial number send" function represents the outgoing trunk group number of the group in which an idle trunk will be selected and over which the original dialed number will be outpulsed. The fourth bit (OND-Originating Number Display) of all standard identifier words, when set to a "1" indicates the dialed number is to be displayed at a designated console wherever such a number is dialed. In the case of DNS identifier words, the fourth bit (from left to right) may also be set to cause the dialing party's number to be displayed on the console, of the originating switching system.

The directory number table is therefore addressed in response to the combination of (1) coded electrical signals representing a dialed directory number and (2) coded electrical signals identifying the customer group number (CG#) of the origination station P1. With all dialed numbers, the entry level 306 of the table 300 is indexed by the CG#, to find a pointer to the intermediate level 308 of the table, both levels of which have blocks of locations corresponding to the customer groups. The intermediate 308 level is indexed by the two higher order digits of the directory number to normally obtain the pointer address 313 of one of the multiple blocks of locations in the lowest level 309, and the particular location in the lowest level 309 block is further defined by the two lower order digits of the directory number.

In accordance with the principles of the present invention, the "dial number send" system function is provided whereby the intermediate table level 308 need not point to the lowest level 309 to find the identifier word indicative of the system function. This provision advantageously allows the switching system to have designated numbers with specific hundreds/thousands digits which are easily recognized, after a higher order digit translation, as nonresident numbers. In a system where the received dialed number is not resident, the intermediate level 308 of the directory number table 300 will contain the "dial number send" function identifier word whereupon execution thereof the system will avoid a digit translation to the lower level 309 and will outpulse the dialed number over an idle trunk found within the trunk group specified in the argument portion of the identifier word. The switching system of the complex 14 connected to the called party will, however, treat the dialed number as a standard call and execute the "standard call" identifier word function as located in the lowest level 309 of the directory number table 300.

It should again be understood that the lower level 309 locations may contain DNS identifier words for use, for instance, where a resident system is not directly connected to a central office trunk and the user dials "9" to obtain access to the CO trunk of another system within the complex 14. Other DNS translations to the lower level may be necessary where directory numbers within a certain hundreds group are desired to be resident in different destination switching systems. In this event plural DNS identifier words would be required having different trunk groups specified within the argument portion of the respective DNS identifier words. As noted previously, the more significant digits of single and double digit numbers are filled by the switching system with leading zeroes. Similarly, a single-digit dialed feature access code may be represented as a DNS number in one system and thus transferred to another system having that feature whereupon the originating party may utilize the features of another system located within the switching complex 14.

Referring now to FIG. 13, this flow chart illustrates the command handler sub-programs which drive the data base microprocessor DMP 170 in response to the "normal dialed number" command "74". As in the case of the other microprocessors of the control unit 55, the data base microprocessor 170 is driven under control of an IPB analyzer program. In the present instance, the DMP 170 scans its incoming IPBs and detects and reads the normal dialed number command message identified by the ref. code "74". This command message includes the digits of the dialed number (see Table 2) together with the reference code "74", and is transmitted from the register microprocessor RMP 150 to be stored in the IPB 153. FIG. 13 represents the expansion of the command handler sub-program driving the data base microprocessor 170 in response to receiving the command message identified by the code "74", and illustrates that the CG# is obtained using the network slot number of P1 and the NSN/COS Table 310. The CG# is used to enter the directory number table 300, as indicated in the next logic block of FIG. 13, to obtain the pointer address to the intermediate level 308 (thousands/hundreds) block. Referring now to FIG. 5, this figure illustrates the structure and organization of the directory number table 300 and shows that structure as three linked levels of memory locations, and further shows standard identifier words, located in the lower level 309 and, in the case of the DNS function, identifier words located in the intermediate level 308. This directory number table is preferably implemented in hardware by RAM provided by semiconductor memory devices compatible with the microprocessors. Practical embodiments of the illustrated system have been implemented with INTEL 8080 or TEXAS INSTRUMENTS TMS 8080 microprocessors and compatible memory devices.

To provide a brief example of how the directory number table 300 is addressed by the data base microprocessor 170 in response to a "dialed number send" directory number (a number resident in another switching system) reference will be made to FIG. 13 in conjunction with FIG. 5. For exemplary purposes, it will be assumed that the user connected to PBX-A (10a of FIG. 1) dials "47" which, unknowing to him, resides within PBX-B (10b of FIG. 1). For completeness, further assume that the systems provide for customer groups and that the originating station is in customer group number "7"; the block at the entry level labeled "7", and the destination station is also in CG#7. The entry level of the table 300, location #7, contains a pointer directing the data base microprocessor 170 to the seventh block of one hundred locations in the intermediate level 308. The one hundred locations (00–99) of block "7" of the intermediate level 308 are correspondingly indexed by the two higher order digits. Assuming the directory number of "0047", the two higher order digits "00" (backfilled with zeros) index the first location in the "7" block. This location, which would normally contain a pointer address to a system function within PBX-A, now contains a DNS identifier word indicative of the dial number send function. It must be understood that in placing the identifier word at this location all customer group "7" stations having the "00" hundreds/thousands prefix must represent functions resident in another switching system. Advantageously, as the data base microprocessor 170 needn't access the tens/units level of the DN table 300 for the majority of "dial number send" numbers, the data base memory area may then accommodate more tens/units entires for other directory numbers resident within the system. Also, by virtue of DNS identifier word format, the system knows not only that the station is not resident therein but also the outgoing trunk over which to transfer the dialed digits.

Referring again to FIG. 13, all directory numbers are correlated to one of the system functions listed in the seven blocks at the bottom of the figure. In the instant example the DNS function, being translated at the intermediate level, has as the first three bits 000 which is interpreted by the data base microprocessor 170 as a non-pointer word. The processor further examines the identifier bits 5–7 to determine that the particular function to be carried out is the "dial number send" function. Other combinations of bits 5–7 may indicate system operations distinct from any of the functions as heretofore mentioned. Also noted in FIG. 13, the DNS functional module can be accessed via the set of blocks corresponding to a lower level tens/units digit translation to the identifier word having an instruction portion of "101".

In the case of the "dial number send" function, as shown in FIG. 6, the argument portion of both identifier words is the number of a trunk group to be searched for an available outgoing trunk to connect PBX-A to PBX-B.

Directing attention, therefore, to the seventh ref. code in the dial number send call sequence of Table 3; namely "CC", identified as the "speed call" command, and according to the listing, such reference code is assembled with the command message by the data base microprocessor 170 and loaded, under the IPB loader program, into the outgoing IPB 171 connected to the state microprocessor SMP 130. Table 2 provides the format of the command message identified by the ref. code "CC" and indicates that it contains in subsequent bytes following the reference code:

LS8(P1)/MS4: network slot number of P1
LS8(T)/MS4: network slot number of the outgoing trunk
XD/D2,D1: digits to outpulse are the same as dialed digits

SMP OPERATION FIG. 14 (PBX-A)

Figure 14:
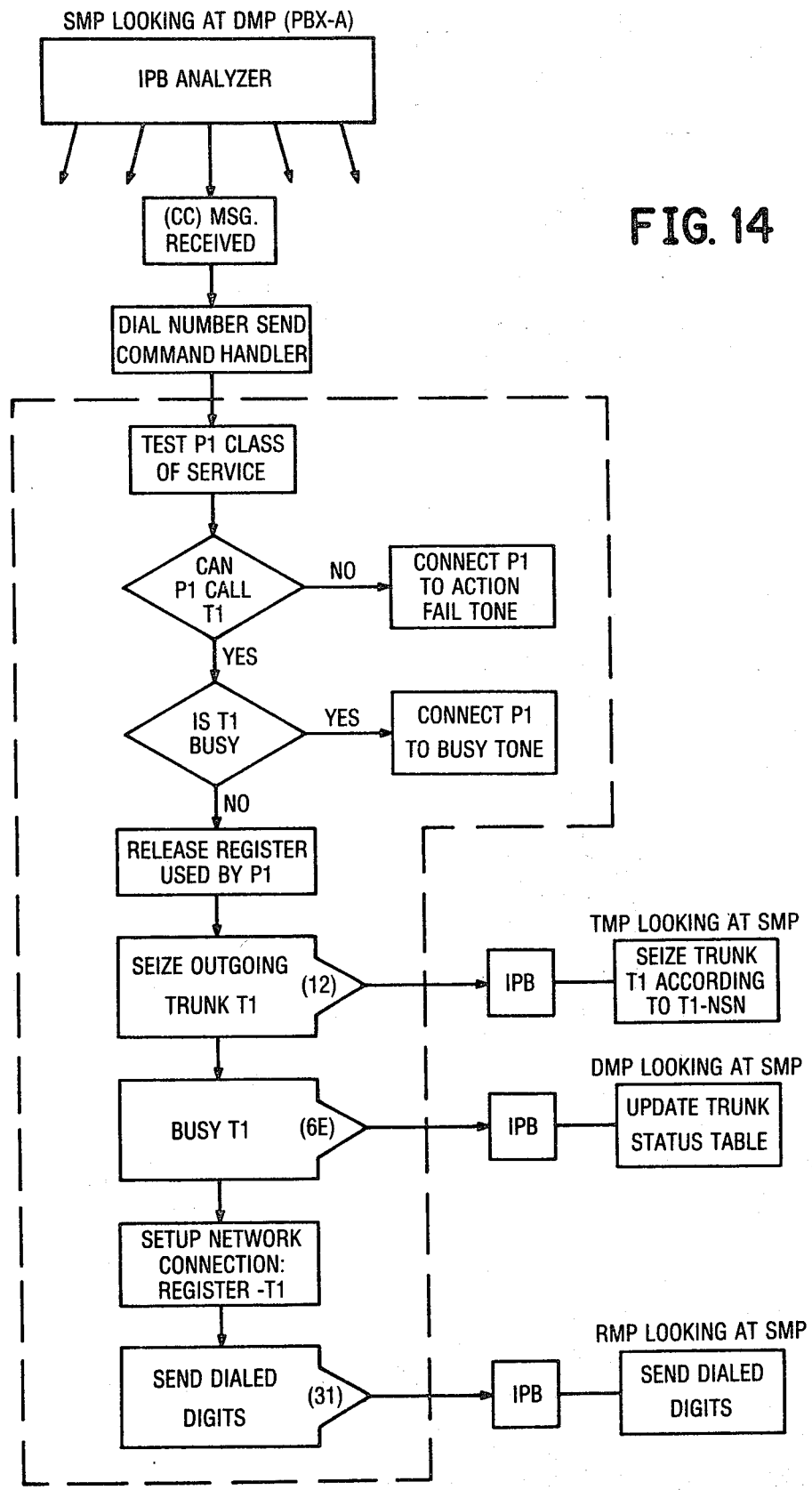

Turning now to FIG. 14, this flow chart represents the operation of the state microprocessor SMP 130 in processing the "CC" message previously loaded into its incoming IPB 171 by the data base microprocessor 170. The speed call command handler sub-program, associated with the "CC" message is invoked, and as shown in the lower portion of FIG. 14 such program tests the class of service. If it finds no restrictions are found, the processor tests whether the outgoing trunk (T1) is "busy", sets the appropriate states of P1 and T1, assembles a T1 seize command message and transmits a command message identified by the ref. code "12" to the outgoing IPB 162.

As noted in Table 2, the "12" reference code along with the trunk NSN represents a "seize trunk" command directed to the trunk microprocessor 160. The state microprocessor 130 also sends the command message identified by the code "6E" to the data base microprocessor IPB 172 for updating the trunk map to show a T1 busy status. In finding T1 idle, the state microprocessor 130 addresses its high level interface to establish a network connection between a register and trunk T1. To that end the state microprocessor 130 sends a "31" command message to the RMP IPB 152 wherein the dialed digits (0047) are transferred to the selected register to be held until directed by the register microprocessor 150 to be outpulsed over trunk T1.

It is noted in brief summary that the originating switching system (PBX-A) has thus far serviced a user request for service by recognizing the DNS status of the dialed number and preparing itself to transfer the originally dialed digits toward the destination system (PBX-B) in which the destination station resides. In accordance with the principle aspects of the present invention a directory number plan has been established wherein a group of numbers, having the same hundreds/thousands digits, used within one switching system are identified within that system as "normal dialed" numbers and treated as so by the common control of the system. However, within the other systems of the switching complex that same group of numbers, when dialed by the residents of those systems, are treated as "dial number send" numbers to be transferred to the system in which the stations reside. Thus, as to any particular single switching system within a switching complex 14, the assigned group of numbers representative of that system's stations will be processed normally, but as to the other systems in the complex 14 that same group of directory numbers will be programmed within their data base memory structures as "dial number send" numbers.

Directing attention therefore to FIGS. 15-18, it will be shown the manner in which the destination system (PBX-B) recognizes the transferred digits and processes the call to completion as a "standard call". It should be noted that while the discussion proceeds in a sequential manner, some of the actions in PBX-A and PBX-B may be occurring simultaneously. This is a result of the asynchronous operation of the processor structures within the systems.

TMP OPERATION FIG. 15 (PBX-B)

FIG. 15 illustrates the operation of the PBX-B trunk microprocessor 160 in scanning the trunk sense points to detect new requests for service. It should be noted that the trunk T1 seizure command generated by the IPB command "12" in PBX-A, produces an indication on the trunk facility wires that PBX-A requests service of PBX-B. In detecting a trunk seizure, PBX-B trunk microprocessor 160 generates an "A6" command message and forwards the same to IPB 161 directed to the state microprocessor 130. The "A6" message includes the network slot number of trunk T1 and indicates that the trunk is now busy and unavailable for use otherwise.

In periodically scanning IPB 161 the state microprocessor 130, under the operation of the IPB analyzer program, detects the "A6" message, and updates its trunk status tables accordingly to show the busy status of the connecting trunk T1. In response to the received message, the state microprocessor 130 also issues a "6E" command message to IPB 172 to alert the data base microprocessor 170 to "busy" the T1 trunk. A flow chart at the DMP 170 operations in response to the "6E" message is not illustrated, however, FIG. 9 depicts such operations as would be executed by the PBX-B data base microprocessor.

As a redundant measure, the trunk microprocessor 160 scans the trunk sense point a second time (FIG. 16) to verify the initial indication was more than line noise and was in fact a bona fide trunk seizure. In response to the second seizure indication the trunk microprocessor 160 sends the command message "A8" to the state microprocessor 130 via the interconnecting IPB 161. The trunk equipment address is converted into its associated network slot number by the trunk microprocessor 160 and such information, as represented in Table 2 as LS8/MS4, is sent along with the reference code "A8" which the state microprocessor 130 recognizes as a bona fide seizure of an incoming trunk.

SMP OPERATION FIG. 17 (PBX-B)

In further carrying out the concepts of the present invention, the state microprocessor 130 decodes the "A8" message and proceeds with a network connection after a proper class of service of the trunk T1 is determined. To that end the state microprocessor 130 addresses its trunk class of service table to determine if the incoming trunk T1, identified by the NSN passed to it by the TMP 160, should be connected to an attendant console 56 (FIG. 2) or to a register to receive and store the transferred dialed digits. Since, for exemplary purposes, it is desired to complete a call without the assistance of an attendant, the COS table will indicate no attendant console is involved and a register is thus required. In addition, the COS table will indicate that this particular intersystem trunk T1 does not require dial tone to be sent back to PBX-A via the trunk but rather "quiet tone" should be sent. Referring again to FIG. 17, there is shown a decision made by the state microprocessor 130, based upon the COS table information, that the command message "23" (quiet tone) should be dispatched to the register microprocessor 150 rather than the "22" (dial tone) command message. It is this aspect of the present invention which prevents the originator, situated at PBX-A, from hearing the usual second dial tone when two switching systems are involved.

Figure 17:
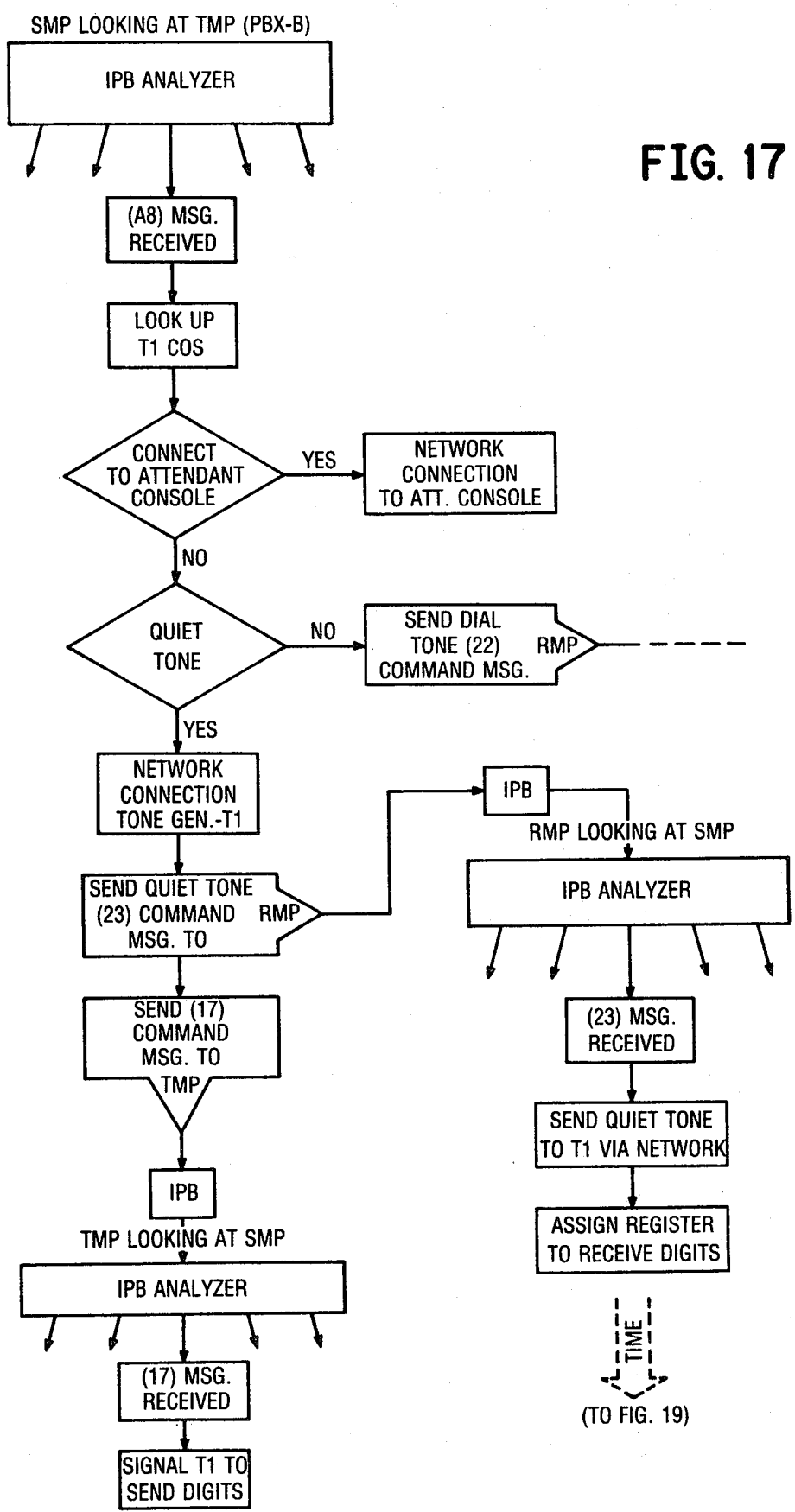

The righthand side of FIG. 17 shows the response of the register microprocessor 150, under control of the IPB analyzer program, in processing the reference code "23" message. In addition to initializing the specified register to receive the dialed digits, the register microprocessor 150 controls the digital tone generator 41 (FIG. 2) to send quiet tone through the network connection to trunk T1.

The state microprocessor 130, operating asynchronously with the register microprocessor, simultaneously assembles and sends to the trunk microprocessor IPB 162 a "17" command message which indicates that a register has been assigned. Accordingly, the trunk microprocessor 160 decodes the IPB command according to its command handler program and produces an indication in the T1 trunk circuit which signals PBX-A to start transmitting the dialed digits. This trunk indication may be in the form of a "wink", or "end of stop dial" or "ground start" electrical signals transmitted to PBX-A via the trunk T1 controlling wires.

TMP, SMP OPERATION FIG. 18 (PBX-A)

Figure 18:
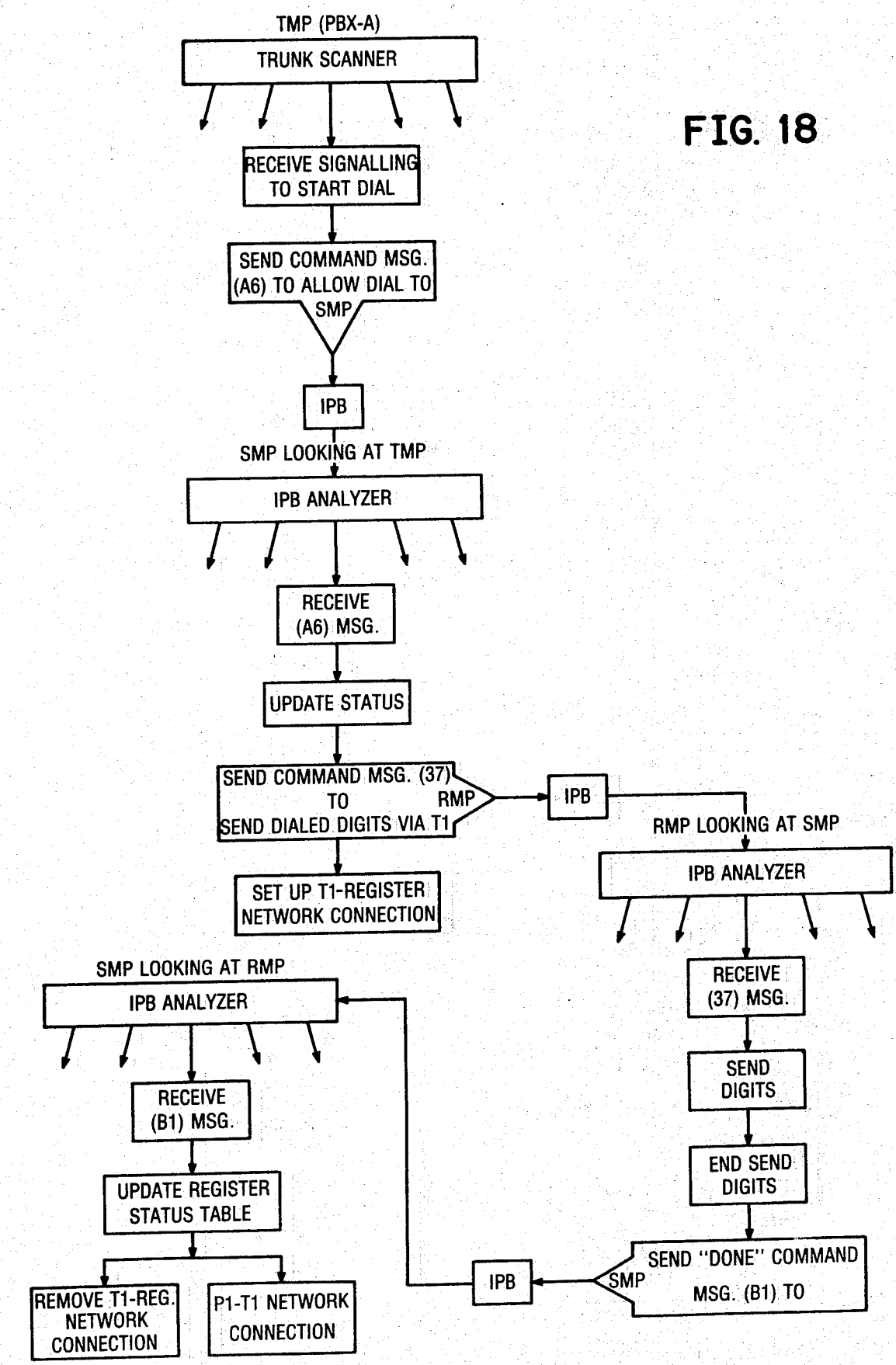
FIG. 18 shows the subprograms executed by the various microprocessors of the originating switching system to transfer the dialed number to the destination system.

With reference now to FIG. 18, and more particularly to the response of PBX-A in transferring the dialed digits (0047), there is shown first the trunk microprocessor 160 of PBX-A which scans the trunk signaling sense points. The detection of the "wink", "end of stop dial" or similar indication is translated by the trunk microprocessor 160 into an IPB reference code "A6" directed to the state microprocessor 130 via IPB 161. The command message, according to Table 3 indicates that outpulsing of the register-stored digits may commence.

FIG. 18 shows the normal SMP 130 action in scanning its IPBs but further shows that the command handler processing the "A6" reference code causes the trunk transient status table to be updated, and further, translates the command message into an IPB message "37" directed to the register microprocessor 150. The register microprocessor 150 controls the dial pulse receivers and senders 40 (FIG. 2) to outpulse the digits contained therein. It will be recalled, in the discussion of FIG. 10, that the dialed digits "0047" were stored in one of the dial pulse sender registers. Upon decoding the "37" reference code, the RMP 150 causes the sender register to outpulse the digits to PBX-B via the interconnecting trunk T1. When outpulsing is complete, RMP 150 assembles a "B1" IPB command message (FIG. 18) to inform the state microprocessor 130 that outpulsing is complete, to update its status table, and that the register is now idle and ready for reuse.

In receiving the "B1" command message, the state microprocessor 130 performs the matters noted and removes the network connection between the trunk T1 and the register. Furthermore, another network connection is established by the SMP 130 between the originating party P1 on the incoming side of the PBX-A, and the outgoing trunk T1 on the outgoing side of the PBX-A.

RMP, DMP OPERATION FIG. 19 (PBX-B)

At this point it should be noted that PBX-B processes the forwarded number as a "standard call" insofar as the destination station is resident therein.

Figure 19:
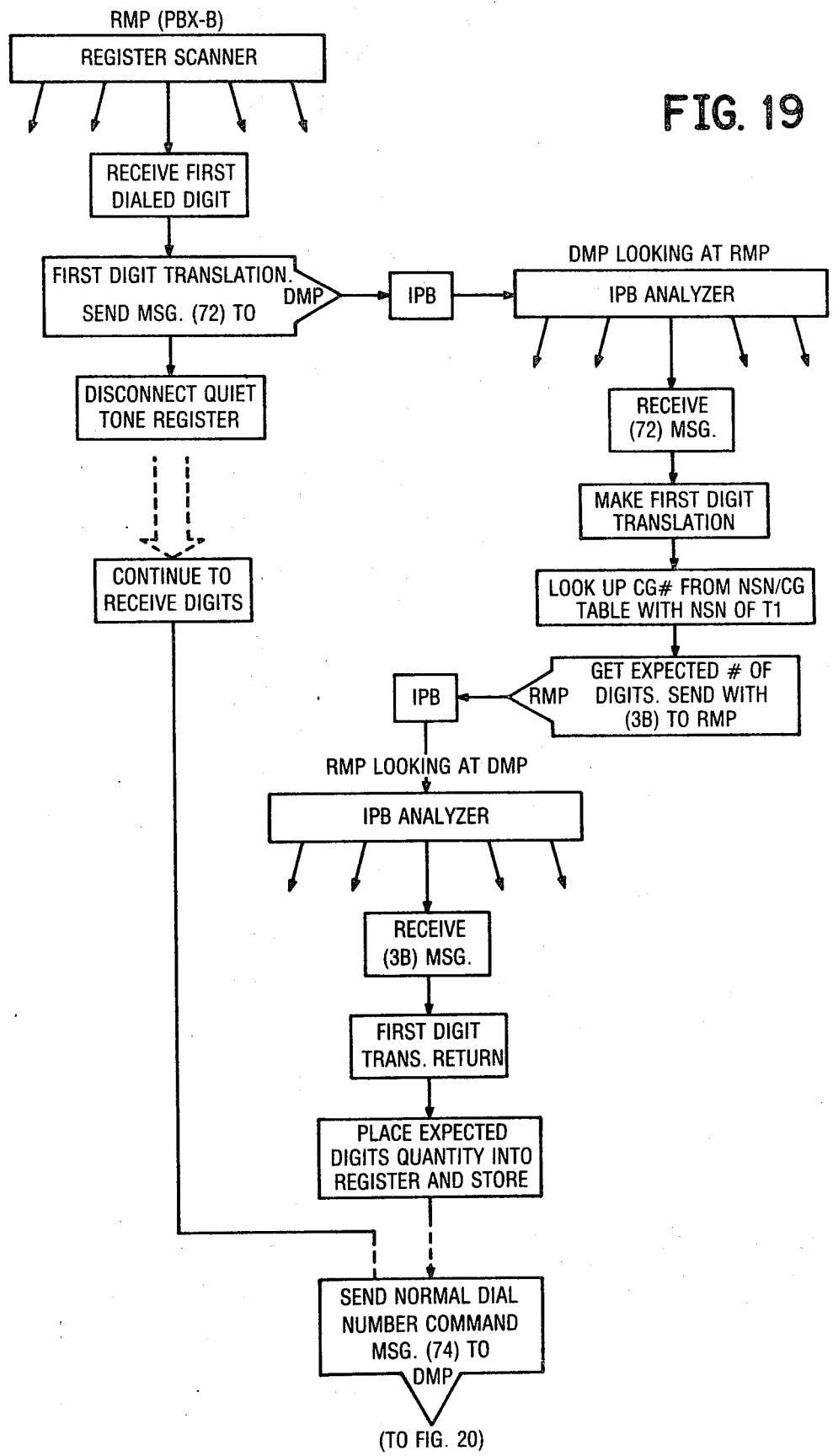
FIGS. 19-25 are flow charts showing the microprocessor program operations of the destination switching system in making the final connections between the calling and called parties.

Turning now to FIG. 19 there is shown at the top thereof the register scanner, under control of the register microprocessor 150 which first detects the occurrence of the leading thousands position digit. Immediately, the RMP 150 assembles a "first digit translation" command message "72" (R/Digit/LS8/MS4) for transfer to the data base microprocessor 170 via IPB 153. Upon receiving the first dialed digit the RMP 150 also disconnects the "quiet tone" extended to PBX-A via the trunk T1.

The response of the data base microprocessor 170 is fast enough even though it operates asynchronously, that it is able to report the number of expected digits before the hundreds position digit is received via trunk T1. The first digit translation performed in PBX-B is similar to that as noted in discussing the first dialed digit received by PBX-A via the originating subscriber line. In accordance with FIG. 19 the DMP 170 looks up the number of expected digits in the NSN/CG table to determine the number of expected digits and reports the finding back to the register microprocessor 150 by way of a "3B" IPB command. As noted in the bottom portion of FIG. 19, the register microprocessor 150 digests the "3B" IPB message, via its IPB analyzer program, while the register continues to collect and store the transferred digits. The RMP 150 assembles a command message "74" having the stored digits, for transferral to the data base microprocessor IPB 153.

DMP OPERATION FIG. 20 (PBX-B)

Figure 20:
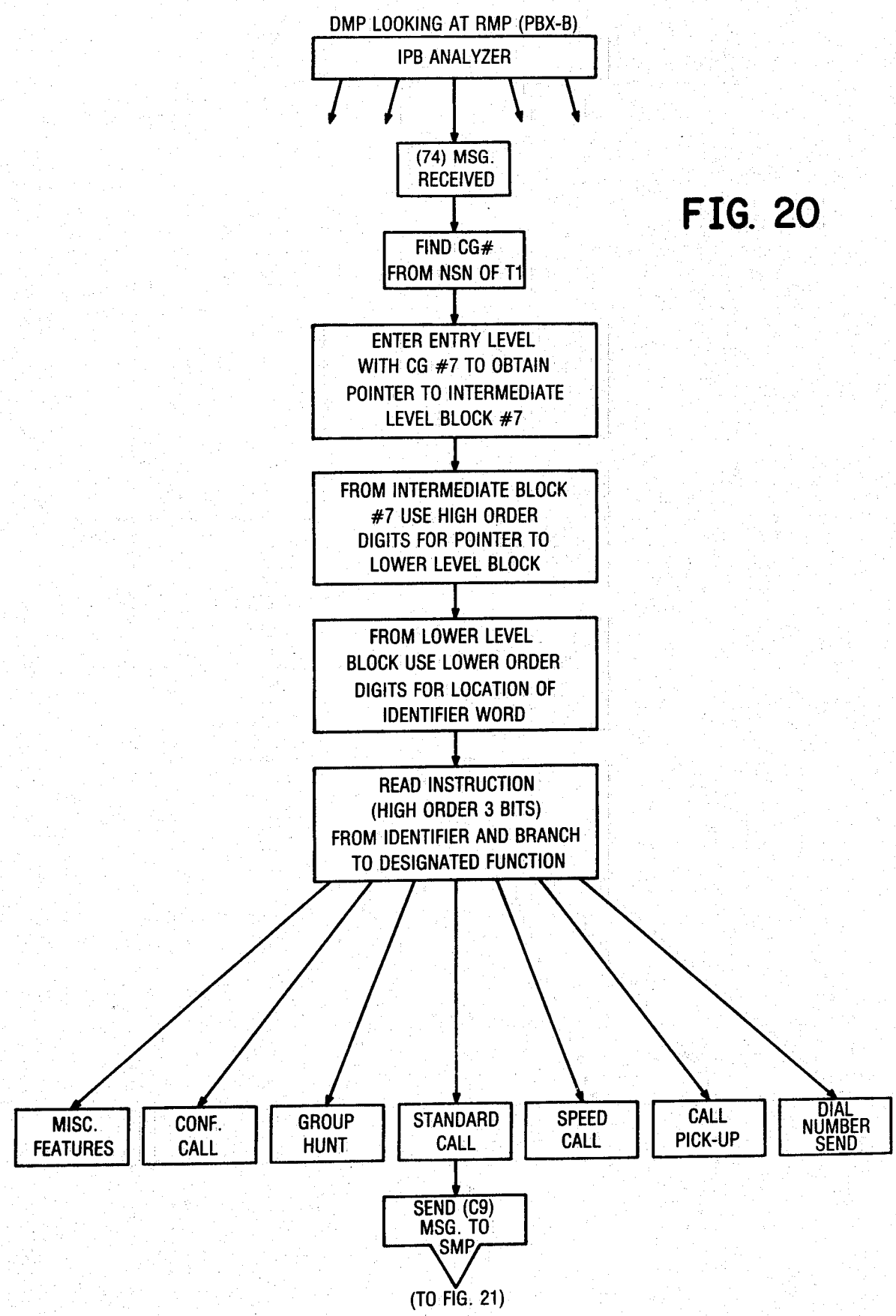

An observation of FIG. 20 reveals that the data base microprocessor 170 of PBX-B processes the "normal dialed number" command message in a manner similar as if the dialed number had originated with PBX-B.

As noted previously, and as between interconnected switching systems, there must be at least one interconnection trunk for each common customer group involved. Again, if plural customer groups do not have overlapping directory numbers, such groups may share a common trunk whereby the possibility of customer group confusion is obviated because any one directory number can then only belong to a specific customer group. Thus, through its tables and with the aid of the incoming trunk network slot number, the data base microprocessor 170 is able to determine the particular customer group with which the transferred dialed number is associated. This aspect of the present invention allows for directory numbers in the same customer group to be spread over the various switching systems within the complex 14. In other words, a switching system receiving a DNS number can identify which customer group is involved by ascertaining which particular trunk is involved, in the same manner in which a system can determine the customer group involved with a locally received directory number by looking at the particular subscriber line equipment address associated therewith.

With reference now to FIG. 20 and FIG. 5, it is seen that the data base microprocessor 170 is directed (FIG. 5 dotted line) to the seventh block of the intermediate level 308, within the dialed number table 300, by way of the pointer address found within location seven of the customer group entry level 306. This directory number table maneuver is similar to that exercised by PBX-A in reaching the intermediate level. However, programmed within the PBX-B directory number table intermediate level 308 is a pointer directing the DMP 170 to the lower table level 309. More specifically, the dialed number higher order digits (00) index the particular location in the intermediate level 308 where a pointer is now located. The pointer found is an address which points toward a block of locations in the lower level 309 of the DN table the particular location of which is indexed by the tens and units digits (47) of the dialed number. The ultimate data found in the DN table lower level 309, in the instant example, is the identifier word which designates the standard call function, the format of which is listed in FIG. 6 as identifier 311c.

The three instruction bits of the identifier word direct the DMP 170 to the "standard call" functional module which assembles the "C9" IPB message for delivery to the state microprocessor 130 via IPB 171 (bottom of FIG. 20).

SMP OPERATION FIG. 21 (PBX-B)

Figure 21:
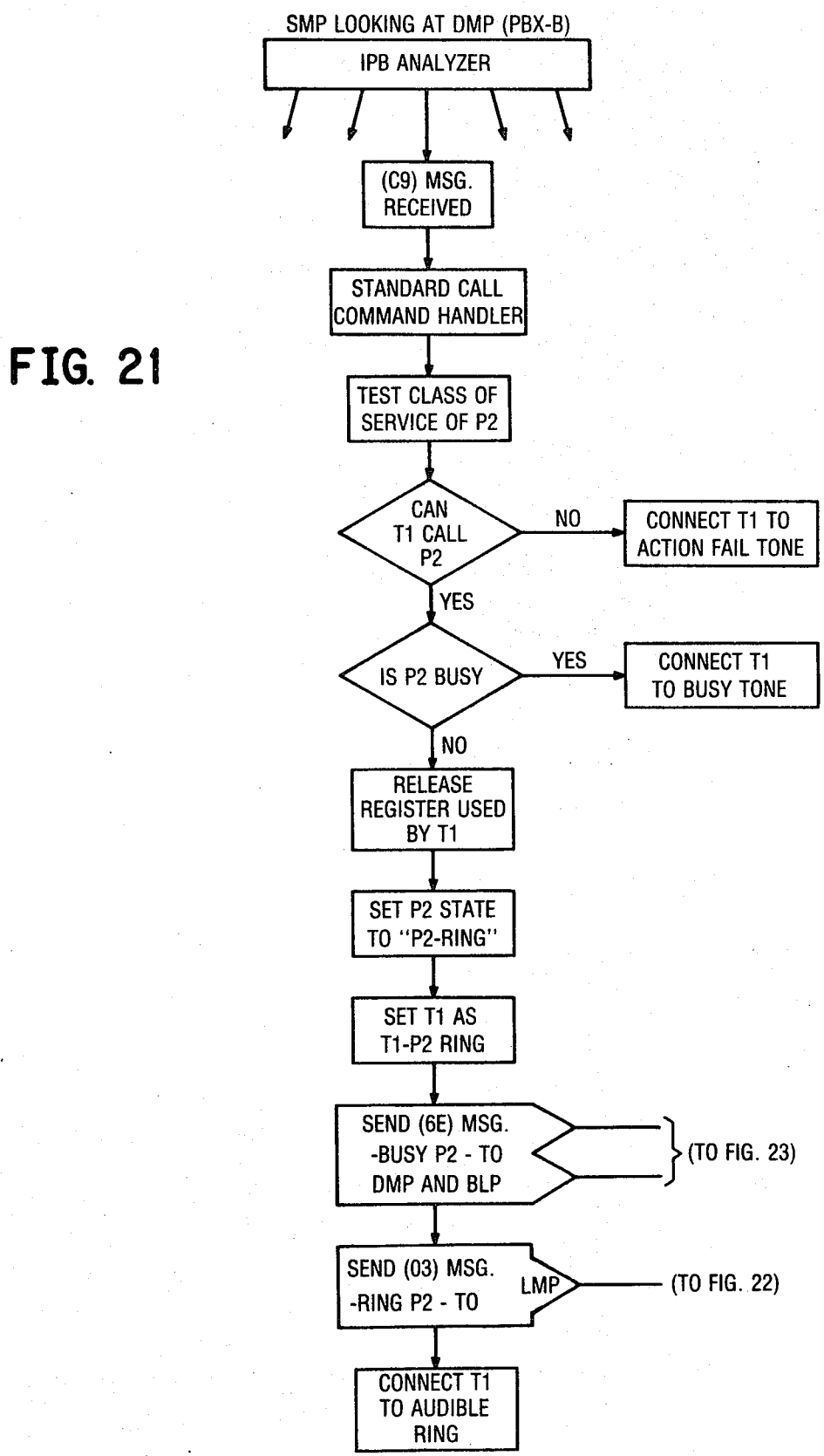

Now turning to FIG. 21, this flow chart represents the operation of the state microprocessor SMP 130 under control of the IPB analyzer program, in scanning its incoming IPBs for messages. The message previously loaded into the IPB 171 by the data base microprocessor 170 and identified by the ref. code "C9" is detected and read. The standard call command handler sub-program is invoked, and as shown in the lower portion of FIG. 21, the state microprocessor 130 tests the class of service of both T1 and P2 and if it finds no restrictions, tests whether the called party 92 is "busy", sets the appropriate states of T1 and P2, assembles a P2 busy command message and transmits the command message identified by the ref. code "6E" to outgoing IPBs 172 and 193. Also, the SMP 130 assembles a P2 ring command message "03" and forwards the same to another outgoing IPB 142 directed toward the line microprocessor 140.

As noted previously, the "03" reference code represents a "send ring" command to the line microprocessor 140. Finally, the state microprocessor 130 connects T1 to audible ring so that the originating party P1 is apprised that station P2 is being rung.

LMP OPERATION FIG. 22 (PBX-B)

Figure 22:
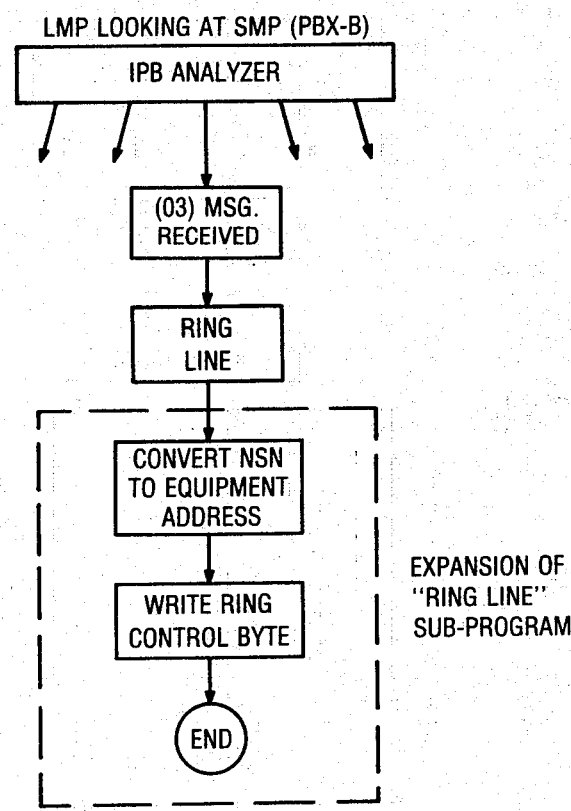
Figure 23:
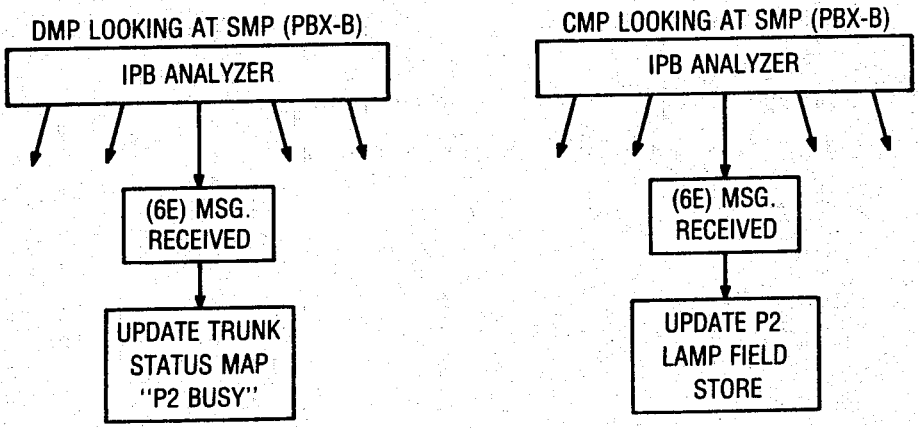

As indicated in FIG. 22, the line microprocessor LMP 140, in scanning the incoming IPB 142, unloads the command message represented by the ref. code "03" and recognizes that command message as a command to ring the P2 line. It receives, as indicated in Table 2 under the "03" code, the network slot number of the called party (either the party P2 or the station to which the original P2 calls have been diverted by a call forwarding function) wherein the network slot number is converted to an equipment address under a sub-program provided for that purpose for driving the line microprocessor LMP 140. The flow chart of the operation of the line microprocessor 140 terminates with the execution of the "writes ring control byte" step. The PBX-B line card circuits 33 (FIG. 2) act under control of the line microprocessor 140 to cause ringing current to be applied to the P2 line.

DMP & CLP OPERATION FIG. 23 (PXB-B)

In conducting its ministerial duties of keeping a constant vigil of the status of the systems lines and trunks, and as noted in connection with FIG. 21, the state microprocessor 130 assembles the "6E" command message and writes the message in the IPB's of both the data base and console microprocessors 170, 180. In receiving the IPB message and analyzing it, the DMP 170 updates its status tables to show P2 is busy, and the CMP 180 updates its lamp field store, and through the interconnection 193 (FIG. 3) the P2 lamp in the Busy Lamp Filed is illuminated.

LMP OPERATION FIG. 24 (PBX-B)

Figure 24:
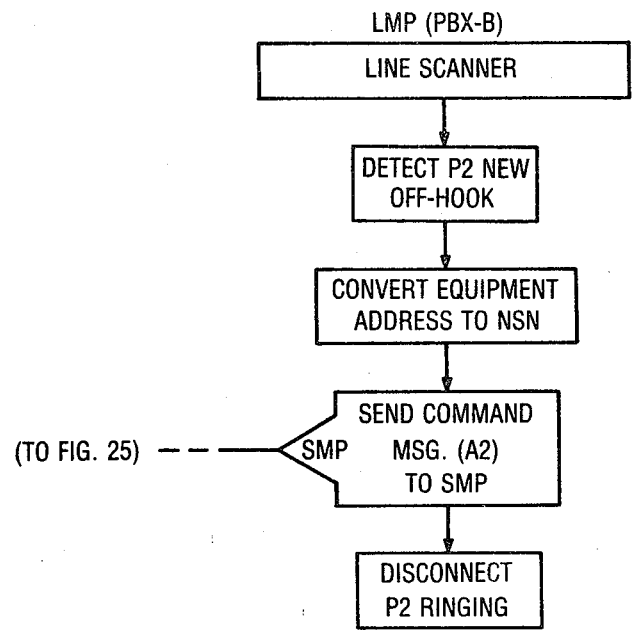

FIG. 24 shows the series of operations which lead to the eventual establishment of a communication path between P1 and P2 when P2 goes off-hook in response to ringing. In scanning the line circuits 34 (FIG. 2) the line microprocessor 140 detects a new off-hook change in the P2 line status and reports the same, via the "A2" reference code message, to the state microprocessor 130. Table 2 shows that the IPB message also contains the network slot number of the P2 line (converted from the P2 line equipment address by the LMP 140) which the SMP 130 uses along with the T1 NSN to establish a network connection between T1 and P2. In recognizing the P2 line origination, LMP 140 directs the particular line card to remove ringing current from the called line.

SMP AND LMP OPERATION FIG. 25 (PBX-B)

Figure 25:
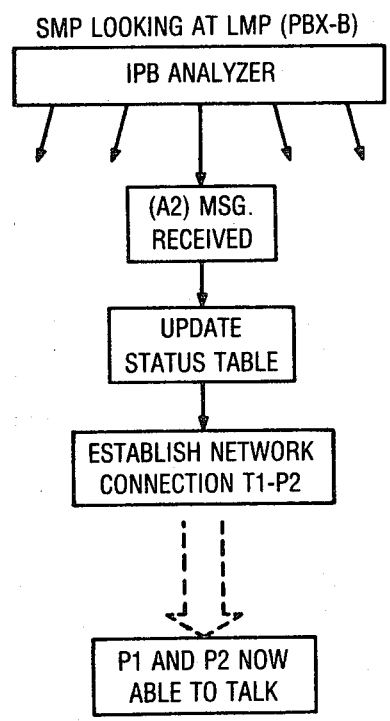

Directing attention now to FIG. 25 there is shown therein the state microprocessor 130 operations in receiving the above referenced "A2" command message, (line origination). The state microprocessor 130 updates its status tables to indicate the new P2 status (cut-through condition) and completes a network connection between the incoming trunk T1 and the destination party P2.

A two-way talk path between P1 and P2 has now been established having the following connecting paths:
P1 station to PBX-A line port,
PBX-A P1 line port to T1 port via network connection,
T1 interconnection between PBX-A and PBX-B,
PBX-B T1 to P2 line port via network connection,
PBX-B P2 line port to P2 station It should be understood that the sequence of events of the foregoing example is not exhaustive, but rather is illustrative of the manner in which one would select the various reference codes to achieve the "dial number send" function in a communication complex of the type described. Normally other ancillary steps would be involved in establishing a call connection, such as testing party P2 to determine if calls to that line are to be transferred to another extension, such example not appearing in order to maintain brevity.

In keeping with the stated objects of the invention, the "dial number send" function is not limited to the transfer of station extention numbers but also is equally useful in transferring feature codes, requests for the assistance of an attendant or operator, or a request for an outgoing trunk.

In this manner the present invention, by virtue of the data base memory structures, is able to cooperate and make available the facilities of one switching system to all other connected switching systems comprising the telecommunication complex. As noted in the Background of the Invention portion of this disclosure, the cooperation of facilities was heretofore available only under the auspices and control of the originating station user controlling all switching systems in the chain by way of the standard telephony signalling means, i.e. access codes, dial tones and dialing digits.

In summary, the illustrated data base structure of the plurality of interconnected switching systems allows for the communication of dialed numbers between an originating and destination switching system of a switching complex in a manner that eliminates the need for the calling party to know which system the dialed number resides within. To this end, the calling party need not dial trunk access codes or dial station numbers after having received a dial tone from the destination switch, but rather the calling party need only dial the directory number after a first dial tone whereupon the originating system decides within which system the dialed number is resident.

More particularly, the processor control memory structures of the various switching systems of the telecommunication complex produce a direct redial of the original directory number to an outgoing trunk known to be directed toward the switching system having connected thereto the called station. In essence, the data base memories of each of the switching systems are structured to correlate nonresident directory numbers with communication lines directed toward switching systems in which the directory number is resident.

The fact that a directory number represents a particular geographically located station is advantageously made available in the data base memory structures so that the calling party is relieved of the burden to remember such information. The cooperation between the switching systems of a complex is thereby enhanced while yet only transferring therebetween directory number information.

TABLE 1

| IPB ADDRESS | | |
|---|---|---|
| JJX0 | 8 BIT DATA/FLAG | 1st BYTE |
| JJX1 | 8 BIT DATA | |
| JJXF | 8 BIT DATA | 16th BYTE |

TABLE 2

IPB COMMAND FORMAT LIST

ABBREVIATIONS USED IN IPB COMMAND LISTING

| | |
|---|---|
| A | ATTENDANT |
| ACTFLAG | ACTION FLAG (X'80'--FAILURE; X'40'--CM) |
| AL | ALPHA |
| AS | ATTENUATION SETTING |
| ARG | ARGUMENT |
| BI | BUSY/IDLE |
| CCF | CODE CALL FLAG NIBBLE |
| CFNA T-O | CALL FORWARD NO ANSWER TIME-OUT |
| CG | CUSTOMER GROUP |
| CMT | CALL MANAGEMENT TYPE |
| CONF | CONFERENCE |
| CONS | CONSOLE |
| COS | CLASS OF SERVICE |
| CS | SECONDARY COMMAND CODE FOR RECENT CHANGE |
| DN | DIRECTORY NUMBER |
| DSCRPT1,DSCRPT2 | DATA BASE DESCRIPTOR |
| DSPL | DISPLAY |
| ET | ELAPSED TIME |
| F | FLAG |
| FNS | FLEXIBLE NIGHT SERVICE |
| GB | GROUP BUSY |
| G/S | GROUP/SPECIFIED FLAG |
| HCID | HIGH-ORDER CONFERENCE ID |
| HOG (OR HIG) | HIGH-ORDER PART OF GROUP NUMBER |
| HR | HOURS |
| IAC | INTERNAL ACCESS CODE |
| LCID | LOW-ORDER CONFERENCE ID |
| LOG | LOW-ORDER PART OF GROUP NUMBER |
| LR | LAST RESORT NSN |
| LS8 | LEAST SIGNIFICANT 8 DIGITS OF NSN |
| MIN | MINUTES |
| MS4 | MOST SIGNIFICANT 4 DIGITS OF NSN |
| NS | NIGHT SERVICE |
| NSN | NETWORK SLOT NUMBER |
| OF | OVERRIDE FLAG |
| OCOS | ORIGINATING CLASS OF SERVICE |
| ODMT | OUTSIDE DIALING MONITOR TECHNIQUE |
| OG | OUTGOING |
| OW | OUTWARD |
| P | PARTY |
| PRIV | PRIVILEGE LEVEL (CM) |
| PS | PARTY SPLITTING |
| PP | PARTY PARKED |
| QF | QUANTITY FOLLOWING, # OF BYTES FOLLOWING IN COMMAND |
| R | REGISTER EQUIPMENT NUMBER |
| REQST | REQUEST |
| RM | ROOM |
| RMJ | RIGHT-MOST JUSTIFIED |
| RSN | REASON |
| RST | RESTRICT |
| S | STATION |
| SAC | STANDARDIZED ACCESS CODE |
| SG | STATION GROUP |
| SH | SECRETARY HUNT |
| STD | STANDARD |
| T | TRUCK |
| TCOS | TERMINATING CLASS OF SERVICE |
| TG | TRUNK GROUP |
| TGN | TRUNK GROUP NUMBER |
| TSP | TRUNK GROUP PERMIT |

TABLE 2-continued
IPB COMMAND FORMAT LIST

| | | | | |
|---|---|---|---|---|
| TSF | | TRUNK SPECIFIC FLAG | | |
| T. TOLL R. L. | | TERMINATING TOLL RESTRICT LEVEL | | |
| V | | VECTOR POINTING TO ASSOCIATED ATTENDANT'S LOOP | | |
| XD | | EXPECTED DIGITS | | |
| X | | UNUSED NIBBLE | | |
| # DEL | | NUMBER OF DIGITS DELETED IN CALL MANAGEMENT TRANSLATION | | |
| # INS | | NUMBER OF DIGITS INSERTED IN CALL MANAGEMENT TRANSLATION | | |

| CODE | RCVR. | SENDER | COMMAND DESCRIPTION | FORMAT |
|---|---|---|---|---|
| 00 | | | RESERVED FOR BUFFER-IDLE FLAG | |
| 01 | LMP | SMP | MAINTENANCE | LS8/MS4 |
| 02 | LMP | SMP | TERMINATE RING | LS8/MS4 |
| 03 | LMP | SMP | SEND RING | LS8/MS4 |
| 04 | LMP | SMP | DISABLE FLASH | LS8/MS4 |
| 05 | LMP | SMP | ENABLE FLASH | LS8/MS4 |
| 06 | LMP | SMP | SET ATTENUATION | LS8/AS CODE,MS4 |
| 07 | LMP | SMP | SEND MSG. WAITING RING | LS8/MS4 |
| 08 | LMP | SMP | RECENT CHANGE | CS/ARG1/ARG2/ARG3 |
| 09 | | | UNASSIGNED | |
| 0A | | | UNASSIGNED | |
| 0B | | | UNASSIGNED | |
| 0C | | | UNASSIGNED | |
| 0D | | | UNASSIGNED | |
| 0E | | | UNASSIGNED | |
| 0F | | | UNASSIGNED | |
| 10 | ANY | ANY | MAINTENANCE | |
| 11 | TMP | SMP | MAINTENANCE | |
| 12 | TMP | SMP | SEIZE TRUNK | LS8/MS4 |
| 13 | TMP | SMP | REQUEST TRUNK DISC. | LS8/MS4 |
| 14 | TMP | SMP | DIALING COMPLETE(UNUSED) | LS8/MS4 |
| 15 | TMP | SMP | P2 ANSWER | LS8/MS4 |
| 16 | TMP | SMP | DISCONNECT 9TH BIT | LS8/MS4 |
| 17 | TMP | SMP | REGISTER ASSIGNED | LS8/MS4 |
| 18 | TMP | SMP | REG. RELEASE (NOT USED) | LS8/MS4 |
| 19 | TMP | SMP | RECOGNIZE FLASH(UNUSED) | LS8/MS4 |
| 1A | TMP | SMP | DISREGARD FLASH(UNUSED) | LS8/MS4 |
| 1B | TMP | SMP | SET ATTENUATION | LS8/AS CODE,MS4 |
| 1C | TMP | SMP | RECENT CHANGE | CS/ARG1/ARG2/ARG3/ARG4 |
| 1D | TMP | SMP | FLASH REQUEST | LS8/MS4 |
| 1E | | | UNASSIGNED | |
| 1F | | | UNASSIGNED | |
| 20 | | | UNASSIGNED | |
| 21 | RMP | — | MAINTENANCE | |
| 22 | RMP | SMP | ORIGINATION--DIAL TONE | R/LS8/MS4 |
| 23 | RMP | SMP | ORIGINATION--QUIET TONE | R/LS8/MS4 |
| 24 | RMP | SMP | RECEIVE DIRECTORY NUMBER FOR FEATURE SETUP | R/LS8/MS4/IAC |
| | | | IAC | |
| | | | FF    FLASH (SPLIT) STATION | |
| | | | 04    SET UP FORWARD ALL CALLS | |
| | | | 05    SET UP PATIENT CALL DIVERSION | |
| | | | 06    CANCEL PATIENT CALL DIVERSION | |
| | | | 07    SET UP FORWARD IF BUSY | |
| | | | 0E    MESSAGE WAITING | |
| | | | 11    STATION OUT DIAL RESTRICT | |
| | | | 12    STATION OUT DIAL ALLOW | |
| | | | 14    CANCEL REMOTE DIVERSION | |
| 25 | RMP | SMP | SET ATTENUATION | LS8/AS CODE,MS4 |
| 26 | RMP | SMP | RECEIVE 4 DIGITS FOR FEATURE SETUP | R/LS8/MS4/IAC |
| | | | IAC | |
| | | | 0A    DIAL BY NSN | |
| 27 | RMP | SMP | RECEIVE 8 DIGITS FOR FEATURE SETUP | R/LS8/MS4/IAC |
| | | | IAC | |
| | | | 01    SET UP FLEXIBLE NIGHT SERVICE | |
| | | | 08    SET UP WAKE UP | |
| | | | 13    SET UP REMOTE DIVERSION | |
| 28 | RMP | SMP | ORIGINATE C.M. FEATURE | R/F,CMT/CGN,PRIV |
| 29 | | | UNASSIGNED | |
| 2A | | | UNASSIGNED | |
| 2B | | | UNASSIGNED | |
| 2C | RMP | SMP | REMOVE C.M. CALL FROM Q | R/LS8/MS4 |
| 2D | DMP | SMP | SET SPEED DIALING | R/LS8/CG,MS4/IAC |
| | | | IAC | |
| | | | 0C    SET UP SPEED CALL | |
| 2E | | | UNASSIGNED | |
| 2F | RMP | SMP | COLLECT & RETURN N DIGS | R/LS8/CG,MS4/N |
| 30 | RMP | SMP | RECEIVE SUFFIX DIGIT | R |
| 31 | RMP | SMP | SEND DIGITS GIVEN | R/XD/D1,D2,D3,D4/.../D13,D14 |
| 32 | RMP | SMP | RECEIVE & SEND DIGITS | R/ODMT |

TABLE 2-continued
IPB COMMAND FORMAT LIST

| | | | | |
|---|---|---|---|---|
| 33 | RMP | SMP | TOLL RESTRICT | R/LS8(TRNK)/MS4/TRNK'S TOLL/ODMT |
| 34 | RMP | SMP | RCV., SEND & RESTRICT | R/LS8(TRNK)/MS4/TRNK'S TOLL/ODMT |
| 35 | RMP | SMP | REGISTER ABORT | R |
| 36 | RMP | SMP | STOP DIAL | R |
| 37 | RMP | SMP | ALLOW DIAL | R |
| 38 | RMP | SMP | RCV, SUFFIX DIGIT/GRP | R |
| 39 | RMP | SMP | COLLECT DIGITS FOR CDR | R/LS8(TRNK)/MS4/TRNK'S TOLL/ODMT |
| 3A | RMP | SMP | RCV, & SEND CODE CALL | R/CCF,- |
| 3B | RMP | DMP | RECEIVE N MORE DIGITS | R/N |
| 3C | RMP | DMP | DIAL TONE CONTROL | R/LS8/MS4 |
| 3D | RMP | DMP | GROUP BUSY FOR C.M. | R |
| 3E | RMP | SMP | RECENT CHANGE | CS/ARG1/ARG2/ARG3 |
| 3F | RMP | DMP | RECENT CHANGE | CS/ARG1/ARG2/ARG3 |
| 40 | | | UNASSIGNED | |
| 41 | CMP | — | MAINTENANCE | |
| 42 | CMP | SMP | ATTENDANT CALL | LS8/MS4/TYPE |
| 43 | | | UNASSIGNED | |
| 44 | CMP | SMP | RELEASE LOOP TO ACD | LS8(A)/MS4/ACD GRP/CGN/D3,D4(A)/D2,D1/V |
| 45 | | | UNASSIGNED | |
| 46 | CMP | SMP | DISCONNECT IN QUEUE | LS8/MS4 |
| 47 | CMP | SMP | DISCONNECT IN LOOP | LS8(P)/MS4/LS8(A)/MS4 |
| 48 | CMP | SMP | P2 ANSWER | LS8(P2)/MS4/LS8(A)/MS4 |
| 49 | CMP | SMP | SPLIT CALL TO SP. ATTD | LS8(S)/MS4/LS8(P)/MS4/LS8(A)/MS4 |
| 4A | CMP | SMP | AFFIRM (CONN. COMPLETE) | LS8(P2)/MS4/V |
| 4B | CMP | SMP | DISAFFIRM (CONN. FAIL) | LOG/TSR,HIG(IF GB)/V/RSN |
| 4C | CMP | SMP | WAKE-UP SUCCESS/FAIL | LS8/F,MS4 |
| 4D | CMP | SMP | TAAS REQUEST | LS8/MS4/TAAS COS |
| 4E | CMP | SMP | SPLIT TO ATTENDANT | LS8(PS)/MS4/LS8(A)/MS4 |
| 4F | CMP | SMP | CALL TO SPECIFIC ATTD | LS8(P)/MS4/LS8(A)/MS4 |
| 50 | CMP | SMP | CONFERENCE NET STATUS | LCID/HCID |
| 51 | CMP | SMP | CALL PICKUP TO ATTD | LS8(OLD)/MS4/LS8(NEW)/MS4/LS8(A)/MS4 |
| 52 | | | UNASSIGNED | |
| 53 | CMP | BMP | REQUEST C.G. INIT. | NONE |
| 54 | CMP | BMP | DSS CALL | CONS #/D1,D2,D3,D4 |
| 55 | BMP | CMP | BUSY/IDLE STATUS | FLAG,CG/D1,D2/D3,D4 |
| 56 | BMP | CMP | C.G. INFO. TO BLF | 8 (FLAG, CG, FLAG, CG) |
| 57 | CMP | DMP | TRAFFIC MEASURING | TRAF CODE(1,2,3)/ARG1 |
| 58 | DMP | SMP | STD. COS RETRIEVAL | LS8/CG#,MS4/COS/TGP#1/TGP#2/DSPL#1/ DSLP#2/DN/DN/TAAS GRP/TYPE |
| 59 | CMP | DMP | GRP CAMP-ON FOUND | LS8/MS4/LOG/TSF,HIG/V |
| 5A | CMP | DMP | TG BUSY/IDLE STATUS | CG/15-8 BI/7-0 BI |
| 5B | CMP | DMP | WAKE-UP TIME | LS8/MS4/MIN/HRS |
| 5C | CMP | DMP | SPLIT COS RETRIEVAL | LS8/CG#,MS4/COS/TGP#1/TGP#2/DSPL#1/ DSLP#2/DN/DN/TAAS GRP/TYPE/LS8/CGN,MS4 |
| 5D | CMP | DMP | FLEX. N.S. RETRIEVAL | LS8/CG#,MS4/COS/TGP#1/TGP#2/DSPL#1/ DSLP#2/DN/DN/TAAS GRP/TYPE/LS8/CGN,MS4 |
| 5E | CMP | DMP | NSN TO DN REQUEST | LS8/MS4/D1,D2,D3,D4 |
| 5F | CMP | DMP | RECENT CHANGE | CS/ARG1/ARG2/ARG3 |
| 60 | | | UNASSIGNED | |
| 61 | DMP | — | MAINTENANCE | |
| 62 | | | UNASSIGNED | |
| 63 | | | UNASSIGNED | |
| 64 | DMP | SMP | AIOD SEND | LS8/MS4 |
| 65 | DMP | SMP | GROUP CAMP-ON/Q REPLACE | LS8/F,MS4/LOG(LS8)/HIG(MS4) |
| 66 | DMP | SMP | MSG.REGISTRATION PEG | LS8/MS4/COUNT |
| 67 | DMP | SMP | RECENT CHANGE | CS/ARG1/ARG2/.../ARG8 |
| 68 | DMP | SMP | REQUEST DN TO NSN TRANS | CG/D3,D4/D1,D2 |
| 69 | DMP | SMP | HOT LINE | LS8/MS4 |
| 6A | DMP | SMP | TRAFFIC USAGE DATA | LS8/MS4 |
| 6B | DMP | SMP | REQUEST C.F. NSN | LS8/MS4(P1)/LS8/MS4(P2-OLD) |
| 6C | DMP | SMP | TRAFFIC MEASURING | 01/LS8/MS4/7 BYTES MEANINGLESS DATA<br>--- OR ---<br>02/ARG1/AGR2/.../ARG9 |
| 6D | | | UNASSIGNED | |
| 6E | DMP | SMP | BUSY | LS8/MS4 (COULD ALSO BE SENT TO BUP) |
| 6F | DMP | SMP | IDLE | LS8/MS4 (COULD ALSO BE SENT TO BUP) |
| 70 | | | UNASSIGNED | |
| 71 | DMP | RMP | REQUEST TONE CONTROL | R/LS8/MS4 |
| 72 | DMP | RMP | REQUEST 1ST DIG TRANS | R/DIGIT/LS8/MS4 |
| 73 | DMP | RMP | TOLL RESTRICT INQUIRY | LS8(T)/MS4/T. TOLL R.L./D1,D2,D3,D4,D5,D6 |
| 74 | DMP | RMP | REPORT DIALED #, 4 DIGS | LS8/MS4/IAC/D3,D4/D1,D2 |

```
IAC
04    SET UP FORWARD ALL CALLS
05    SET UP PATIENT CALL DIVERSION
06    CANCEL PATIENT CALL DIVERSION
07    SET UP FORWARD IF BUSY
0A    DIAL BY NSN
0E    MESSAGE WAITING
11    STATION OUT DIAL RESTRICT
12    STATION OUT DIAL ALLOW
14    CANCEL REMOTE DIVERSION
```

TABLE 2-continued

IPB COMMAND FORMAT LIST

| | | | | |
|---|---|---|---|---|
| | | | FF  NORMAL DIALED NUMBER | |
| 75 | DMP | RMP | REPORT DIALED #, 8 DIGS | LS8/MS4/IAC/D7,D8/D5,D6/D3,D4/D1,D2 |
| | | | IAC | |
| | | | 13  SET UP REMOTE DIVERSION | |
| | | | 08  SET UP WAKE UP | |
| | | | 01  SET UP FLEXIBLE NIGHT SERVICE | |
| 76 | DMP | RMP | REQUEST TRUNK FOR C.M. | R/LS8/MS4/TGN |
| 77 | | | UNASSIGNED | |
| 78 | | | UNASSIGNED | |
| 79 | | | UNASSIGNED | |
| 7A | DMP | RMP | DIALED #,SET SPEED DIAL | LS8/CG,MS4/D3,D4/D1,D2(SD#)/ D3,D4/D1,D2(T)/QF/D1,D2/.../D13,D14 |
| | | | IAC | |
| | | | 0C  SET UP SPEED CALL | |
| 7B | | | UNASSIGNED | |
| 7C | | | UNASSIGNED | |
| 7D | | | UNASSIGNED | |
| 7E | | | UNASSIGNED | |
| 7F | | | UNASSIGNED | |
| 80 | | | UNASSIGNED | |
| 81 | | | UNASSIGNED | |
| 82 | DMP | RMP | RECENT CHANGE | CS/ARG1/ARG2/ARG3 |
| 83 | | | UNASSIGNED | |
| 84 | | | UNASSIGNED | |
| 85 | | | UNASSIGNED | |
| 86 | | | UNASSIGNED | |
| 87 | | | UNASSIGNED | |
| 88 | DMP | CMP | REQUEST CONSOLE COS | LS8/MS4/TYPE |
| 89 | DMP | CMP | REQUEST CONS COS,SPLIT | LS8/MS4/LS8/MS4/TYPE |
| 8A | DMP | CMP | DN DIALED | LS8(A)/MS4/D3,D4/D1,D2/V |
| 8B | DMP | CMP | RESTRICT/PERMIT TG | LS8(A)/MS4/D3,D4/D1,D2/FLAG |
| 8C | | | UNASSIGNED | |
| 8D | DMP | CMP | GROUP CAMP-ON | LOG/TSF,HIG/V |
| 8E | DMP | CMP | NSN TO DN TRANSLATION | LS8/MS4/? |
| 8F | DMP | CMP | RECENT CHANGE | CS/ARG1/ARG2/ARG3 |
| 90 | DMP | CMP | TRAFFIC MEASURING | TRAF CODE(1,2)/ARG1/.../ARG9 |
| 91 | | | UNASSIGNED | |
| 92 | ACD | SMP | ACD CALL | LS8(P1)/F,MS4/ACD GRP/CGN,X/D3,D4/D1,D2 |
| 93 | ACD | SMP | ACD PARTY DISCONNECT | LS8(P1)/F,MS4/LS8(P2)/F,MS4/LS8(P3)/F,MS4 |
| 94 | ACD | SMP | ACTION SUCCESS OR FAIL | LS8(P1)/CODE,MS4/LS8(P2)/MS4 |
| 95 | ACD | SMP | P2 ANSWERS | LS8(P1)/MS4/LS8(P2)/F,MS4 |
| 96 | ACD | SMP | SPECIAL SERV. ACC. CODE | LS8(P1)/F,MS4/ARG1/ARG2/ARG3/ARG4 |
| 97 | | | UNASSIGNED | |
| 98 | | | UNASSIGNED | |
| 99 | | | UNASSIGNED | |
| 9A | | | UNASSIGNED | |
| 9B | ACD | SMP | RECENT CHANGE | CS/ARG1/ARG2/ARG3/ARG4/ARG5 |
| 9C | | | UNASSIGNED | |
| 9D | | | UNASSIGNED | |
| 9E | | | UNASSIGNED | |
| 9F | | | UNASSIGNED | |
| A0 | | | UNASSINGED | |
| A1 | SMP | — | MAINTENANCE | |
| A2 | SMP | LMP | LINE ORIGINATION | LS8/MS4 |
| A3 | SMP | LMP | LINE FLASH | LS8/MS4 |
| A4 | SMP | LMP | LINE DISCONNECT | LS8/MS4 |
| A5 | SMP | LMP | RECENT CHANGE | CS/ARG1/ARG2/ARG3 |
| A6 | SMP | TMP | BUSY OUT | LS8/MS4 |
| A7 | SMP | TMP | RECENT CHANGE | CS/ARG1/ARG2/ARG3 |
| A8 | SMP | TMP | INCOMING TRUNK | LS8/MS4 |
| A9 | SMP | TMP | TRUNK DISCONNECT | LS8/MS4 |
| AA | SMP | TMP | P2 ANSWER ON O.G. TRUNK | LS8/MS4 |
| AB | SMP | TMP | STOP DIAL (NOT USED) | LS8/MS4 |
| AC | SMP | TMP | ALLOW DIAL | LS8/MS4 |
| AD | SMP | TMP | TRUNK FLASH (NOT USED) | LS8/MS4 |
| AE | SMP | TMP | SEIZE FAIL | LS8/MS4 |
| AF | SMP | TMP | MSG. REGISTRATION PEG | LS8/MS4 |
| B0 | SMP | RMP | N DIGITS COLLECTED | R/QUAN/D7,D8/D5,D6/D3,D4/D1,D2 |
| B1 | SMP | RMP | REG DONE,TIMEOUT,DISC. | R/FUNCTION (1,2 OR 3) |
| B2 | SMP | RMP | SUFFIX DIGIT | R/DIGIT |
| B3 | SMP | RMP | DGTS COLLECTED FOR COR | R/CMFLAG,XD/D1,D2/.../D25,D26 --- OR --- R/CMFLAG,#DEL/#INS/XD/D1,D2/.../D21,D22 |

THE TYPE OF FORMAT IPB B3 HAS DEPENDS ON THE VALUE OF THE 3-BIT CMFLAG:
    000    FIRST FORMAT
    010    FIRST FORMAT
    100    SECOND FORMAT
    101    SECOND FORMAT
ALL OTHER VALUES FOR CMFLAG ARE INVALID
UPPER BIT (B7) OF CMFLAG    CM DIGITS TRANSLATION
B6    CM AUTHORIZATION CODE

TABLE 2-continued
IPB COMMAND FORMAT LIST

| | | | | |
|---|---|---|---|---|
| | B5 | | CM DIGITS WITH 1+ DIALING | |
| B4 | | | UNASSIGNED | |
| B5 | SMP | RMP | MULTIPURPOSE C.M. IPB | IAC/ARG1/ARG2/ARG3 |
| B6 | SMP | RMP | AUDIBLE TONE CYCLE | CYCLE # |
| B7 | SMP | CMP | LOOP RELEASED TO ACD | LS8(P1)/MS4/LS8(A)/MS4/ACD GRP/CGN/D3,D4/D1,D |
| B8 | SMP | CMP | PARK1 | LS8(P)/MS4/LS8(A)/MS4 |
| B9 | SMP | CMP | TALK1 | LS8(P)/MS4/LS8(A)/MS4/V |
| BA | SMP | CMP | PARK2 | LS8(P1)/MS4/LS8(P2)/MS4/LS8(A)/MS4 |
| BB | SMP | CMP | TALK2 | LS8(P1)/MS4/LS8(P2)/MS4/LS8(A)/MS4/V |
| BC | SMP | CMP | RELEASE | LS8(P1)/MS4/LS8(P2)/MS4 |
| BD | SMP | CMP | DISCONNECT/FLASH | LS8(P)/FLASH,MS4/LS8(A)/MS4 |
| BE | SMP | CMP | START DIAL | LS8(A)/MS4/V |
| BF | SMP | CMP | CONFERENCE | LS8(P)/MS4/LCID/HCID/LS8(A)/MS4/V |
| C0 | SMP | CMP | OVERRIDE DISCONNECT | LS8(P2)/MS4/LS8(A)/MS4 |
| C1 | SMP | CMP | OVERRIDE TALK | LS8(P2)/MS4/LS8(A)/MS4 |
| C2 | SMP | CMP | UNSERVICED | LS8/MS4 |
| C3 | SMP | CMP | CHAIN CALL | LS8/MS4 |
| C4 | SMP | CMP | WAKE-UP RING | LS8/MS4 |
| C5 | SMP | CMP | CAMP-ON ATTEMPT | LS8(P1)/MS4/LS8(P2)/TSF,MS4/LS8(A)/MS4/V |
| C6 | SMP | CMP | MAKE/UNMAKE BUSY | LS8/F,MS4 |
| C7 | SMP | CMP | NIGHT II | LS8(P1)/MS4/LS8(P2)/MS4/LS8(A)/MS4/V |
| C8 | SMP | CMP | RECENT CHANGE | CS/ARG1/ARG2/ARG3/ARG4 |
| C9 | SMP | DMP | STANDARD CALL | LS8(P1)/TRCOS(P1),MS4/LS8(P2)/ TOLL.NIB(P1),MS4(P2)/TOLL BYTE(P2)/CFNA T-O |
| CA | SMP | DMP | ACCESS CODE DIALED | LS8/MS4/IAC/ARG1/ARG2 |

IAC
- 01 SET UP FLEXIBLE NIGHT SERVICE
- 02 ATTENDANT PRIORITY CALL I - FIRE
- 03 ATTENDANT PRIORITY CALL II - CODE BLUE
- 04 SET UP FORWARD ALL CALLS
- 05 SET UP PATIENT CALL DIVERSION
- 06 CANCEL PATIENT CALL DIVERSION
- 07 SET UP FORWARD IF BUSY
- 08 SET UP WAKE UP
- 09 CANCEL WAKE UP
- 0A DIAL BY NSN
- 0B TRUNK ANSWER ANY STATION
- 0C SET UP SPEED CALL
- 0D CANCEL SPEED CALL
- 0E MESSAGE WAITING
- 0F ROOM-TO-ROOM RESTRICT
- 10 ROOM-TO-ROOM ALLOW
- 11 STATION OUT DIAL RESTRICT
- 12 STATION OUT DIAL ALLOW
- 13 SET UP REMOTE DIVERSION
- 14 CANCEL REMOTE DIVERSION
- 15 PLACE IN PARK QUEUE
- 16 RETRIEVE FROM PARK QUEUE
- 17 CODE CALL INITIATE
- 18 CODE CALL ANSWER
- 1A CALL FORWARD NO ANSWER (W/O WARNING)
- 1B CALL FORWARD IF BUSY/NO ANSWER (W/O WARNING)
- 1C REMOTE FORWARD (W/O WARNING)
- 1D REMOTE FORWARD IF BUSY/NO ANSWER (W/O WARNING)
- 1E REMOTE FORWARD NO ANSWER (W/O WARNING)
- 1F REMOTE FORWARD IF BUSY/NO ANSWER (W/O WARNING)
- 20 CALL FORWARD (W/O WARNING)
- 21 CODED SYSTEM PARK
- 22 CODED SYSTEM UNPARK
- 23 CANCEL NITE II (FLEXIBLE NITE SERVICE)
- 24 STATION SELF-EXCLUSION FROM GROUP
- 25 STATION SELF-REINSTATE IN GROUP
- 34 CANCEL SELF-DIVERSION
- 60 ROUTE TO ATTENDANT

| | | | | |
|---|---|---|---|---|
| CB | SMP | DMP | CALL PICKUP | LS8/MS4/MORE-TO-COME FLAG,QF/ LS8/MS4/LS8/MS4/..../LS8/MS4 |
| CC | SMP | DMP | SPEED CALL | LS8(P1)/MS4/LS8(T)/MS4/XD/D2,D1/.../D13,D14 |
| CD | SMP | DMP | ACTION SUCCESSFUL | LS8/MS4 |
| CE | SMP | DMP | ACTION FAIL | LS8/ACTFLAG,MS4 |
| CF | SMP | DMP | CALL FROM GROUP QUEUE | LS8(P1)/MS4/LS8(P2)/GS,MS4 |
| D0 | SMP | DMP | PRESET CONFERENCE | LS8(P1)/MS4/LS8(CONF)/OF,MS4/QF/ LS8/MS4/.../LS8/MS4 |
| D1 | SMP | DMP | ROUTE TO ATTENDANT | LS8/MS4 |
| D2 | SMP | DMP | CDR DN-NSN TRANSLATION | CGN/D1,D2/D3,D4/DSCRPT1/DSCRPT2/CL |
| D3 | SMP | DMP | CFNA ALTERNATE NSN | LS8(P1)/MS4/LS8(P2-NEW)/MS4/... .../LS8(P2-OLD)/CALL TYPE,MS4 |
| D4 | SMP | DMP | TRAFFIC MEASURING | TRAF CODE(1,2 OR 3)/ARG1 |
| D5 | SMP | DMP | CALL FROM ATTENDANT | LS8(A)/MS4/LS8(P2)/MS4/V |
| D6 | SMP | DMP | DENY TOLL TRUNK | LS8/MS4(T) |
| D7 | SMP | DMP | CONFERENCE | LS8/MS4/LCID/HCID |

TABLE 2-continued
IPB COMMAND FORMAT LIST

| | | | | |
|---|---|---|---|---|
| D8 | SMP | DMP | GROUP BUSY | LS8(P1)/MS4/LOG/HOG |
| D9 | SMP | DMP | ACTION FAIL, ATTENDANT | LS8/MS4/V |
| DA | SMP | DMP | GROUP BUSY, ATTENDANT | LS8(P1)/MS4/LOG/HOG/V |
| DB | SMP | DMP | MESSAGE WAITING | LS8(DIALER)/MS4/LS8(ROOM)/MS4 |
| DC | SMP | DMP | DN TO NSN TRANSLATION | LS8(P1)/MS4/D3,D4/D1,D2 |
| DD | SMP | DMP | UCD CALL | LS8(P1)/MS4/LS8(LR)/MS4/LOG/HIG |
| DE | SMP | DMP | CODED PARK | LS8(P1)/MS4/LS8(CODE)/MS4/IAC |
| DF | SMP | DMP | ACD TERMINATOR | LS8(P1)/F,MS4/ACD GRP/CGN/D3,D4/D1,D2 |
| E0 | | | UNASSIGNED | |
| E1 | SMP | ACD | REQUEST ASSSOCIATED PARTIES | LS8(P1)/MS4 |
| E2 | SMP | ACD | REQUEST DN TO NSN TRANS | CFN/D3,D4/D1,D2 |
| E3 | SMP | ACD | ACD TONE CONNECT | LS8(P1)/MS4/LS8(P2)/MS4/ LS8(P3)/MS4/LS8(MSG)/MS4 |
| E4 | SMP | ACD | ACD CALL SETUP | LS8(P1)/MS4/LS8(P2)/MS4 |
| E5 | SMP | ACD | FLASH | LS8(P1)/MS4 |
| E6 | SMP | ACD | DISCONNECT | LS8(P1)/MS4 |
| E7 | SMP | ACD | START DIAL | LS8(P1)/F,MS4 |
| E8 | SMP | ACD | HOLD | LS8(P1)/MS4 |
| E9 | SMP | ACD | CONNECT MONITOR | LS8(P1)/F,MS4/LS8(P2)/MS4 |
| EA | SMP | ACD | SUPERVISOR OVERRIDE | LS8(P1)/MS4 |
| EB | SMP | ACD | UNSERVICED | LS8(P1)/MS4 |
| EC | SMP | ACD | DIRECTORY NUMBER TRY | LS8(P1)/MS4/D3,D4/D1,D2 |
| ED | SMP | ACD | SUPERVISOR CONSULT | LS8(P1)/MS4/LS8(P2)/MS4 |
| EE | SMP | ACD | RECENT CHANGE | CS/ARG1/ARG2/ARG3/ARG4/AR5/ARG6 |
| EF | | | UNASSIGNED | |
| F0 | ANY | ANY | RELOAD TO DUP | |
| F1 | ANY | ANY | RELOAD TO SUP | |
| F2 | ANY | ANY | RELOAD TO CUP | |
| F3 | ANY | ANY | RELOAD TO RUP | |
| F4 | ANY | ANY | RELOAD TO LUP | |
| F5 | ANY | ANY | RELOAD TO TUP | |
| F6 | ANY | ANY | RELOAD TO BUP | |
| F7 | | | UNASSIGNED | |
| F8 | | | UNASSIGNED | |
| F9 | | | UNASSIGNED | |
| FA | | | UNASSIGNED | |
| FB | | | UNASSIGNED | |
| FC | | | UNASSIGNED | |
| FD | | | UNASSIGNED | |
| FE | | | UNASSIGNED | |
| FF | | | UNASSIGNED | |

TABLE 3
MICROPROCESSOR SEQUENCE - DIAL NUMBER SEND

| CONTROL COMPLEX CALL SEQUENCE: ORIGINATING SWITCHING SYSTEM (PBX-A) | | | DESTINATION SWITCHING SYSTEM (PBX-B) | | |
|---|---|---|---|---|---|
| IPB COMMAND | Ref. Code | SENDING RECEIVING IPB | IPB COMMAND | Ref. Code | SENDING/ RECEIVING IPB |
| P1 Line Origination | A2 | LMP → SMP | | | |
| Busy Party (P1) | 6E | SMP → DMP, SMP → CMP | | | |
| Dial Tone to P1 | 22 | SMP → RMP | | | |
| 1st digit translation | 72 | RMP → DMP | | | |
| Receive n More Digits | 3B | DMP → RMP | | | |
| Report Dialed Digits | 74 | RMP → DMP | | | |
| Speed Call | CC | DMP → SMP | | | |
| Seize Trunk | 12 | SMP → TMP | Busy trunk T1 | A6 | TMP → SMP |
| Busy Trunk T1 | 6E | SMP → DMP | Busy trunk | 6E | SMP → DMP |
| Send Digits to Register | 31 | SMP → RMP | Second Look-Remove DT | A8 | TMP → SMP |
| | | | Origination - Quiet Tone | 23 | SMP → RMP |
| | | | Register Assigned | 17 | SMP → TMP |
| Allow Dial | A6 | TMP → SMP | | | |
| Allow Dial | 37 | SMP → RMP | | | |
| | | | Request 1st. Digit Trans. | 72 | RMP → DMP |
| | | | Receive n More Digits | 3B | DMP → RMP |
| | | | Report Dialed Digits | 74 | RMP → DMP |
| | | | Standard Call | C9 | DMP → SMP |
| | | | Send Ring to P2 | 03 | SMP → LMP |
| Register done, Time out Disconnect | B1 | RMP → SMP | Busy Party - P2 | 6E | SMP → DMP, SMP → CMP |
| | | | P2 Line Origination | A2 | LMP → SMP |

What I claim is:

1. A telecommunication switching complex comprising:
a plurality of communication switching systems interconnected by communication lines, each system servicing an associated plurality of stations and having a switching network and, connected to the network, a common control for performing system functions in response to dialed directory numbers received from said stations or communications lines, each of said switching systems servicing a plurality of directory numbers which are assigned thereto, in accordance with a comprehensive directory number plan, the common control of each of the switching systems having a data base memory means for correlating dialed directory numbers to systems functions, and including first and second memory levels, with each level including a plurality of memory locations, the locations of said first level being addressable by at least one of the dialed digits of a directory number and having stored therein, in a selected switching system,
   (i) for directory numbers serviced by said selected switching system, pointers to blocks of locations in the second level, and
   (ii) for directory numbers serviced by another switching system within said complex, quasi-ultimate function identifiers operated upon by said common control to transfer said dialed directory number, via an interconnecting line, toward the switching system servicing said directory number, the locations of the second level being addressable by said pointers and at least one other dialed directory number digit which is after said one digit in the dialing sequence, with locations of the second level having stored therein ultimate function identifiers utilized by the common control to carry out said system functions within said switching system, whereby when a location in said first level is addressed, for one of said directory numbers not serviced by said selected switching system, the second level locations are not addressed through a pointer, and instead the dialed number is subject to said transfer.

2. The switching complex of claim 1 wherein a location of said second level of the common control data base memory means can be addressed for a selected directory number serviced by another switching system, and the location thus addressed has stored therein one of said quasi-ultimate function identifiers.

3. The telecommunication switching complex as set forth in claim 1 wherein said comprehensive directory number plan is comprised of groups of four-digit directory numbers, and the first level of said data memory means is addressable by the thousands/hundreds directory number digits.

4. The telecommunication switching complex as set forth in claim 3 wherein the directory numbers having the same thousands/hundreds digits are not assigned to stations serviced by different switching systems, whereby the processing of one quasi-ultimate function identifier located within the first memory level is operative to correlate a plurality of directory numbers to a system function while using only one first memory level location and no second memory level locations.

5. The telecommunication switching complex as set forth in claim 3 wherein said four-digit directory numbers uniquely identify stations and said directory number plan is further comprised of other directory numbers, having no more than two digits uniquely identifying system features and access codes, and wherein for directory numbers representative of features and access codes serviced by another system within the complex, said second level of the data base memory means further includes memory locations addressable by the digits of said other directory numbers and having stored therein said quasi-ultimate function identifiers.

6. The telecommunication switching complex as set forth in claim 1 wherein each of said quasi-ultimate function identifiers is comprised of a word having,
   (i) one portion for uniquely identifying said word as a dial number send function and,
   (ii) an argument portion having a communication line identity code whereby said common control can execute the necessary system operations in accordance with said one portion to transfer the dialed directory number digits over the communication line identified by said argument portion.

7. The telecommunication switching complex as set forth in claim 2 wherein a data word of each of the quasi-ultimate function identifiers stored at the first level is comprised of a digital code distinct from said pointers, and each of the quasi-ultimate function identifiers located at the second table level is comprised of a digital code distinct from the ultimate function identifier words.

8. The telecommunication switching complex as set forth in claim 1 wherein said directory number plan further includes multiple groups of directory numbers, with the possibility of one or more numbers in different groups having the same digits, and each group of directory numbers is associated with a corresponding group of stations which can be serviced by two or more switching systems, the data base memory means of each switching system further including,
   (i) an entry level having a memory location corresponding to each said directory number group, and
   (ii) a block of locations in said first level for each entry memory level location, and each entry level location containing a pointer to the associated first level block, and wherein said switching systems servicing said groups of stations further include at least one interconnecting communication line associated with each directory number group, whereby said directory number groups can be maintained segregated throughout said complex.

9. A telecommunication complex, comprising:

two or more switching systems, each servicing features and stations, and each system being interconnected with at least one other system in the complex by a communication line, each said switching system having a switching network controlled by a processor, said processor having,
   (a) memory means for correlating dialed number digits, representative of stations or features of each said switching system, to a set of switching system function identifiers, said memory means being comprised of a heirarchy of memory table levels having at least a first and a last level, and each level having addressable locations for storing said function identifiers, and processor instructions directing said processor to other table levels, the storage locations within the heirarchy first level being indexed by higher order dialed digits and the locations of said last level being indexed by lower order dialed digits, and selectively stored within said memory level locations,
      (i) for dialed digits representative of stations and features serviced by the processing system, ultimate function identifiers which cause said processor to effect a result without further processing said dialed digits within said memory table, and (ii) for dialed digits representative of stations and features serviced by another system of the complex, quasi-ultimate function identifiers having identity codes corresponding to communication lines connected to the processing system and extended toward the switching system servicing the corresponding station or feature, (b) memory address means, responsive to dialed digits, for accessing the first table level utilizing higher order dialed digits and for accessing subsequent table levels using succeeding lower order dialed digits until a system function identifier is located, wherein said address means reports said located identifier to said processor so that said systems can carry out the system function defined thereby.

10. The telecommunication complex as set forth in claim 9 wherein for each switching system, distinct groups of dialed digits representative of stations and features are allocated to each switching system, each said group having higher order digits not allocated to other switching systems, wherein for each system memory means there is stored in first level locations having address digits corresponding to stations and features serviced by another switching system, said quasi-ultimate function identifiers, whereby said address means need access only said first level for dialed digits of stations and features of other systems.

11. The telecommunication complex as set forth in claim 9 wherein said processor, in processing said quasi-ultimate function identifiers, causes a connection to be established in said switching network between a line upon which dialed digits are received and the communication line specified by each of said quasi-ultimate function identifiers.

12. In a telecommunication switching system having a switching network for interconnecting a plurality of stations served by said system, a common control responsive to dialed directory numbers for controlling said system, said common control including a data base memory means having a multilevel table structure adapted for utilizing directory number higher order digits as addresses of memory locations in a first level, which locations have stored therein pointers to other levels, and a second table level having locations addressed by lower order directory number digits and having stored therein coded electrical signals representative of system functions to be executed by said common control, a method of transferring signals of dialed number digits representative of stations or features serviced by another switching system, to said other system, comprising:

providing a communication line connected to said system and extended toward said other switching system, storing at memory locations in said first level, addressable only by the dialed number digits serviced by said other switching system, an identity code representative of said communication line, and storing at memory locations in said first level, addressable only by the dialed number digits serviced by said other switching system, function identifiers which constitute instructions to the common control to transfer signals of the dialed number digits over the communication line as specified by said identity code.

13. The method as set forth in claim 12 further comprising:

establishing a network connection between a communication line over which the dialed number was received and the communication line specified by said identity code.

14. A method of providing communications across multiple switching systems of a telecommunication switching complex, said method comprising the steps of:

interconnecting said switching systems with communication lines, allocating to each system a custom group of directory numbers identifying stations serviced thereby, correlating within each said system, the directory numbers corresponding to stations serviced by others of the systems with quasi-ultimate system functions for selecting communication lines in accordance with dialed directory numbers, and identity codes representative of communication lines connected to the switching systems servicing said stations; and executing said quasi-ultimate system functions so that said dialed directory numbers are outpulsed over the communications lines correlated therewith.

15. The method as set forth in claim 14 wherein for blocks of directory numbers, within each said customer group having the same thousands/hundreds digits, said method further includes the step of within each said system, correlating each of said block of directory numbers which identifies stations or features serviced by one other system, with one quasi-ultimate system function and one communication line identity code.

16. In a telecommunication switching system having a plurality of lines and trunks, a switching network for interconnecting said lines and trunks, a plurality of stations served via lines by said system, a common control responsive to dialed directory numbers for controlling said system, said common control including a data base memory means having a multilevel table structure adapted for utilizing directory number higher order digits as addresses of memory locations in a first level, and a second table level having locations addressed by lower order directory number digits and having stored therein coded electrical signals representative of system functions executed by said common control, a method of providing network interconnections in response to dialed directory numbers, comprising:

for each of a subset of those dialed directory numbers the digits of which are representative of stations or features serviced by another switching system, reading a quasi-ultimate system function from a memory location within said first level at an address defined by the higher order digits thereof, and executing said function whereby said common control effects a network connection and redials said dialed number therethrough by way of a trunk extended toward said other switching system serving the station or feature representative of the dialed directory numbers; and for each dialed directory number the digits of which are representative of stations or features serviced by said system, first, reading a pointer instruction from a memory location within said first level at an address defined by the higher order digits thereof, and from said pointer deriving another address directing said common control to a portion of the second table level, and secondly, reading an ultimate system function from a memory location within said second level at an address defined by the directory number lower order digits, which function is utilized by said common control to carry out said system function within said switching system.

* * * * *